US012102277B2

(12) United States Patent
Schmidt et al.

(10) Patent No.: US 12,102,277 B2
(45) Date of Patent: Oct. 1, 2024

(54) PAN CLEANING SYSTEM AND IMPROVED CLEANING STATIONS

(71) Applicant: Food Machinery Ltd

(72) Inventors: Norman G. Schmidt, Denman Island (CA); Orlando Janzen, Mission (CA)

(73) Assignee: Food Machinery Engineering, LMTD, British Columbia (CA)

( * ) Notice: Subject to any disclaimer, the term of this patent is extended or adjusted under 35 U.S.C. 154(b) by 606 days.

(21) Appl. No.: 17/009,203

(22) Filed: Sep. 1, 2020

(65) Prior Publication Data

US 2021/0169303 A1 Jun. 10, 2021

Related U.S. Application Data

(60) Provisional application No. 63/033,826, filed on Jun. 2, 2020, provisional application No. 62/894,923, filed on Sep. 2, 2019.

(51) Int. Cl.
*A47L 15/00* (2006.01)
*A47L 15/24* (2006.01)
(Continued)

(52) U.S. Cl.
CPC ....... *A47L 15/0092* (2013.01); *A47L 15/0076* (2013.01); *A47L 15/241* (2013.01);
(Continued)

(58) Field of Classification Search
CPC ...... A47L 15/46; A47L 15/4295; A47L 15/39; A47L 15/245; A47L 15/241; A47L 15/0076; A47L 15/0092
(Continued)

(56) References Cited

U.S. PATENT DOCUMENTS

| 2,080,197 | A |   | 5/1937 | Brandenburg |
| 4,403,365 | A | * | 9/1983 | Hanson ..................... A21B 3/16 |
|           |   |   |        | 15/56 |
| 4,993,096 | A |   | 2/1991 | D'Amato |
| 5,239,722 | A |   | 8/1993 | Hanson |

(Continued)

FOREIGN PATENT DOCUMENTS

| CN |   106943103 A | * | 7/2017 | ............. A47L 15/24 |
| EP | 2263944 A1 | * | 12/2010 | ........... B65G 47/252 |

(Continued)

*Primary Examiner* — Laura C Guidotti
(74) *Attorney, Agent, or Firm* — Tangent Law Group, PLLC; Eric J. Weierstall, esq.

(57) ABSTRACT

A pan cleaning system is provided having a support carriage with one or more track supports and one or more track guides. An indexing conveyor provides a stream of baking pans and indexes the pans onto the support carriage as single pans. One or more twists in the track supports are provided such that the pans admitted by the indexing conveyor are turned at least substantially perpendicular relative to the horizontal plane of the machine. One or more frame assemblies having one or more sets of swing arms mounted on it is provided. With one or more secondary conveyors coupled to the frame assemblies. One or more cleaning subsystems are releasably coupled to the swing arms. A controller is provided where the single baking pan is admitted via the indexing conveyor based on signals from the controller into the one or more track guides as supported by the one or more supports and conveyed by the support carriage along the track guides and into the one or more frame assemblies after the twist turns the pan at least substantially perpendicular and the pan engages the one or more secondary conveyors and the pans is conveyed by the support carriage and the secondary conveyor to one or more cleaning subsystems.

22 Claims, 49 Drawing Sheets

(51) Int. Cl.
  *A47L 15/39* (2006.01)
  *A47L 15/42* (2006.01)
  *A47L 15/46* (2006.01)
  *A46B 9/02* (2006.01)
  *A46B 13/02* (2006.01)
  *B65G 17/12* (2006.01)

(52) U.S. Cl.
  CPC ........... *A47L 15/39* (2013.01); *A47L 15/4295* (2013.01); *A47L 15/46* (2013.01); *A46B 9/026* (2013.01); *A46B 13/02* (2013.01); *A46B 2200/3013* (2013.01); *A47L 15/4282* (2013.01); *A47L 2401/04* (2013.01); *A47L 2401/17* (2013.01); *A47L 2501/20* (2013.01); *A47L 2501/24* (2013.01); *B65G 17/12* (2013.01)

(58) Field of Classification Search
  USPC .......................................... 15/88.1–88.2, 102
  See application file for complete search history.

(56) References Cited

U.S. PATENT DOCUMENTS

| | | |
|---|---|---|
| 5,531,832 A | 7/1996 | McCalip |
| 2007/0042139 A1 | 2/2007 | Cooper |
| 2007/0043139 A1 | 2/2007 | Cho et al. |
| 2013/0342824 A1 | 12/2013 | Ponornarev |
| 2015/0081090 A1 | 3/2015 | Dong |
| 2019/0234617 A1 | 8/2019 | Bhogal |
| 2020/0048009 A1 | 2/2020 | Moore |
| 2021/0121041 A1 | 4/2021 | Schmidt et al. |
| 2021/0125326 A1 | 4/2021 | Schmidt et al. |
| 2021/0149312 A1 | 5/2021 | Tel |
| 2021/0353123 A1 | 11/2021 | Schmidt et al. |

FOREIGN PATENT DOCUMENTS

| | | |
|---|---|---|
| JP | H 08-112056 | 5/1996 |
| JP | 2015111 088 A | 6/2015 |
| JP | 2015-084671 | 5/2017 |
| KR | 101651193 B1 | 8/2016 |

* cited by examiner

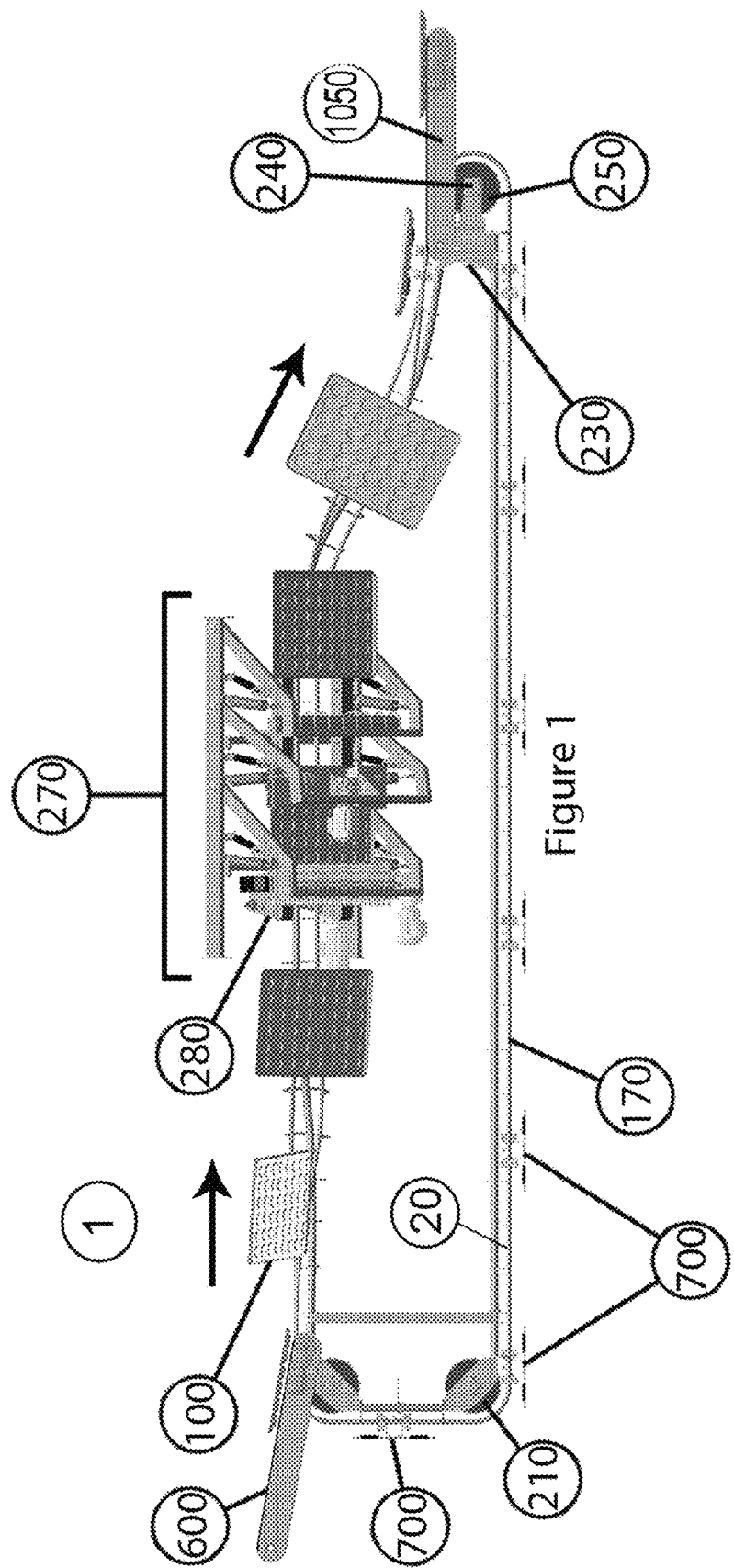

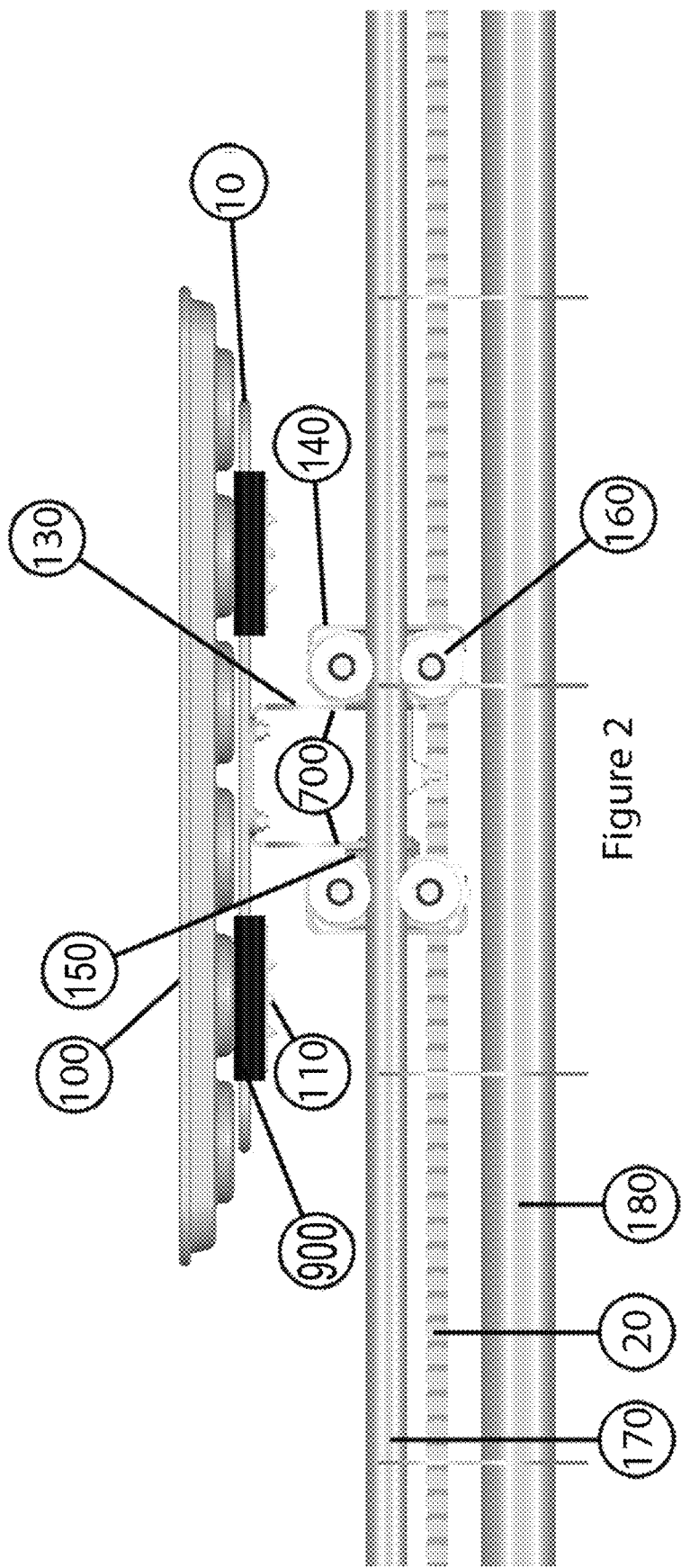

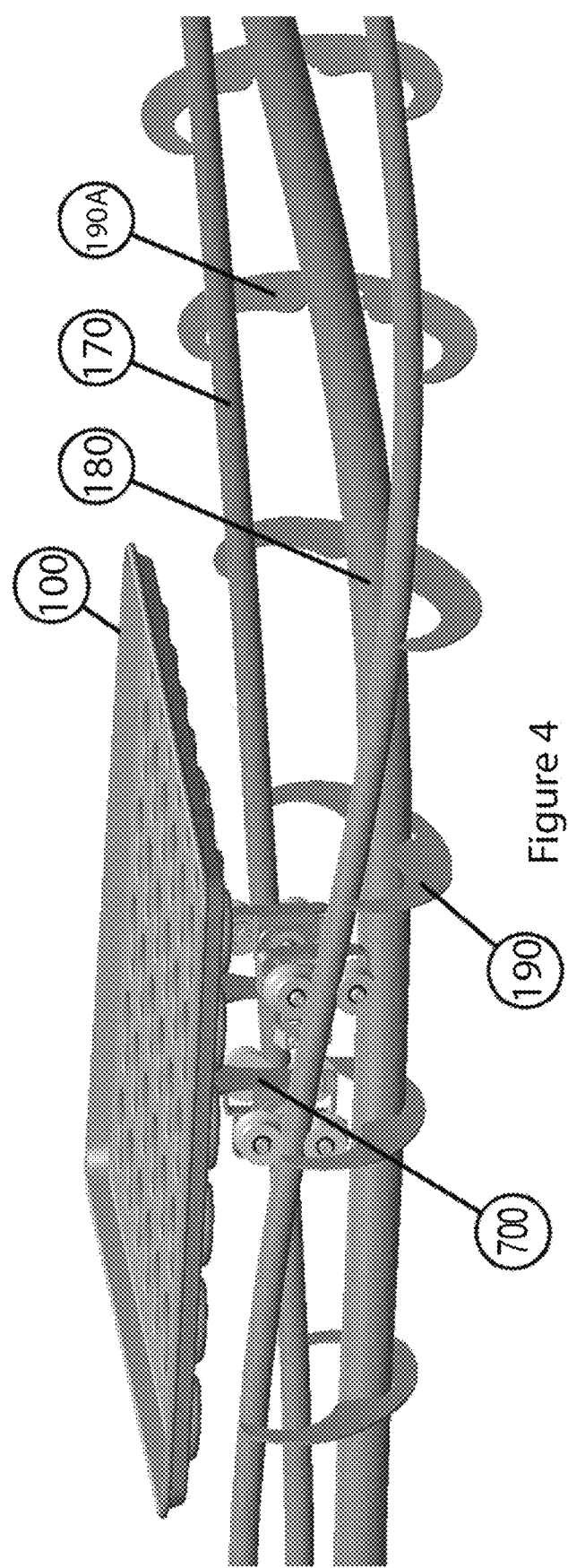

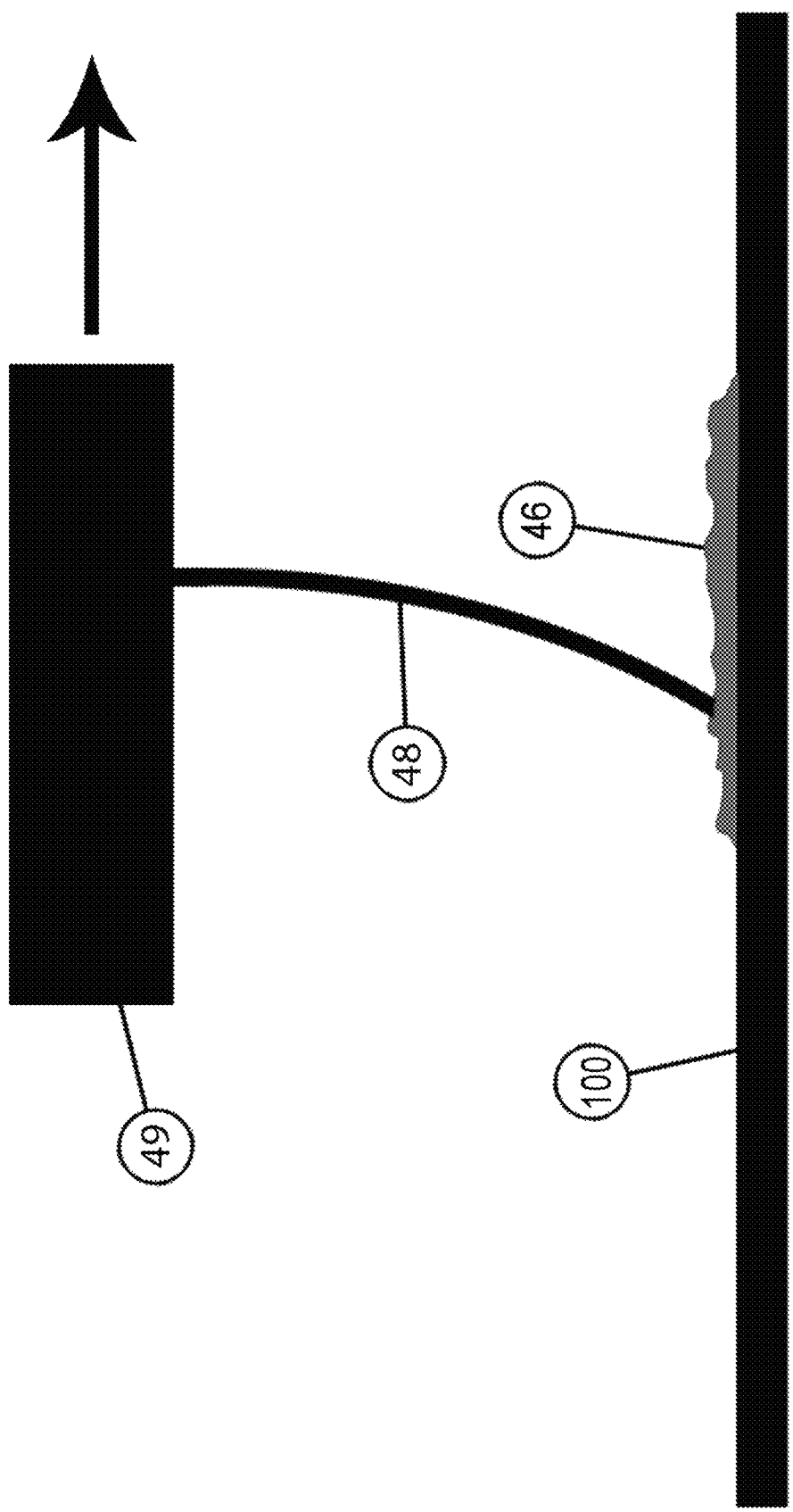

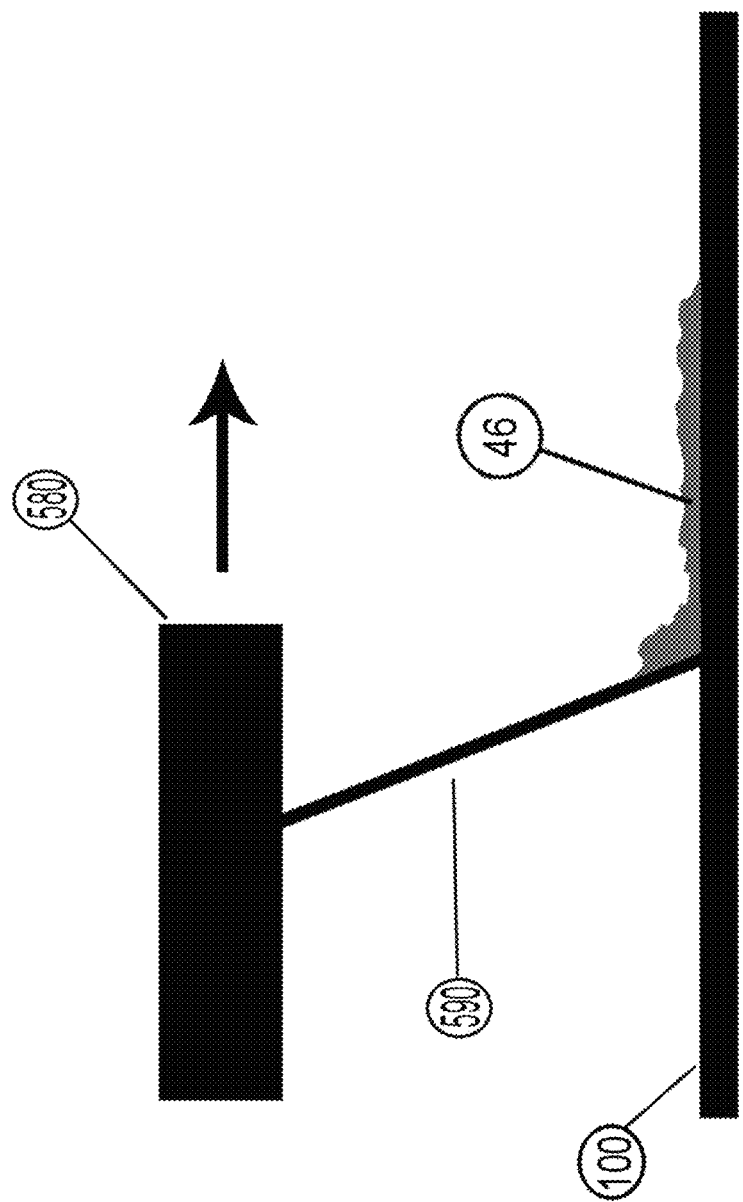

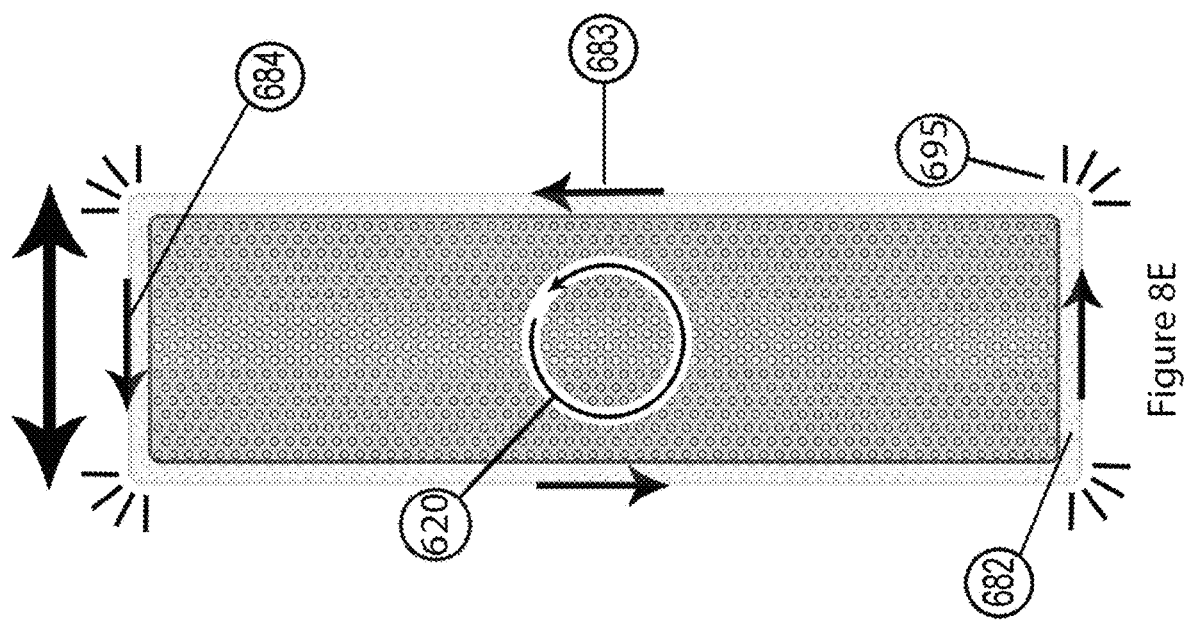

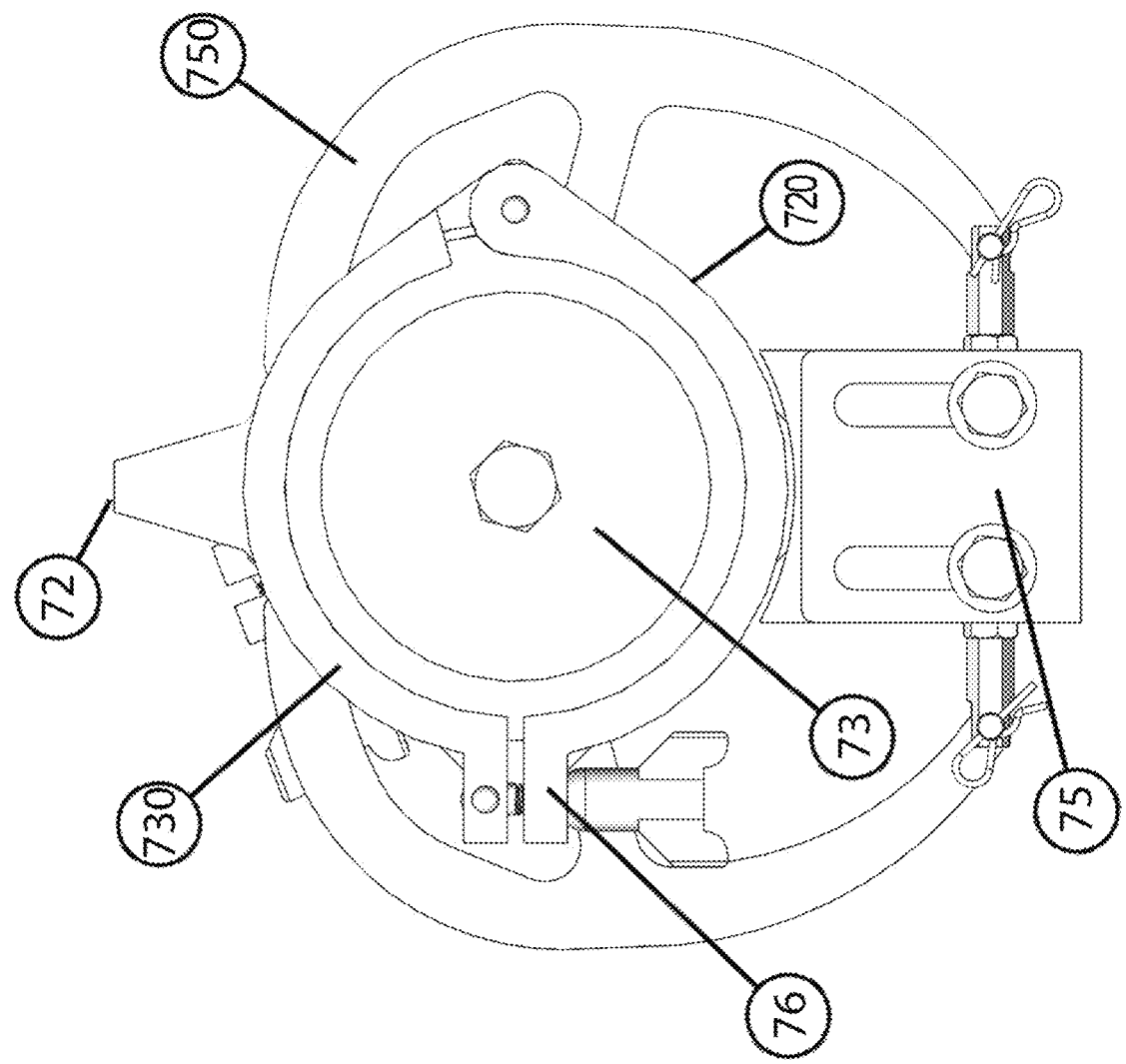

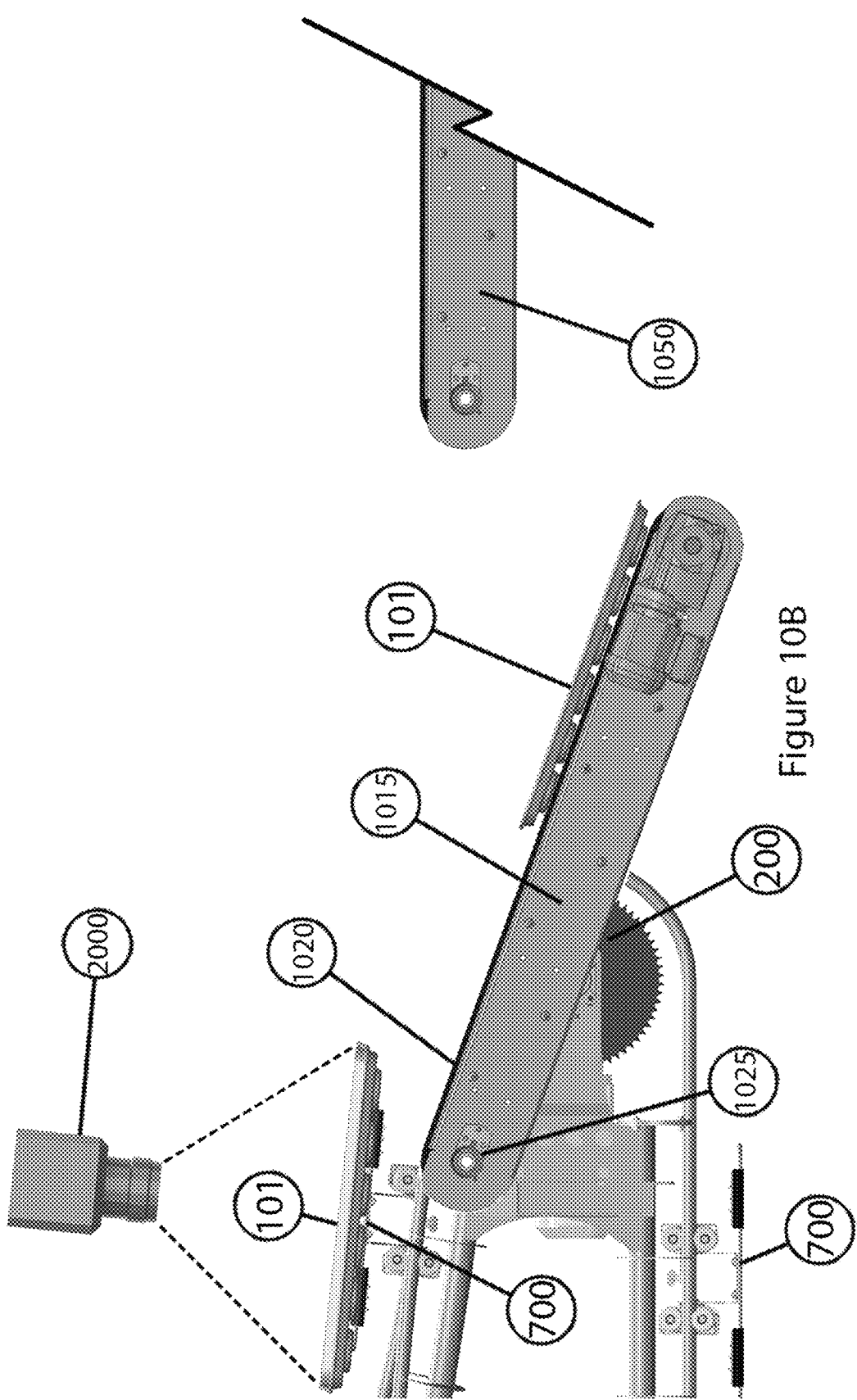

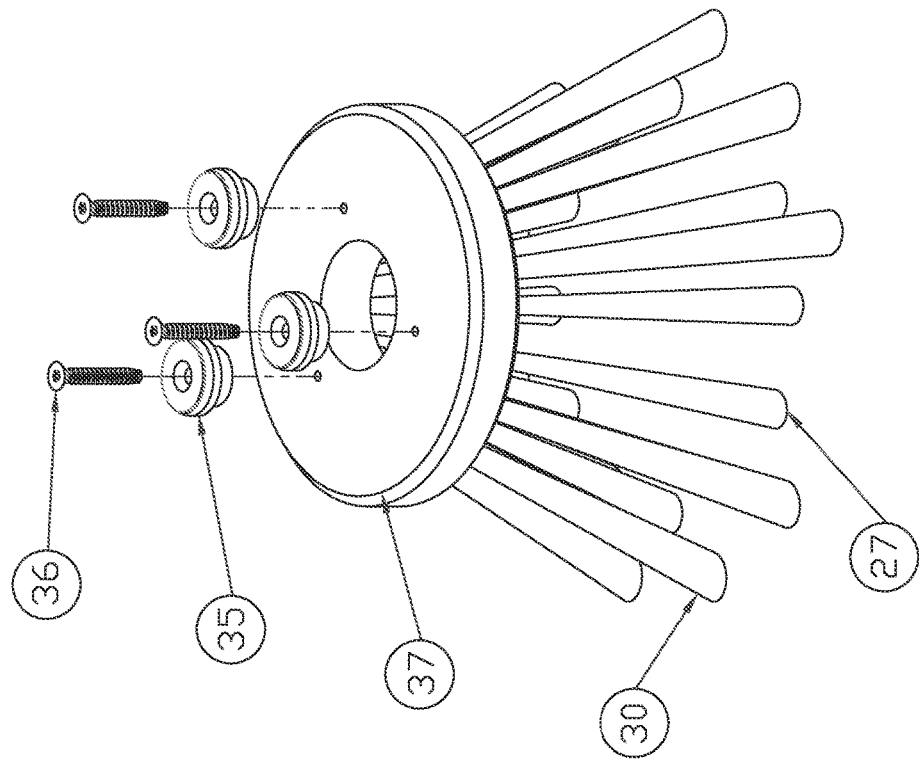
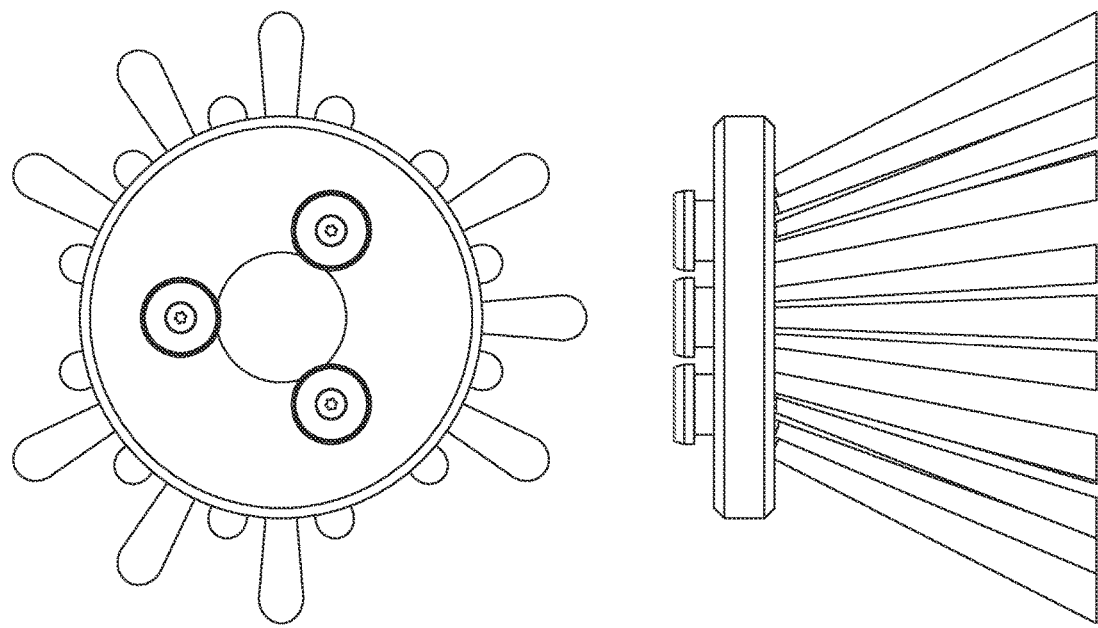
Figure 21

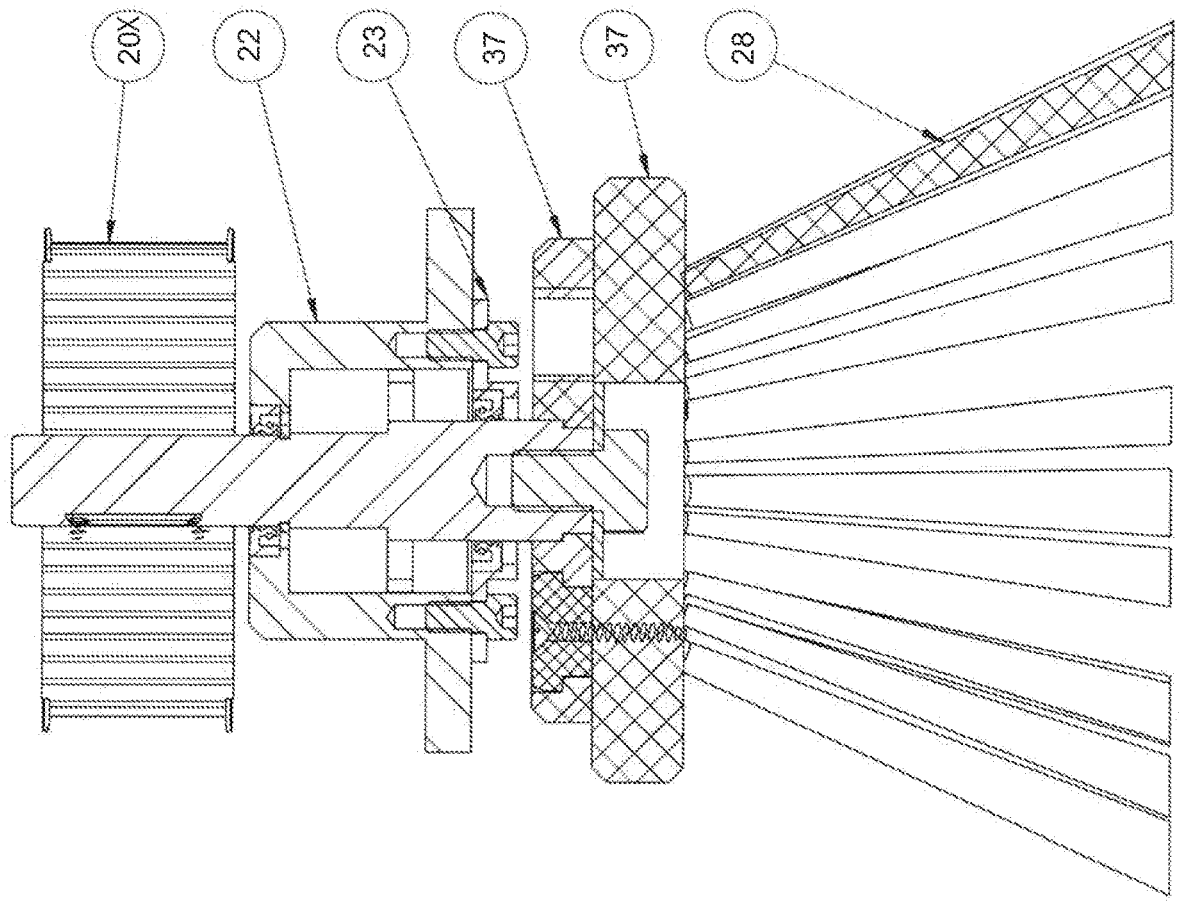
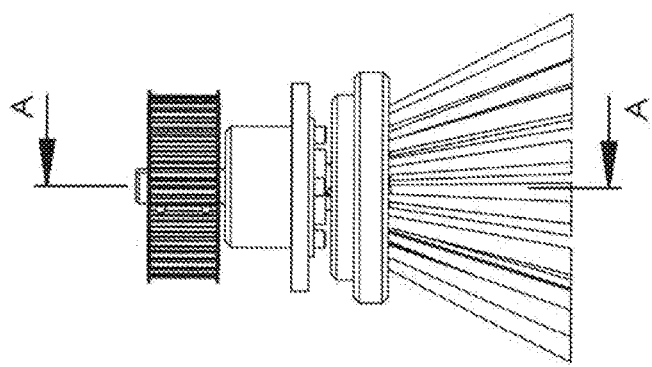
Figure 24

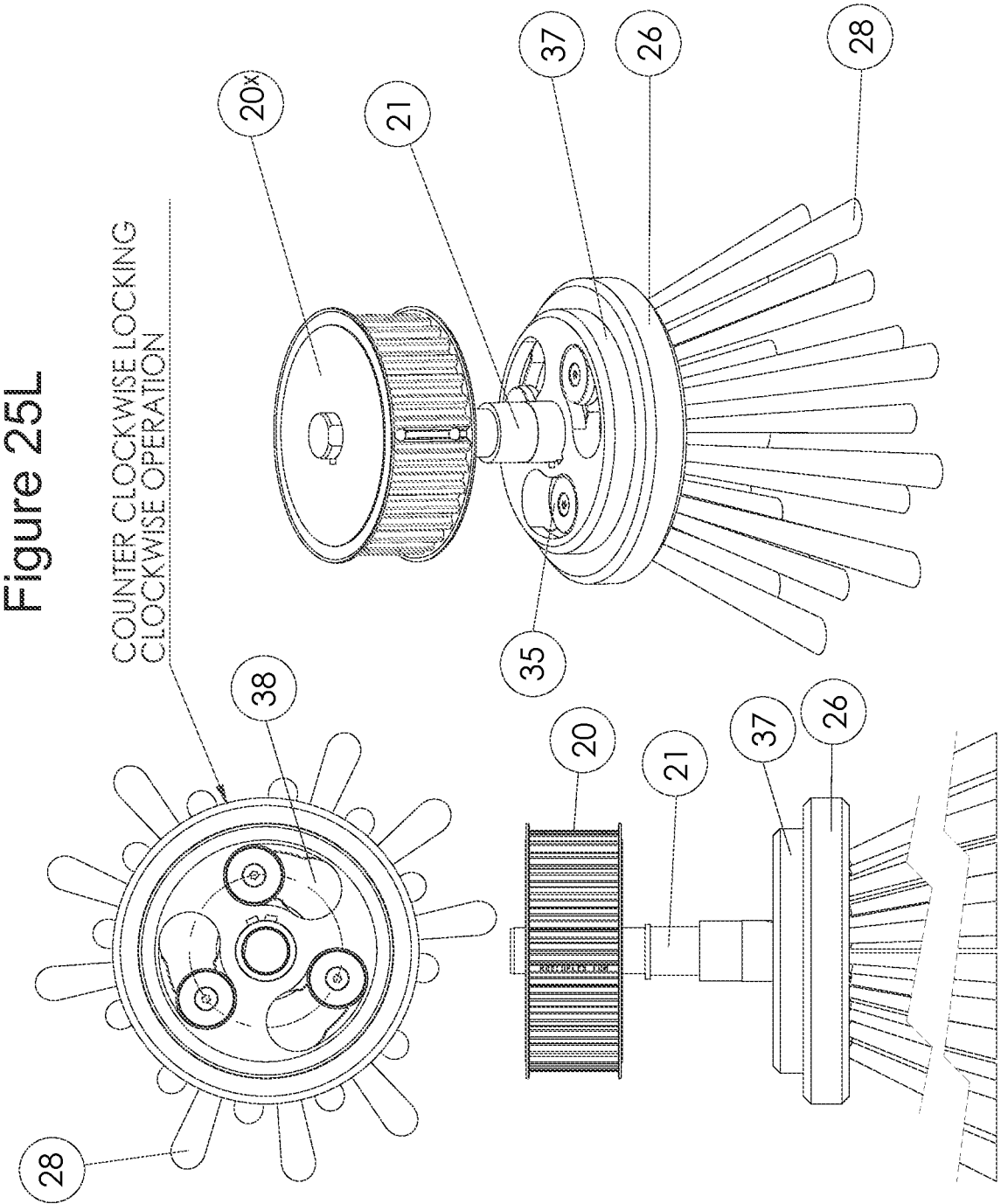

PAN CLEANING SYSTEM AND IMPROVED CLEANING STATIONS

CROSS-REFERENCE TO RELATED APPLICATIONS

This application claims priority of U.S. provisional patent application 62/894,923, filed Sep. 2, 2019 and U.S. provisional patent application 63/033,826 filed Jun. 2, 2020, which are incorporated herein by reference.

BACKGROUND OF THE INVENTION

In the commercial production of baked goods, dough portions are typically deposited by being portioned and placed on trays or pans for proofing the dough and baking off the product. The dough portion is placed on the pan surface. It is often the case that the dough may receive treatments prior to or following baking operations. For instance, toppings such as but not limited to seeds that can be applied to the dough portions prior to the baking process or a glaze, such as an egg wash as a further non-limiting example, can be applied after the baking process. When these topping mediums are applied they are applied in a manner such that they bond to the dough portion. However, the application also causes an issue where excess medium can go onto and adhere to the pan surface.

This "over spray" or over application of the toppings has a number of negative aspects for the baking operation. For instance, if in the case of the seed that bonds to the pan surface rather than the product these over applied seeds go through several bake cycles it will darken the seeds. If these seeds then dislodge and a proofed dough portion bonds to it, the resulting product will be deemed unsatisfactory in appearance to customers and/or contaminated. This can have a more significant impact if the seed, which is considered as an allergen, gets into product that should be seed free. This allergen contamination can cause serious issues for people that have strong reactions to such materials. In the case of the application of glaze onto baked rolls, the glaze that is sprayed in excess and goes onto the pan surface after several bake cycles will tend to peel off and if a flake of the over baked glaze goes into a bun it is also deemed as undesirable to unacceptable for finished production. It is critical that the pans in the commercial baking production system are thoroughly cleaned.

There are a wide range of methods for cleaning pans in commercial settings, such as wet cleaning with mechanical washers that use hot water and possibly cleaning solutions so as to remove the adhering mediums. But this method is not common in commercial baking as it is a slower process and affects other elements necessary for efficient production such as the maintenance of the durability of adhesion lowering coatings on pans. For instance, modem mass production bakeries will have a production rate of up to sixteen hundred buns per minute which works out to forty-five pans per minute throughput rate. Water bath washing would slow this rate of production as the washing or bathing action would require further drying and similar steps. Additionally, as noted, the release coatings that are typically applied to the pans frequently degrade when subjected to water based washing. The higher volume production that occurs in most commercial baking operations drastically compounds the effect of this problem, as the number and frequency of the overspray situations is significantly increased as is the demand for and use of the pans.

The typical cleaning method used in a modern commercial baking setting is a dry cycle where mechanical apparatus, such as round cylindrical brushes, rotate over the top surface of the pan to remove over sprayed glazes, toppings, and other deposits from the pan surface. However, these typical, simple round cylindrical brush setup mounted on rotating horizontal shafts are often limited in their ability to clean all surfaces of the pan. The typical baking pan for buns and the like has a complex geometry. These pans have a raised perimeter and often pockets or depressions in the pan where formed portions of dough will drop into and proof outwards to the extents of this perimeter and also proof upwards so that they gain the shape of but not limited to hamburger and hot dog buns and the like. These prior art driven brushes are often challenged to reach all of these surfaces and the rotation of the brush will also often constrain the ability of the brush to act on inside corners and edges of the pan. In particular, the brush bristles are often unable to fully reach into the bottoms of the pockets and not become damaged from bending when going over the raised perimeter of the pans.

In addition, baking pans can take various forms depending upon the product being produced. Some baking pans are flat, others have a raised lip or walls around the edges, other baking pans have recessed areas for receiving discrete dough or batter portions that are formed in the shape of the recessed area, and bread loaf and cake pans can have taller side walls than other pans. Consequently, the cleaning mechanism designed for a flat baking pan may not be ideal for cleaning a baking pan that has recessed areas, or taller side walls. A bakery that employs a variety of baking pan forms may have more than one pan cleaning machine, each one specialized for a different form of baking pan as they cannot be easily adjusted or changed over to accommodate other pan types.

Essentially, the limitations in the most common operations of the brushes in such cleaning processes comes from, but is certainly not limited to, the physical limitations in positioning the brushes on the pan, the angle of attack relative to the pan, the angle at which the bristles engage the pan or fail to engage the pan to remove adhered material, and physical limitations in running the brushes over the pans complex geometry. These all act to limit the effectiveness of these prior art cleaning processes and the limited simple mechanical brush sets.

In addition to the limitations associated with this approach and movement of the brushes, the inclination of the pan during cleaning is also an influencing aspect of the effectiveness of any system in cleaning the pan. If the pan is horizontal or flat, as it is typically used throughout the baking process, then cleaning may be negatively influenced. As an example of these limitations from a given inclination or lack of inclination, when a pan is moved by a cleaning machine with the baking surface of the pan sitting substantially upwards, when the pan is then brushed the dislodged materials will typically stay on the top surface of the pan. To clean the pan properly the loose deposited materials must be removed which is typically done through compressed air being blow across the pan.

Often this blowing operation will blow a significant portion of the debris from the pan surface but because of the turbulent effect of the air and effect of the pockets in the pan surface disrupting the air flow the debris will often circulate in the machine and may not be blown from the surface of the pan. This results in the need to have several rows or locations for blowing off the pan surface so as to try to remove all of the debris in multiple passes.

More generally speaking to the deficiencies of the prior art, in addition to the issues with individual cleaning stations or process, even though most current designs address only one or possibly two of the heretofore mentioned cleaning stations, these designs are fixed in the nature of and order of the cleaning stations. That is once the machine is created, the elements forming the cleaning station are fixed and often difficult to maintain. That is the brushes at a brush station, for instance, are difficult to access or alternatively require full disassembly of the frame and subcomponents to access and change. Similarly, commercially available blowers are difficult to optimize for the purposes of cleaning pans which can have differing geometries.

In an attempt to compensate for these shortcomings, it is often the case that the existing pan cleaners use longer running cleaning lines or make multiple passes to ensure the cleaning operations will properly clean the pans. However, this requires larger and more costly machines and space to house the machines. It also does not resolve the issues with deferred maintenance experienced due to the inaccessibility of elements that require regular change out, like brush heads, or cleaning, like blowers. The result is that it is often the case that multiple cleaning machines to address multiple pan types and large volumes must be provided and these take up significant floor space and add operational costs and overhead and that even when several machines are available, it is often difficult to service these prior art machines effectively.

There are also limitations to where or what surfaces conventional or prior art pan cleaners can clean. It would be desirable to reach all corners and surfaces of the pan. This would prevent the aforementioned adhesion of contaminant seeds and/or overspray of the associated adhesion materials. Additional examples of locations that need mechanical cleaning include, but are not limited to, the upper inner perimeter of the pan which gives the pan rigidity as well as provides a means for it to nest one into another when it is to be stacked.

If there is sprayed on glaze and/or have seeds adhering to this surface then they are theoretically away from where the product gets baked but during the stacking and or the unstacking operation and/or the movement of the pans when stacked it is the case that the inner lip of the pan will contact or may contact the outer perimeter lip of the pan that is above and nested into the lower pan. When this happens materials that are bonded to the inner and outer pan perimeter may be dislodged thru the impact imparted by nesting or stacking operations and/or when the pans in stacks are moved around. Dislodging of these materials can present a hazard in that they may go into a pocket or onto an upper pan surface where the dough may fall and or proof onto the dislodged contaminant resulting in the same issue of the containment appearing on the bun. It is an issue and a concern to alleviate these possible sources of product contamination through more efficient and optimized brushing processes and devices. There exists a need for a stronger means of cleaning pans, including but not limited to bun pans.

There exists a need for a machine to more effectively clean materials from pans that overcomes the limitations of the existing mechanical methods. Such a device would provide a system for optimizing the orientation of the pans in the cleaning process while simultaneously providing for redundancy in passes and adjustment of the angle of attack of any mechanical agitation of the pan as well as providing for improved contact specifically with contoured, oscillating brushes with the ability to adjust and accommodate the complex geometry of the pan so as to reach substantially all the surfaces on the pan as it is passed through the optimized orientation for cleaning. Such a system should provide a modular, easily accessible and easily cleaned and maintained system with the flexibility to provide customization through interchangeable or expandable cleaning stations that can be easily programmed to accommodate various pan styles on one continuous line. Finally, this system should employ uniquely improved cleaning stations for cleaning the pans.

SUMMARY OF THE INVENTION

An aspect of the instant invention is to provide a system for cleaning pans with an easily customizable and interchangeable system of cleaning subsystems mounted on an open frame, modular swing arm operable system providing quicker change out of component subsystems and easier access to those subsystems for maintenance and upkeep.

A further aspect of the instant invention is to provide a novel track operation for moving a pan through a complex geometry to an optimized positioning for cleaning.

A still further aspect of the instant invention is to provide a carriage and track system that can turn a pan at least substantially perpendicular or at a greater angle to the horizontal for better effective cleaning.

Yet another aspect of the invention is to provide a pan sorting system to detect debris on a pan after it has passed a cleaning station and determine if the cleaning was effective.

Still another aspect of the invention is to provide a pan sorting station on a pan cleaning machine that can detect the state of the pan or pan coatings and reject and segregate pans determined to be out of specification.

An aspect of the instant invention is to provide a pan cleaning system that can input pans in a myriad of directions and selectively discharge the pans in an upright or face down fashion for later processing.

A still further aspect of the invention is to provide a system that can completely rotate a pan providing a first half of the rotation ahead of a cleaning subsystem and the second half of the rotation after cleaning to a stacking system.

An aspect of the invention is to provide a wide range and freedom of movement in a track system that can come in high or low and exit high or low and similarly can flip or rotate orientation to suit cleaning stations optimum orientation, for example flipping for one station above on a frame and reversing for another below.

Another aspect of the invention is to provide a cleaning system having multiple stations for cleaning and self-changing sections where one or more of the same brush type can be cycled into operation and a used or previously cycled set can be moved to a position to be replaced.

Yet another aspect of the invention is to provide additional devices or multiples of the cleaning device subsystems, this duplication permits continuous operation of the system such that one subsystem could be idled and rotated to an easily accessible position for upkeep while the other engages the pans.

An aspect of the invention is to provide a machine that can more effectively clean materials from pans that overcomes the limitations of the existing mechanical methods, provide for a system for optimizing the orientation of the pans in the cleaning process while simultaneously affording redundancy in passes and adjustment of the angle of attack of any mechanical dislodging or agitation of the pan as well as providing for improved contact specifically with contoured, oscillating brushes with the ability to adjust and accommodate the complex geometry of the pan so as to reach substantially all the surfaces on the pan as it is passed through the optimized orientation for cleaning.

A further aspect of the invention is to provide a system that is modular, customizable and easily cleaned and maintained with the flexibility to expand and program the cleaning system.

Yet another aspect of the invention is to provide customization through interchangeable or expandable cleaning stations that can easily be programmed to accommodate various pan styles on one line.

An aspect of the invention is a system employing uniquely improved cleaning stations for cleaning pans.

An still further aspect of the invention is an improved pan cleaning machine uses carriages guided by tracks to carry pans in a continuous and fully automated flow through a cleaning section for higher throughput compared to batch cleaning systems with carriages rolling on tracks with the spacing between carriages automatically indexing the feed of pans carried on carriages in spaced relationship so that the edges of pans in consecutive carriages do not interfere with one another.

Yet another aspect of the invention is to provide a customizable rotation of the pans in the plane of the pan so as to orient the pan upwards, sideways, helically, or in a combination of these motions so as to rotate the pan at least ninety degrees to assist with cleaning A still further aspect of the invention is to provide a brush cleaning station wherein the brush will be moving so as to oscillate or move in a planar orbital motion of varying degree that will act upon differing areas of the pan surface in a way so as to provide a more complete cleaning of the pan surface.

An aspect of the invention is a travelling magnetic pan support sections run in a supported track mechanism where wheels attached to the travelling pan support section engage track tubes that provide the desired position and route of the travelling pan support section.

A still further aspect of the invention is to provide a quick change brush coupling whereby brushes can be removed and replaced in a manner of seconds to minutes rather than hours.

An aspect of the invention is to provide a controller which is activated for automated removal or opening of the brush coupling for rapid change out of used brushes due to wear or contamination.

Another aspect of the invention is to provide a system with multiple redundant subsystems such that the systems can be operating in alternating fashion and when one is in operation the other can be moved out and maintained while on a swing arm of the machine.

Another aspect of the invention is the use of a quick change brush coupling that also allows for consistent positioning of a brush shaft to provide a consistent indexing position as well as provide for rotational transmission of torque or rotational energy and information to a controller.

An aspect of the invention is the use of a "plate brush" or planar brush that it is substantially flat or made of a base or frame that is substantially flat but where bristles with multiple bristle lengths and orientations extend to clean the pan edges.

A further aspect is a novel brushing system where a substantially flat plane brush with a set of shorter bristles at the front is provided which are angled against the direction of travel of the pan so as to optimally engage the pan as it approaches the substantially flat plane brush, the shorter bristles of the substantially flat plane brush being longer than the depth of the top pan perimeter edge so as to be able to bend in the elastic deformation range of the bristle material while bending sufficiently without deforming and programming the height of engagement of the brush.

An aspect of the invention is to provide better, more optimized cleaning of multiple surfaces on pans, in continuous production where pans are in good condition and a light cleaning is required on each pass thru the baking process.

A further aspect of the invention is to provide for cleaning of protein glaze that is not hard bonded or seeds that are slightly adhered to the pan where a consistent minor or light to medium cleaning is sufficient and the brushes can be mild so that wear imparted to the release non-stick coating glaze in the cleaning process is not significant.

A further aspect is to provide perimeter cleaning such that when pans start to get a build up occurring or where a pan perimeter cleaning is required then an additional or alternate brush can be used which will clean these surfaces and the brush action will be more significant so as to do a stronger cleaning operation.

A still further aspect of the invention is to provide a modular system and with easily maintained and detached brush heads to address allergen concerns where brushes used with allergens cannot be used on non-allergen pans. This includes providing extra brushes or alternate brushes and/or extra brushes mounted to additional cleaning modules that can be activated to come in or be removed from the cleaning operation so as to use the corresponding cleaning devices to the required allergen or non-allergen products.

Yet another aspect of the invention is to provide the aforementioned brush change options via a controller having stored recipes so that no human intervention is required and the alternating or selective use of given modules can be engaged via the controller without human intervention or further change outs.

An aspect of the invention is to provide for continuous pass thru of pans to be cleaned such that as pans come in they will be cleaned regardless of spacing or location on an infeed conveyor belt which removes the issue of indexing of pans to required locations.

Yet another aspect of the invention is to provide a sensor to sort the pans requiring cleaning from those not requiring cleaning and if the pans do not require any cleaning the cleaning heads of the instant invention can be activated to lift off of the path of pans and the pans just pass thru without any brush contact. This may also be the case where pans that do not get seeds and/or glaze applied may just run thru the pan cleaner but the cleaning modules may be raised and operation to the modules may turned off so as to not provide any cleaning.

A still further aspect of the instant invention is to provide at least one swing arm configured on an at least one frame whereby the swing arm can extend in a controlled fashion to the level needed to proceed.

Another aspect of the invention is the provision of a customer customizable number of cleaning stations to be used or required for specified operation.

Yet a further aspect of the invention is the settable height of the arms, which allows setting of lowest allowable workable position for the arm but does not make it a fixed setting where jams of the pans can wedge in one or more pans, but rather a minimum height and the head mounted on the arm can float higher to allow for pass over of pan perimeter edge or as previously indicated typical pan wedge situations.

An aspect of the invention is a controller that controls the aforementioned arms, so that the arms can be adjusted and thereby adjust the downward force of the brush to the pan by electronic means so as to allow for recipe driven, minimal settings and or operation.

A still further aspect of the invention is easy fast change out of brushes with quick change connectors which allow operations to change out brushes at a settable count level so that as an example brushes may be changed out at regular pan cleaning cycles to allow for cleaning of brushes so that the brushes are actually cleaning the pans and not allowing the brushes to get saturated to where they are spreading debris from prior pans onto subsequent pans cleaning cycles.

Yet a further aspect of the invention reverses operation of the brushes, such that when the horizontal axis cylindrical brushes are used they will tend to bend the bristles and it may be that the bristles will deform or bend to a degree of bend or curvature that reduces the cleaning action from brushing to stroking the pan surface. Optimally, these brushes can be reversed so as to always utilize bristles that are forward inclined to brush the pan surface. For example if a bristle gets bent back during operation and so when re-installed after cleaning or when programmed to be reversed on an operational count basis then when it is installed in the reverse manner it will actually be where the bristles are forward inclined and push brush the pan surface rather than drag over the pan surface which is what happens. This procedure or available program option will also provide better brush utilization, operation, and life span.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

The invention includes an article of manufacture, an apparatus, a method for making the article, and a method for using the article.

The apparatus of the invention includes an apparatus for cleaning pans, and an improved airknife, an improved planar brush cleaning system, an improved conveyor track with inclined cleaning orientation, an improved planar brush head, and an improved quick release cylindrical brush pan cleaning system. The method of the invention includes a method for cleaning pans.

The apparatus of the invention also includes a pan cleaning system to clean baking pans including a support carriage, an at least one track support, and an at least one track guide. With an indexing conveyor having a stream of baking pans thereon and indexing the pans onto the support carriage as single pans. It also has an at least one twist or rotation in said conveyor at least one track support such that the pans admitted by the indexing conveyor are turned at least perpendicularly relative to the horizontal plane. The system has an at least one open frame, modular assembly having an at least one modular swing arm mounted thereon. An at least one secondary conveyor can be coupled to the at least one frame assembly and can be provided with an at least one cleaning subsystem releasably coupled to a swing arm thereon.

A controller is also provided such that the single baking pan enters the system via the indexing conveyor based on signals from the controller into the at least one track guide as supported by the at least one track support and conveyed by the support carriage along the at least one track guide and into the at least one frame assembly after an at least one twist turns the pan at least perpendicularly and the pan engages the at least one secondary conveyor and the pan is conveyed by the support carriage and said secondary conveyor to at least one cleaning subsystem.

The support carriage can be a magnetic support carriage. The at least one secondary conveyor can be a magnetic conveyor. The at least one cleaning subsystem can be at least one of an airknife, a rotating cylindrical horizontal brush assembly, or a planar brush assembly. The at least one cleaning subassembly or subsystem can be an airknife, a rotating vertical brush assembly, and a planar brush assembly.

The pan cleaning system further including a machine vision subsystem, a device for imaging and detecting a condition of the pan, where the at least one support carriage further conveys the pan along the at least one track member to the machine vision subsystem. The machine vision subsystem can analyze the condition of the pan. The condition of the pan can be analyzed by the machine vision subsystem and this result can be communicated to the controller and the pan can be sorted based on this condition.

The apparatus of the invention yet further includes a pan cleaning system having an at least one frame assembly, an at least one support carriage, an at least one track support, and an at least one track guide. With an indexing conveyor having a stream of baking pans thereon and indexing the stream of pans onto the at least one support carriage as an individual unclean pan and an at least one twist in said at least one track support such that the individual unclean pan is turned at a cleaning angle which is at least perpendicular relative to the horizontal plane of the at least one frame assembly. An at least one secondary conveyor is coupled to the at least one frame assembly and angled to receive the individual unclean pan at the cleaning angle. And an at least one cleaning subsystem is releasably coupled to the frame assembly and oriented to engage the unclean pan at the cleaning angle on the at least one secondary conveyor and having a controller. Where the individual unclean baking pan is admitted via the indexing conveyor based on signals from the controller passing onto the at least one carriage conveyed along the at least one track guide as supported by the at least one track support and conveyed by the support carriage along the at least one track guide and into the at least one frame assembly after the at least one twist turns the pan at least perpendicularly to the cleaning angle and the pan engages the at least one secondary conveyor and the pans is conveyed by the support carriage and said secondary conveyor to the at least one cleaning subsystem and cleaned.

The support carriage can be a magnetic support carriage. The at least one secondary conveyor can also be a magnetic conveyor. The at least one cleaning subsystem can be at least one of an airknife, a rotating cylindrical brush assembly, or a planar brush assembly. The at least one cleaning subsystem can also be one or more of an airknife, a rotating brush assembly, and a planar brush assembly.

The at least one support carriage can further conveys the pan along the at least one track member to the machine vision subsystem. The machine vision subsystem can analyze the condition of the pan. The condition of the pan analyzed by the machine vision subsystem can then be communicated to the controller and the pan can be sorted based on this condition.

The apparatus of the invention yet further includes a modular frame swing arm pan cleaning system. The system having an at least one frame, an at least one swing arm mounting point on the at least one frame element, and an at least one modular swing arm coupled to the at least one frame element at the at least one mounting point by an at least one pivot element such that the at least one modular swing arm rotates freely about the pivot element. The system further includes an at least pan conveyor and is coupled to said frame with an at least one unclean pan conveyed by said at least one pan conveyor and an at least one pan cleaning subsystem coupled to the at least one swing arm with an at least one swing arm actuator and an at least one swing arm limiter and an at least one controller.

Where the at least one swing arm has the at least one cleaning subsystem mounted thereon and is positioned by the at least one controller relative to the at least one conveyor to engage the at least one unclean pan with the at least one pan cleaning subsystem by activating the at least one swing arm actuator to position the cleaning subsystem to engage the pan at a relative pressure range exerted by the at least one swing arm actuator and limited by the at least one swing arm limiter such that the at least one unclean pan is cleaned.

The at least one frame element further includes an at least one primary frame element and an at one least secondary frame element, where the at least one modular swing arm, the at least one modular swing arm mounting point, and the at least one swing arm pivot are mounted on the at least one secondary frame element and the at least one secondary frame element is coupled to and supported by the primary frame element.

The pan cleaning system can further include a secondary conveyor receiving the flow of unclean pans and can be coupled to the at least one secondary frame element, whereby the secondary conveyor retains the unclean pan at a cleaning angle that is at least perpendicular relative to the at least one primary frame element and the at least one secondary frame element is coupled to the at least one primary frame element at the cleaning angle such that the at least one modular swing arm engages the flow of unclean pans at the cleaning angle.

The at least one pan cleaning subsystem can be at least one of an airknife, a rotating brush assembly, and a planar brush assembly. The at least one pan cleaning subsystem can be releasably mounted to the at least one modular swing arm by a releasable coupling such that the at least one pan cleaning subsystem is releasable from the at least one modular swing arm. The controller has a setting and can actuate upon detection of the setting whereby the pan cleaning system is halted and the at least one swing arm is moved to upward to an open or maintenance position and the at least one pan cleaning subsystem. The pan cleaning system has an open position that is a maintenance position and the at least one pan cleaning subsystem is released by a releasable coupling for maintenance or replacement in that position.

The controller can provide variable geometries programmed for particular variables related to the at least one of a type, a size, or a material related to the flow of the unclean pans and the height and pressure exerted by the at least one modular swing arm actuator. The at least one modular arms can be releasably coupled to the at least one frame element by an at least one releasable coupling, the modular swing arms being removable and relocatable within the frame and expandable such that a plurality of arms can be coupled to the at least one mounting points.

The apparatus of the invention includes a planar brush pan scrubbing with a planar pan scrubbing brush, a mounting frame coupled to the planar pan scrubbing brush, a counter weighted orbital motion device, an at least one quick release mount on the counter weighted orbital motion device and a drive motor, wherein the at least one quick release mount couples the frame and the planar brush to the counter weighted motion device and the drive motor is coupled to and drives the counter weighted orbital motion device such that it imparts an orbital motion in the planar brush across a pan surface.

The apparatus of the invention further includes an airknife having an outer housing, an inner housing, a quick release coupling that couples the inner and outer housings, an at least one air nozzle and an at least one air nozzle volume adjustment device.

The apparatus of the invention can further include a planar brush pan scrubbing system having a planar pan scrubbing brush with a mounting frame coupled to the planar pan scrubbing brush. A counter weighted orbital motion device can be provided with an at least one quick release mount on the counter weighted orbital motion device. A drive motor can be included where the at least one quick release mount couples the frame and the planar brush to the counter weighted motion device and the drive motor is coupled to and drives the counter weighted orbital motion device such that it imparts and orbital motion in the planar brush across a pan surface.

The method of the invention includes a method of operating a pan cleaning system including the steps of supplying a flow of unclean pans to an at least one conveyor, conveying the flow of unclean pans to an at least one frame mounting an at least one pan cleaning subsystem on an at least one swing arm, engaging the unclean pans with the at least one pan cleaning subsystem at a pre-determined pressure range setting programmed in a controller and exerted by an at least one actuator coupled to the pan swing arm and limited by an at least one swing arm limiter in communication with the controller, cleaning the unclean pans therein engaged to provide a clean flow of pans, and discharging the flow of clean pans from the pan cleaning system.

The step of conveying can further include the step of rotating the flow of unclean pans to a cleaning angle the cleaning angle being at least perpendicularly to the frame and the step of engaging the unclean pans with the at least one pan cleaning subsystem engages the pan at the cleaning angle with the at least one pan cleaning subsystem. The step of engaging the flow of unclean pans at a pressure range can include sensing and monitoring the pressure range and releasing the flow of unclean pans if an excess pressure indicator is detected representing a feed jam in the flow of unclean pans into the pan cleaning system. The method can further include the step of sorting the flow of clean pans based on at least one of size or sensed condition from a pan sensing sub-system.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIG. 1 shows an isometric view of an exemplary embodiment the instant invention.

FIG. 2 shows a side cutaway view of a support carriage of the exemplary embodiment of the invention shown in FIG. 1.

FIG. 4 shows an isometric view of the track as the support begins the rotation of the pan in an exemplary embodiment of the instant invention.

FIGS. 8A and 8B shows a typical perpendicular brush assembly of a planar brush.

FIGS. 8C and 8D shows a cross section of a row of the improved bristles of an exemplary embodiment of the improved bristle brush of the planar brush subsystem of FIG. 7A.

FIG. 8E shows the top down view of the planar brush of FIG. 7A in its scrubbing motion.

FIG. 9C shows an end view of the airknife with adjusting devices for opening and closing gap of the airknife opening shown in FIGS. 9A and 9B.

FIGS. 10A and 10B show a side view of a further exemplary discharging and sorting station for clean pans.

FIG. 21 shows a top view, a side view and an isometric view of an exemplary embodiment of a brush head from module three.

FIG. 24 shows an assembly view of an exemplary embodiment of the brush head, plate and pulley assembly from FIG. 23.

FIGS. 25R and 25L show isometric views of the installation method of the brush heads on the spindle in an exemplary embodiment of the brush head assembly for module three.

DETAILED DESCRIPTION OF THE INVENTION

Figure 3A:
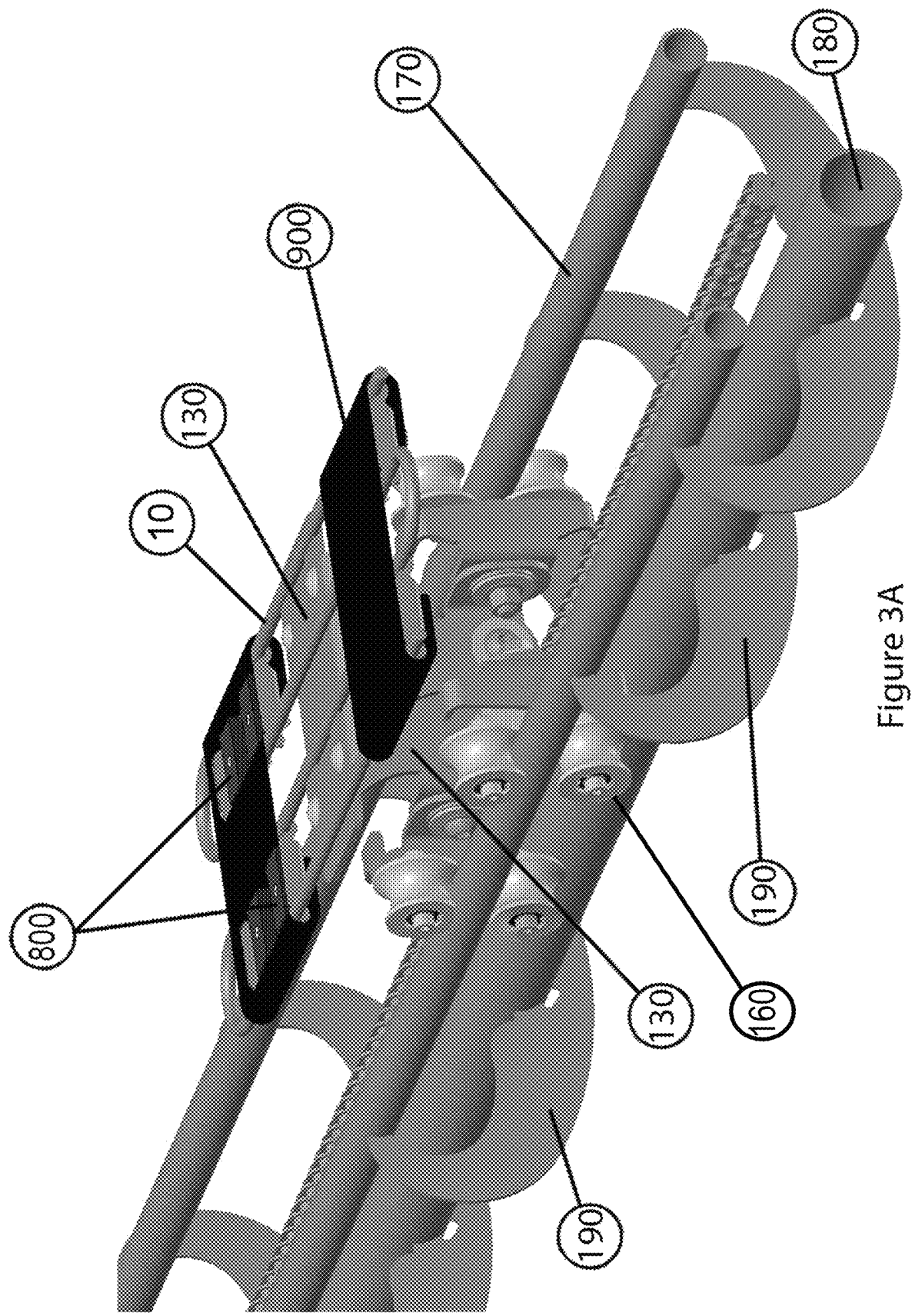
FIG. 3A shows an isometric view of an exemplary embodiment of a magnetic carriage of the exemplary embodiment of FIG. 1.

FIG. 1 shows an isometric view of the instant invention. Pans 100 come to the invention from an infeed conveyor (not shown) onto the indexing conveyor 600 so that all pans 100 can be properly spaced so as to be centered onto the magnetic support carriage 700 which will carry and transport the pan 100 through the various aspects of an exemplary embodiment of the invention in an exemplary order of cleaning subsystems so as to have the pans substantially inverted, brushed through one or more stages and/or types of cleaning brushes, then using compressed air in an airknife blown off to remove any remaining clinging debris and then either returned to upright or fully inverted to suit the next portion of the operation. Power transmission to the pan cleaning system 1 is accomplished, by, but certainly not limited, to a prime mover motor device 230, such as an electric motor coupled through a gear reduction unit in a self-contained motor gear unit, which in turn provides rotational energy to a drive shaft 240 on which is coupled to and drives a drive sprocket 250. A mechanical pulling or possibly pushing means herein indicated as a cleaning system drive element or driven element 20, which can be for instance but is certainly not limited to a side bending chain drive and is more clearly shown in FIG. 2, which allows for a pulling force to be transmitted along its length and coupled to each magnetic support carriage 700. As can be appreciated by one of ordinary skill in the art, other power transmission elements, such as but not limited to timing belts, cabling with attachments, additional chains, and the like can perform a similar function without departing from the novelty of the invention.

Drive sprocket 250 is attached and takes the rotational energy of the gear motor 230 and produces the needed tension forces in the cleaning system drive element 20 so as to pull or push the magnetic support carriages 700 with pans 100 through the instant invention. The movement is transmitted through the coupling of the cleaning drive system element 20 to the magnetic support carriage 700, as further described in relation to FIG. 3C below. Furthermore, though reference is made to an exemplary embodiment utilizing magnetic support carriages and conveyors, the invention can utilize non-magnetic, mechanical, suction, electro-magnetic, and similar fixative methods and devices to retain the pan 100 in the invention.

As pans are removed from the baking operations to be provided to the pan cleaning system 1, the pans 100 are fed to the pan cleaning system 1. The pans are supplied and their entry into the pan cleaning system 1 is governed by index conveyor 600. The index conveyor 600 is magnetic and retains the pan 100 in place awaiting indexing. The index conveyor 600 holds the pans 100 so as to be able to move or travel and thereby inject pans 100 so they are placed and centered on magnetic carriages 700.

The magnetic support carriage 700 carrying the pan 100 is subject to both forward movement from conveyor drive element 20 which is driven by prime mover motor device 230 on drive shaft 240 at the operational speed set for the machine as well as rotational movement as shown in the figure and further shown in FIGS. 2 through 10B whereby the pan 100 is rotated as it follows conveyor track members 170. The indexing conveyor 600 is synchronized to center the pans 100 received with the magnetic support carriages 700 movement. The magnetic support carriage 700 circulates the pans 100 through the pan cleaning system 1. The magnetic support carriages 700 are continuously moved within the pan cleaning system 1 and spaced to correctly sequence each pan 100 in the cleaning section 270 for interaction with the cleaning subsystems therein.

The cleaning section 270 has an entrance 280 and a number of cleaning subsystems 3000, 5000, 7000 therein as further enumerated herein in FIGS. 5A-10C. As the magnetic support carriage 700 with pan 100 magnetically coupled approaches the cleaning section 270 the first of an at least one partial rotation of the pan 100 is conducted as shown. In this non-limiting exemplary embodiment the magnetic support carriage 700 and the pan 100 attached thereto executes a first rotation about the minor axis of the pan 100 as the major axis of the pan remains perpendicular to the track locally, e.g. relatively flat, effectively providing a rotation or partial rotation relative to the vertical of the machine up to a minimum of making the pan incline to be perpendicular relative to the machine vertical to achieve a more advantageous cleaning orientation that uses gravity to assist in removal of debris. The track members 170 and magnetic support carriage 700 then reverse the travel about the axes of pan 100 to return to its orientation at entrance.

Though a second rotation is shown, this can be omitted or additional full or partial rotations may be executed by the carriage without departing from the spirit of the invention. Specifically, if the operation following the pan cleaning system 1 requires the orientation to be reversed, in for instance but certainly not limited to, a pan stacking operation, the pan 100 may simply be left in the original orientation and no further rotation provided. Similarly, though the pan 100 in the exemplary embodiment is rotated so that it is inverted in the exemplary embodiment shown, it should be understood that the system can rotate to any angle such that the rotation is complimentary to the cleaning process. That is an angle that is less than substantially inverted, as a further non-limiting example, a rotation to one hundred and thirty five degrees from the starting orientation for instance, can afford similar beneficial effects for using gravity to aid in removal of debris.

Moreover, the disclosure of the instant invention having modular cleaning stations is illustrative in that the invention specifically contemplates the modular nature of these elements and the customization of the use, order and operation of the cleaning system can therefore be changed without diminishment of the unique nature of the overall system as compared with the existing fixed device prior art systems. The modular aspects may be varied without departing from the invention and those subsystems 3000, 5000, 7000 shown are illustrative, non-limiting examples. Additional, commercially available subsystems can be utilized alone or together with the invention on the swing arms as provided without detracting from the novelty of the overall pan cleaning system in and of itself. Similarly the pan may be rotated or moved about the track to fit the particular configuration of a cleaning subsystem or the particular dimensions or geometry of the pans. For example in further non-limiting exemplary embodiments sections may be hung high on the frame of the invention and a further section low and oriented opposite one another and the magnetic carriage support 700 can travel a complicated path to face each section in turn. Likewise, the invention has the flexibility of permitting the pan to come into the frame near the frame top and discharge near its bottom or conversely enter near the bottom and discharge near the top or combinations in between. The structure and complexity of the track members is only limited by the constraints of the overall size of the pan cleaning machine 1.

Returning to the exemplary embodiment shown, the pan 100 separates from the magnetic support carriage 700 as the magnet releases it onto a takeoff conveyor 1050. The magnetic support carriage 700 is re-circulated by the prime mover drive 230 in a continuous loop. The driven element 20 is looped around conveyor sprocket 210. The drive sprocket aids in returning the magnetic support carriage 700 to its starting point at the indexing conveyor 600 to again receive a pan 100 from the indexing conveyor 600. In a further embodiment shown in FIGS. 10A and 10B, a further sorting station may be utilized at the end of the line in conjunction with takeoff conveyor 1050. Again, though reference is made throughout to the exemplary embodiments and specific changes in orientation and motions, it should be understood that elements can be adjusted to suit specific variables associated with the processes ahead of and following the cleaning operation in the instant invention without departing from the spirit of the invention.

Figure 3B:
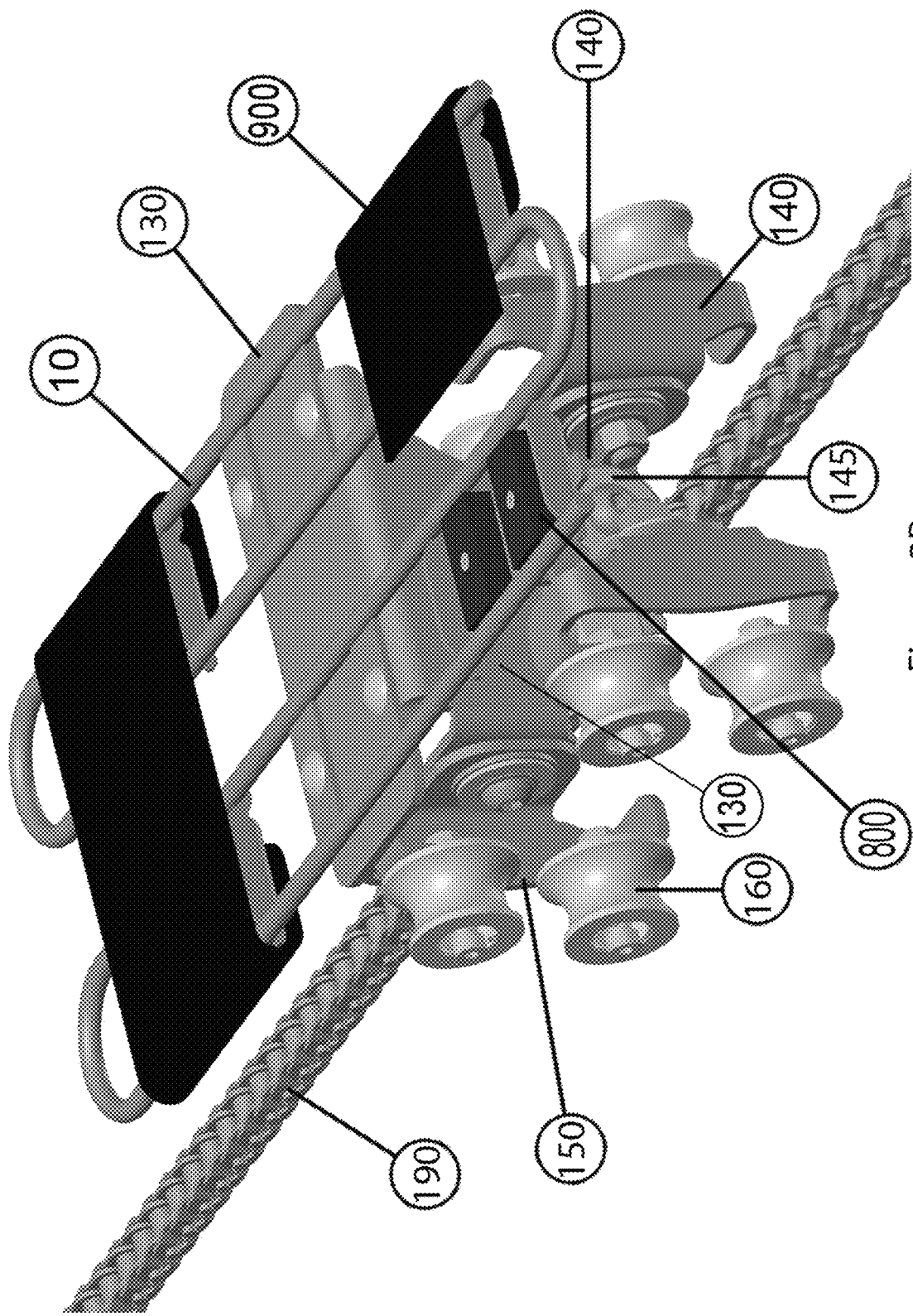
FIG. 3B shows an isometric close up view of the carriage of FIG. 3A without the track supports.

FIG. 2 shows a side cutaway view of a support carriage of the exemplary embodiment of the invention shown in FIG. 1. A set of mounted magnets 800, shown more clearly in the cutaway of gription pad 900 in FIGS. 3A and 3B, are attached to the magnetic support carriage 700 and will attract the ferrous composition of pan 100 to the magnets 800. The magnetic support carriage 700 is made up of several components which allow for magnetic adherence of pan 100 to magnetic support carriage 700. Through the use of the carriage magnets 800 which when placed in proximity to pan 100 provide a magnetic attraction of ferrous metals in pan 100 to magnets 800 and thereby magnetically couple the pan 100 to the support carriage 700. The gription pads 900 are connected to the support grid 10 by gription pad clamp plates 110 and gription pad bolts 120 as shown in greater detail in FIG. 3C.

FIG. 2 shows a side view of the magnetic support carriage 700 at or near the initial pickup by the magnetic support carriage 700 of the pan 100, though a single carriage is shown, as seen in FIG. 1 several carriages operate in the system. The magnetic support carriages 700 are mounted to the driven element 20 on an at least one principal frame member 180, here a tube rail. An additional at least one conveyor track members 170 is provided to guide the magnetic support carriage 700 and upon which it rides. In the case of the exemplary embodiment shown, a non-limiting example of the at least one conveyor track member is shown as an opposed pair of track members 170 are provided. Though the exemplary embodiment utilizes a single main support member and two guide track members, greater or lesser numbers of each can be utilized. More specifically a system utilizing a single guide and support track is contemplated as an alternative embodiment of the instant invention.

A bogie support frame 130 is provided with bogie wheels 160. The frame 130 is coupled to the bogie wheels 160 in such a way as it provides the ability to rotate and twist through a fixed or semi rigidly fixed range of constrained motion as associated with the path of the conveyor track members 170. The nature of the construction of elements of the magnetic support carriage 700 are such that an inherent spring force is provided by the sheet metal construction of the pivot plate 150, bogie support frame 130, bogie twist plate 140 and other components with bends in the construction as well as. That is in part due to the sheet metal construction having a subtle flexion or spring force in it to accommodate deviations on track width or position that are encountered by the magnetic support carriage 700, whereby the bogie wheels 160 bolted to these structure would transmit the forces from the imperfections and the material forces would flex sufficiently so as to take up the forces from such minute deviations and imperfections in track width, track surface, and similar aspects of the invention.

Thus the bogie wheels 160 are allowed to flex so as to maintain the tension of wheels 160 to the track tubes 170 as the magnetic support carriage 700 goes through the set track path. There is also gross relative motion provided for during the larger twisting motions through use of the articulating parts coupled by swiveling connectors to the bogie support frame 130. Bogie twist plate 140 is so coupled and this allows for the rotational or angular rotation of the front of the magnetic support carriage 700, as an example, during the travel of the magnetic support carriage 700 along the curving path of the track members 170. A rear pivot wheel plate 150, which allows the bogie wheels 160 to pivot, is attached to the bogie support 130 as is the bogie twist plate 140 through friction swivel members as described herein below. Bogie wheels 160 are coupled to the rear pivot wheel plate 150. The bogie support frame 130 mounts to the track members 170 through the attached bogie wheels 160 as connected by these components. This provides the means of allowing the magnetic support carriage 700 to smoothly follow the pathway of the conveyor track members 170 through the various twists and angular changes made in the system.

Between the pan 100 and the magnetic support carriage 700 is mounted an at least one gription pad 900. The gription pad 900 provides a mechanism to accommodate surface and shape imperfections in the pan 100. The gription pad 900 provides a high coefficient of friction to prevent slippage, is non-interfering with the magnetic coupling between the pan and the magnets 800, and is compressible to accommodate imperfections in the pan 100 and the bottom surface to which it is attracted. This allows for imperfections such as but not limited to the pan being warped, bent, dented, or similarly mis-configured along its bottom surface which do not have perfectly uniform flat bottom surfaces can be more securely retained. It allows the pan 100 to float on the magnetic support carriage 700 removing the need for direct contact between the pan 100 and magnetic support carriage 700 as well as increasing magnetic adhesion with the pan 100 across a larger surface area. It also allows the pans 100 to better center on the magnetic support carriage 700. By centering the pans 100 to the magnetic support carriage 700 the pans 100 will be spaced so as to have the correct separation distance. This prevents the corners of pans 100 from colliding when the twist rotation occurs as they travel along the conveyor track members 170 as seen in FIG. 1.

FIG. 3A shows an isometric view of a magnetic carriage of the exemplary embodiment of FIG. 1. Main conveyor frame members 180 and track ribs 190 are more clearly shown. The boogie wheels 160 are shown mounted on the track members 170 in an upper and lower configuration, which are sets of wheels above and below the track members. The driven element 20 is shown and it is more clearly shown that it is operating in line with the frame support member 180 in this exemplary embodiment. Gription pads 900 are also clearly shown with cutaway sections showing magnets 800.

FIG. 3B shows an isometric close up view of the carriage without the track supports. In this isometric view greater detail is provided showing the bogie twist plate 140 which is bolted with a friction swivel member 145 so as to allow restricted rotational movement about the friction swivel member 145 as between the bogie twist plate 140 and the bogie support 130. This allows for a rotational change between the bogie support frame 130, the bogie twist plate 140, and the rear pivot wheel plate 150. Magnets 800 are more clearly shown herein through a partial cutaway of gription pad 900. The gription pads 900 are shown on a support grid 10 which is coupled to the bogie support frame 130. The magnets 800 which attract the pan 100 are also more clearly shown. The magnetic support carriage 700 is coupled to the driven element 20 as better seen in FIG. 3C.

Figure 3C:
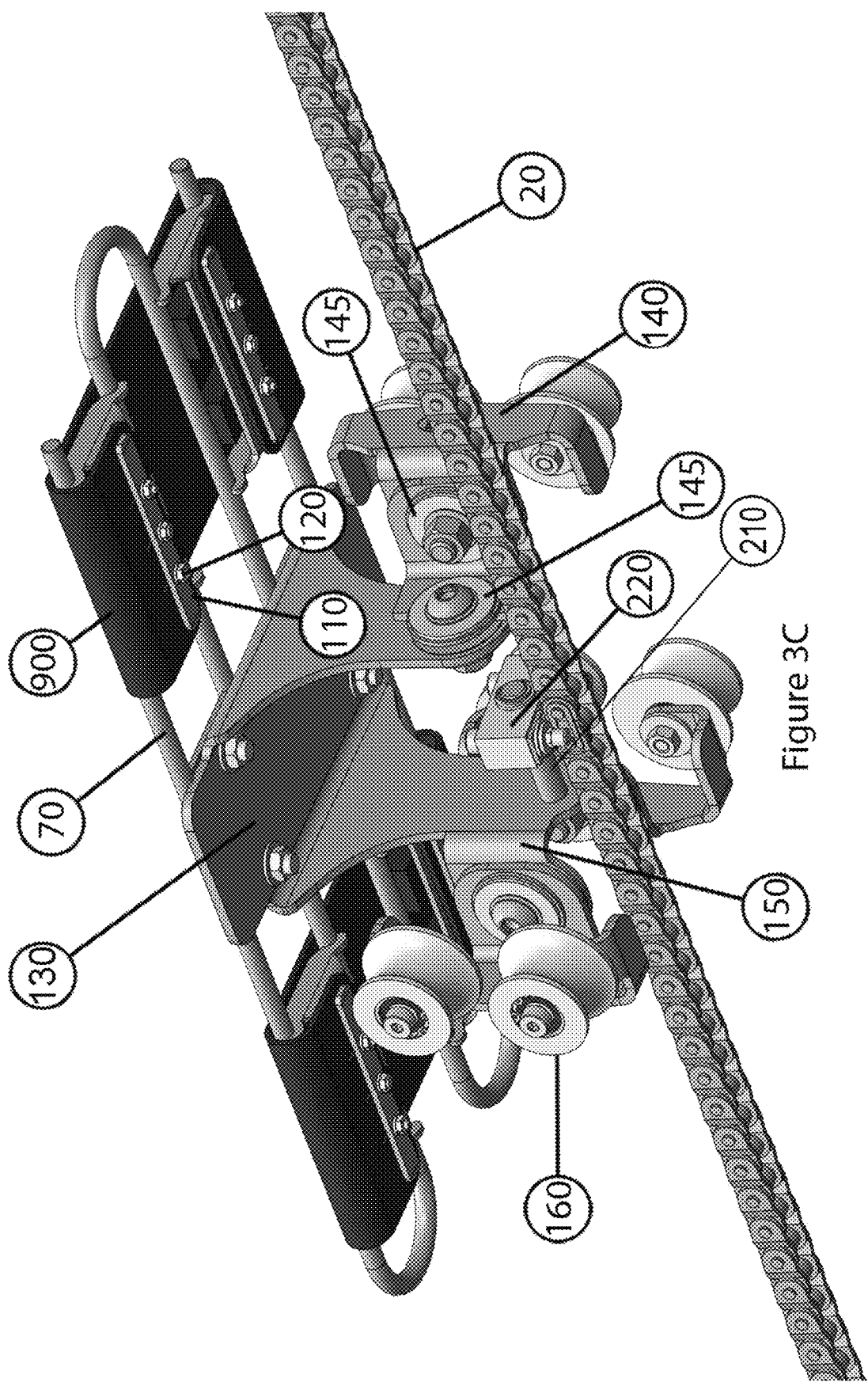
FIG. 3C shows a further isometric view of the carriage of FIG. 3B from below.

FIG. 3C shows a further isometric view of the carriage of FIG. 3B from below. Again, clearly shown are the bogie frame 140, pivot wheel plate 150, bogie wheels 160, gription pad 900, and support grid 10 as previously described. More clearly shown are the gription pad fasteners 120 and gription pad clamp plates 110 which couple the gription pad 900 to the support grid 10. The friction swivel members 145, shown as bolts with washers and fasteners, are also more clearly shown due to the removal of one set of the bogie wheels 160 in the figure.

FIG. 3C also shows the coupling for the magnetic support carriage 700 to the cleaning system driven element 20. As noted above, the cleaning system driven element 20 allows for a movement of the magnetic support carriage 700 driven by a motor gear unit 230 through sprocket 250. The cleaning system drive element 20 is attached to a lug 220 through lug swivel 210 which couples or transmits the motion imparted from the cleaning system drive element 20 through to the bogie support frame 130. Power transmission to the cleaning system drive element 20 is as described above is accomplished by a self-contained motor gear unit 230 which in turn provides rotational energy to a drive shaft 240 which on which is coupled to and which in turn drives a drive sprocket 250 which is attached and takes the rotational energy of the gear motor 230 and produces the needed tension forces so as to pull the magnetic support carriages 700 with pans 100 through the invention with the drive element 20.

FIG. 4 shows an isometric view of the track as the support carriage begins the rotation of the pan. The section of travel on the system 1 where the pans 100 with magnetic support carriage 700 on the track members 170, frame member 180 and track ribs 190 begin a curved track path where the track 170 is going to rotate the pan 100 to a significantly inverted or rotated orientation. As seen in FIG. 4, the track ribs 190 are slowly reoriented via the rotated track ribs 190A which begin to provide a smooth twist of the track members 170. The magnetic support carriage 700 with the pan 100 magnetically attached will follow the track members 170 through the twist. The bogie twist plate 140 and pivot wheel plate 150 allowing the swiveling motion of the magnetic support carriage 700 relative to the bogie wheels 160 to maintain a relatively flat orientation of the pan 100 throughout the twisting return path of the track members 170 as the bogie frame 130 and the magnetic support carriage 700 swivel to compensate.

Figure 5A:
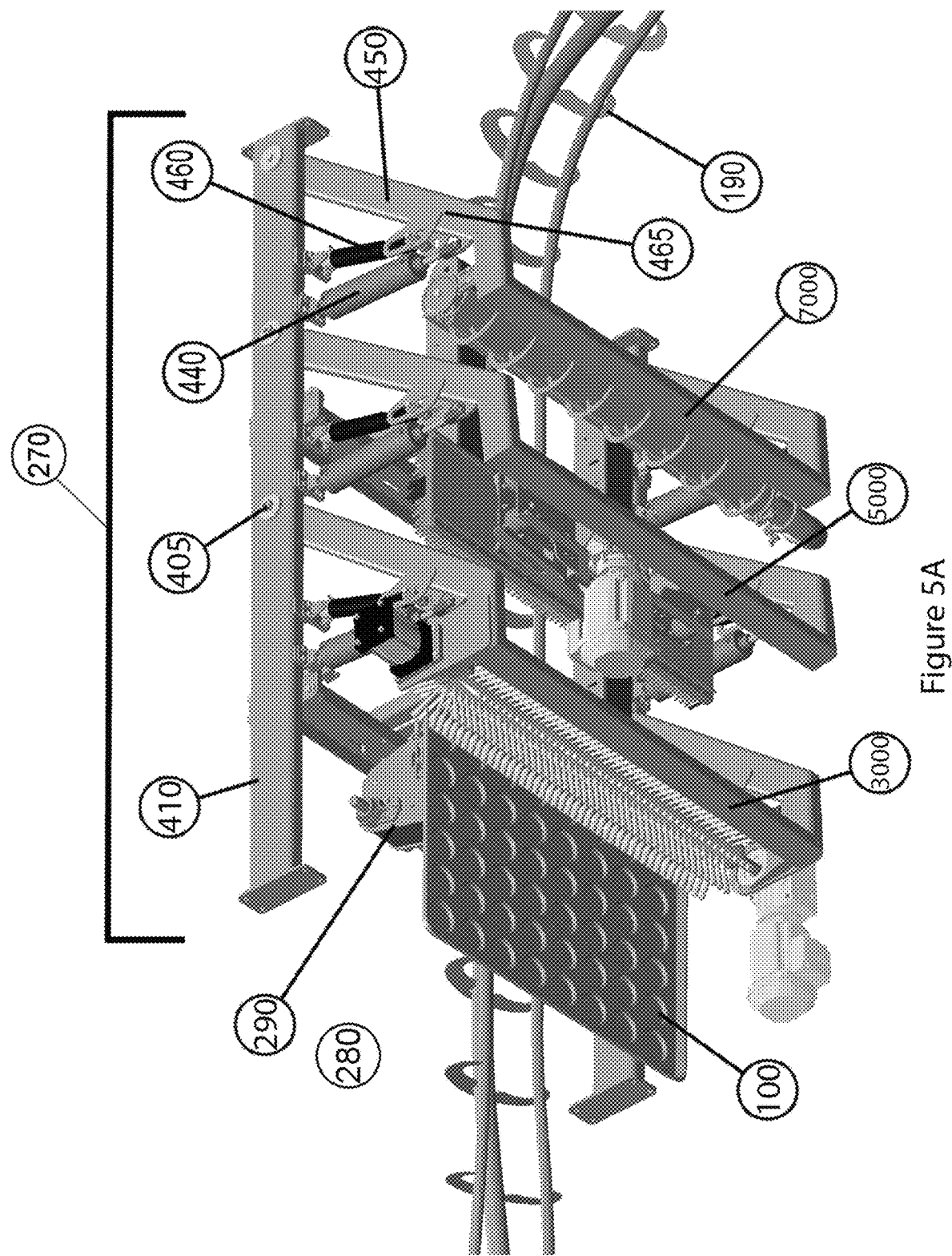
FIG. 5A shows isometric view of an exemplary embodiment of the cleaning section of an exemplary embodiment of the instant invention.

FIG. 5A shows an isometric view of an exemplary embodiment of the cleaning section. The pan 100 is shown entering the cleaning section entry 280 toward the exemplary combination of cleaning subsystems on the exemplary embodiment of the pan cleaning system 1. The exemplary embodiment of the cleaning section 270 includes horizontal cylindrical brush subsystem 3000, flat or planar brush system 5000, and an airknife subsystem 7000 coupled to a sub-frame section 410 and mounted below a secondary magnetic conveyor 290 and track members 170. As the magnetic support carriage 700 completes its rotation with the pan 100 attached as seen in the figure, the pan 100 enters the cleaning section 270 as shown.

Once in the cleaning section 270 the magnetic adhesion of the pan 100 to the magnetic support carriage 700 is complimented or added to by the introduction of a secondary magnetic conveyor 290. Secondary magnetic conveyor 290 works together with the magnetic support carriage 700 to substantially increase the mechanical hold that the pan cleaning system 1 has on the pan 100. This allows the pan 100 to maintain its connection with the magnetic support carriage 700 while being exposed to significant dislodging forces through cleaning operations. These cleaning operations can include but are certainly not limited to brushing, impinging air blasting, scraping, particle impact, and the like. The pan cleaning subsystems 3000, 5000, 7000 shown are for illustrative purposes only and further sub-components and subsystems are herein described all of which in conjunction with other existing cleaning devices can be mounted to the pan cleaning machine 1 and its swing arms 450 in accordance with the instant invention.

Each of the pan cleaning subsystems 3000, 5000, 7000 is coupled to the swing arms 450 with an actuator 440 with a swing arm position limiter 460. In this exemplary embodiment, the swing arm actuator 440 is an air cylinder which when pressurized will move and locate operating positions of the cleaning subsystems 3000, 5000, 7000 as noted herein. Using an air cylinder as the swing arm actuator 440 also allows for an adjustable degree of pressure to be exerted on the pans 100 and if there is an instance where the pans 100 are badly bent then the actuator 440 will allow for an overload condition to first exert increased pressure in the actuator to accommodate or float over the variations if they are minor and if a threshold is passed to report the condition to a controller 2500, as shown in FIG. 5B, and remove the pan from contact with the pan cleaning subsystems 3000, 5000, 7000 and pass it out as enumerated herein in a default condition.

The position limiter 460 is coupled to the swing arm 450 to set the height of the subsystem attached to the swing arm 450 above the secondary conveyor 290. One end of the position limiter 460 is fixed to the frame 410 the other is coupled to and rides in a slot in position limiter coupling 465 which is coupled to the swing arm 450. The position limiter coupling 465 allows for adjustment of the travel of the end of the position limiter 160. The position limiter coupling 465 thereby sets the minimum height of operation for the particular swing arm 450. This being the minimum height the swing arm can close to for the given cleaning subsystem.

Figure 5B:
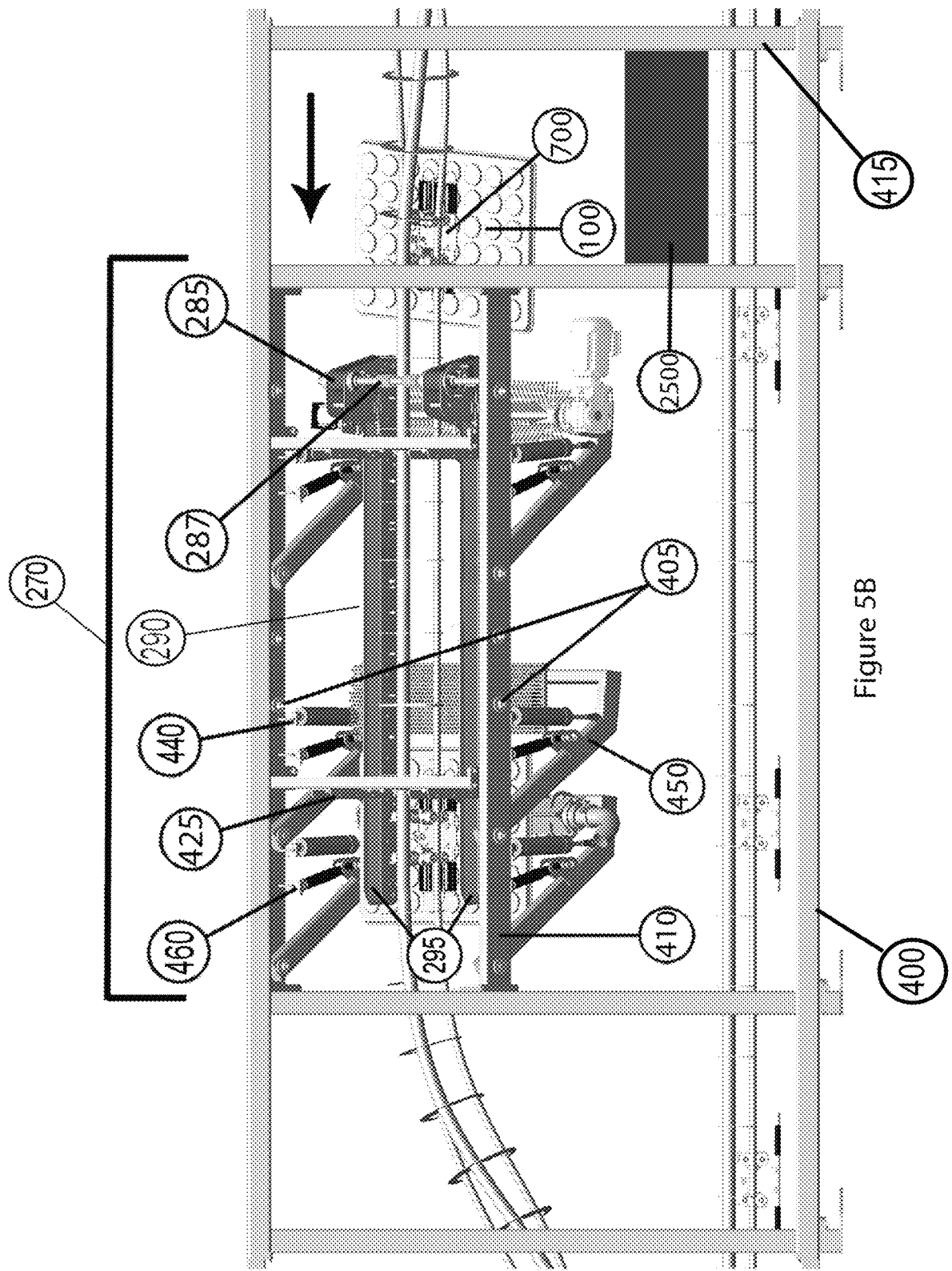
FIG. 5B shows a side view from the back of the exemplary embodiment of the instant invention.

The pan cleaning subsystems 3000, 5000, 7000 are also coupled to and communicate with a controller 2500, as better shown in FIG. 5B. As detailed herein below, the swing arms 450 hold each subsystem at an operating distance as set by the position limiter 460 and data is communicated from the controller 2500 to the actuator 450 and the position limiter 460 to adjust for the particular subsystem and operation, e.g. pan size, pan shape, and similar variables. A Hall Effect encoder (not shown) or similar sensor is provided on the position limiter 460 and is used to provide feedback information to the controller 2500 on the position limiter 460. This information is provided to the controller 2500 indicating the location of position limiter 460. The pressure on each swing arm 450 is monitored by the controller 2500 through sensors (not shown) in communication with the swing arm actuator 440. In the exemplary embodiment, in a non-limiting example, the swing arm actuator 440 is an air cylinder, as noted above, and pressure management is provided through and monitored by an electronically controlled regulator (not shown) in communication with the controller 2500. In this fashion, in the exemplary embodiment, the controller 2500 communicates with and controls air pressure in each of the swing arm actuators 440 and thereby the movement of the swing arm 450. Similar sensors can be provided to suit the type of actuator 440 that is utilized, which can include for instance servo motors, hydraulic cylinders, or similar actuators and appropriate sensors to control the pressures exerted by on the pans 100 and the movement of the swing arm 450.

The controller 2500 and the reported pressures allow operation of the device in a programmed range of pressures, as noted above. If, while monitoring such pressures, the pressure exceeds the range, the nature of the excess pressure or overload condition can be an indicator of a jammed pan or of a misconfigured/bent pan. The controller 2500 can act to first exert increased pressure in the actuator to accommodate or float over the variations if they are minor, as noted above. Additionally, if a threshold is passed it can stop the line and report the condition to the controller 2500 and remove the pan from contact with the pan cleaning subsystems 3000, 5000, 7000 and pass it out as enumerated herein in a default condition. Alternatively, if can pass the individual pan and continue operation and notify and operator. Similarly, it can move the swing arms to an open position raised away from the secondary conveyor for maintenance in a similar fashion and shut the line down as noted above.

This information together with sensors on or as components of the cleaning subsystems 3000, 5000, 7000 monitor operations and the height of the subsystem above the secondary conveyor 290 as set. The position limiter 460 and these sensors work in conjunction with controller 2500 and the pan cleaning subsystems 3000, 5000, 7000 to operate and clean the pan 100. Additional sensors, for instance an accelerometer (not shown) on the planar brush system 7000 feed additional data to the controller during operations. If a default condition is sensed such that too high a pressure is seen in the swing arm 450 or other abnormal conditions in the subsystems sensors 3000, 5000, 7000 are detected and the pan 100 is in jeopardy of being wedged or stuck or otherwise threatening to overload the pan cleaning system 1, the controller 2500 can be alerted and a default condition to remove the pan from cleaning subsystems 3000, 5000, 7000 to their maximum height and allow the problem causing pan to pass through the pan cleaning system 1 untouched. If a pan sorting system like that shown in FIGS. 10A and 10B is coupled to the controller, the problem pan can be diverted out of service.

FIG. 5B shows a side view from the back of the exemplary embodiment of the instant invention. As seen in the Figure, the pan 100 is traveling from the right side of the figure to the left, as indicated by the directional arrow, as it is a rear view of the pan cleaning system 1. The secondary magnetic conveyor 290 is mounted via a secondary conveyor frame or a cleaning section sub-frame 410 which is coupled to the principal cleaning section frame 400. It being understood as a modular construction that additional principal and secondary frames can be added to expand the length of the system. The secondary magnetic conveyor 290 has at least one secondary magnetic conveyor element 295, which in the case of the exemplary embodiment shown comprises two such elements. The secondary magnetic conveyor further comprises, but is not limited to, a motor with gear reducer contained in a single unit 285, is provided and which drives the at least one secondary magnetic conveyor elements 295 through a secondary conveyor drive shaft 287.

The secondary conveyor drive shaft is coupled to a pulley (not shown) which has a positive drive profile to suit the use of typical timing belt. The timing belt is synchronized either through gross motion or surface speed with the magnetic support carriage 700 so as to assist in travel and adherence of pans 100 for the duration of the travel of the pan 100 through the cleaning section 270. Alternatively, in another exemplary embodiment it is contemplated that the secondary magnetic conveyor 290 can be mounted by an adjustable mechanism or swing arms of its own (not shown) to additionally adjust the location of the secondary magnetic conveyor element 295 relative to the pan cleaning subsystems 3000, 5000, 7000.

The cleaning section 270 has its own cleaning section sub-frame 410 from which all of the cleaning elements are attached via swing arms 450. All cleaning devices are affixed and operate from an at least one set of swing arms 450, as noted above, that are affixed to the cleaning section sub-frame 410 in a rotatable fashion with swing arm actuator 440 pivoting the swing arm 450 and a position limiter 460 in communication with controller 2500. Each swing arm 450 is coupled at a swing arm pivot point 405 with an at least one swing arm actuator 440 such that it will be activated by the controller 2500 so that it will extend so as to open the swing arm 450 about its swing arm pivot 405 so that it moves toward or away from the secondary magnetic conveyor 290 with pan conveyor tracks 295. The swing arms 450 provide a means for attachment of all cleaning subsystems to be used for cleaning of the pans 100 in the exemplary embodiment of the pan cleaning machine 1 and are expandable as well as open via the open frame architecture for easy maintenance and cleaning. This includes attachment at the swing arm by releasable connectors so as to more easily release the cleaning subsystems for replacement tor maintenance.

For instance, when the invention is programmed at the controller or locally in a cleaning subsystem to change a brush or when an operator wants to open up the cleaning device, the swing arm actuator 440 will be activated so that it will extend or retract so as to open the swing arm 450 about its swing arm pivot 405 so that it moves away from the secondary conveyor 290, pan conveyor tracks 170, and conveyor frame 180 to provide access. The closed frame embodiments of prior art devices do not permit such ease of access. In the case of an overload condition, it signals for retraction of the swing arm 450 via the controller 2500 until the badly bent pan has exited or is removed. In this way a fault arises, for example in any of the subsystems 3000, 5000, 7000 as well as sensed at the more global level, the instant invention can respond and clear itself through the operation of the swing arms 450.

The movement of swing arm 450 allows the pan cleaning subsystems 3000, 5000, 7000 to be retracted from and extended to a preset or adjustable distance from the secondary conveyor 290 as controlled by controller 2500. When swung away for maintenance the cleaning pan cleaning subsystems 3000, 5000, 7000 will be accessible for service such as but not limited to changing of brush elements, cleaning the airknife and other associated maintenance processes. This swing arm system 450 is common to all cleaning subsystems located on this invention where presently can be seen three examples but this is not a limitation on the number of cleaning devices that can be used and the additional swing arm pivots 405 are indicative of this modularity, flexibility and expandability in design. As previously stated this can include the addition of additional cleaning subsystems or devices or multiples of the cleaning devices shown such that duplication would permit continuous operation of the system. For instance one subsystem could be idled and rotated to an easily accessible position for upkeep or maintenance while the other engages the pans in a further exemplary embodiment of the invention. Similarly, a rotating carousel or paddle wheel sub-frame or device can be used to provide multiple brush heads that can be similarly swapped out by rotation in between the swing arms as described in FIG. 6B. As noted, each of the swing arms can releasably couple the respective subsystem to the swing arm through a releasable connector such that the subsystem can be removed or in the example of the carousel subsystem elements can be replaced as needed.

Controller 2500 is shown as a specialized controller which can include but is certainly not limited to multiple programmable logic controllers on a bus or board with memory storage devices and active or operational memory to execute control algorithms on numerous subsystems as well as receive output from sensors on those systems or send input to those systems as part of a control program to effectuate operation of the pan cleaning system 1 as described. This can include but is not limited to operating a pan sorting station in conjunction with a machine vision device as described herein in relation to FIGS. 10A and 10B, operating the cleaning subsystems 3000, 5000, 7000, as substantially shown and described herein, providing a hierarchical programming structure or operating code to add additional devices and operate these devices either as a part of its software or through additional hardware, and to provide user input to the pan cleaning system 1. This can include a user input device, such as but certainly not limited to a touch screen or similar input.

The pan cleaning machine 1 of the instant invention also allows for easier removal, addition, or substitution of cleaning subsystems. The swing arm 450 allows for swinging out of the cleaning subsystems 3000, 5000, 7000 so as to allow for exchange/replacement of brushes, air knives, or addition or removal of any other devices or complete subsystems to be utilized on the pan cleaning machine 1. If adding subsystems, additional swing arms 450 can be provided on additional pivot points 405 as shown. The modular pivot points also permit spacing adjustment to accommodate a wider variety of devices than the prior art.

Similarly, as noted above, additional frame components may be attached to the principal frame 400 similar to sub-frame 410 to further expand the system. Likewise, the principal frame 400 can be produced at a larger scale to accommodate longer or higher combinations of subsystems, the pan cleaning system of the instant invention is modular and flexible. This modular nature of this setup of the cleaning section 270 within the frames 400, 415 of the system affords the instant invention great advantages over the existing prior art pan cleaners and is heretofore unknown in the industry. That is by mounting with more easily accessible connectors the cleaning subsystems, swing arm pivots and the swing arms in the cleaning section 270 can be more easily customized to suit the needs of the customer for particular pans being sent for cleaning and the cleaning section 270 itself can be made to provide for additional cleaning devices and customization of the devices.

Additionally with these replaceable elements in this open frame modular architecture permit rapid changes of the type and nature and action of the brushes and other cleaning devices. These changes can be made and adjusted to suit the specifications of the operator and the cleaning operation allowing for unparalleled customizability and flexibility in operations without hampering performance or efficiency of the machine or production of the baking operation. Additionally, several improvements accompany this disclosure as to the pan cleaning subsystems 3000, 5000, 7000 and reference is made herein below to these exemplary embodiments of the subsystems.

Figure 6A:
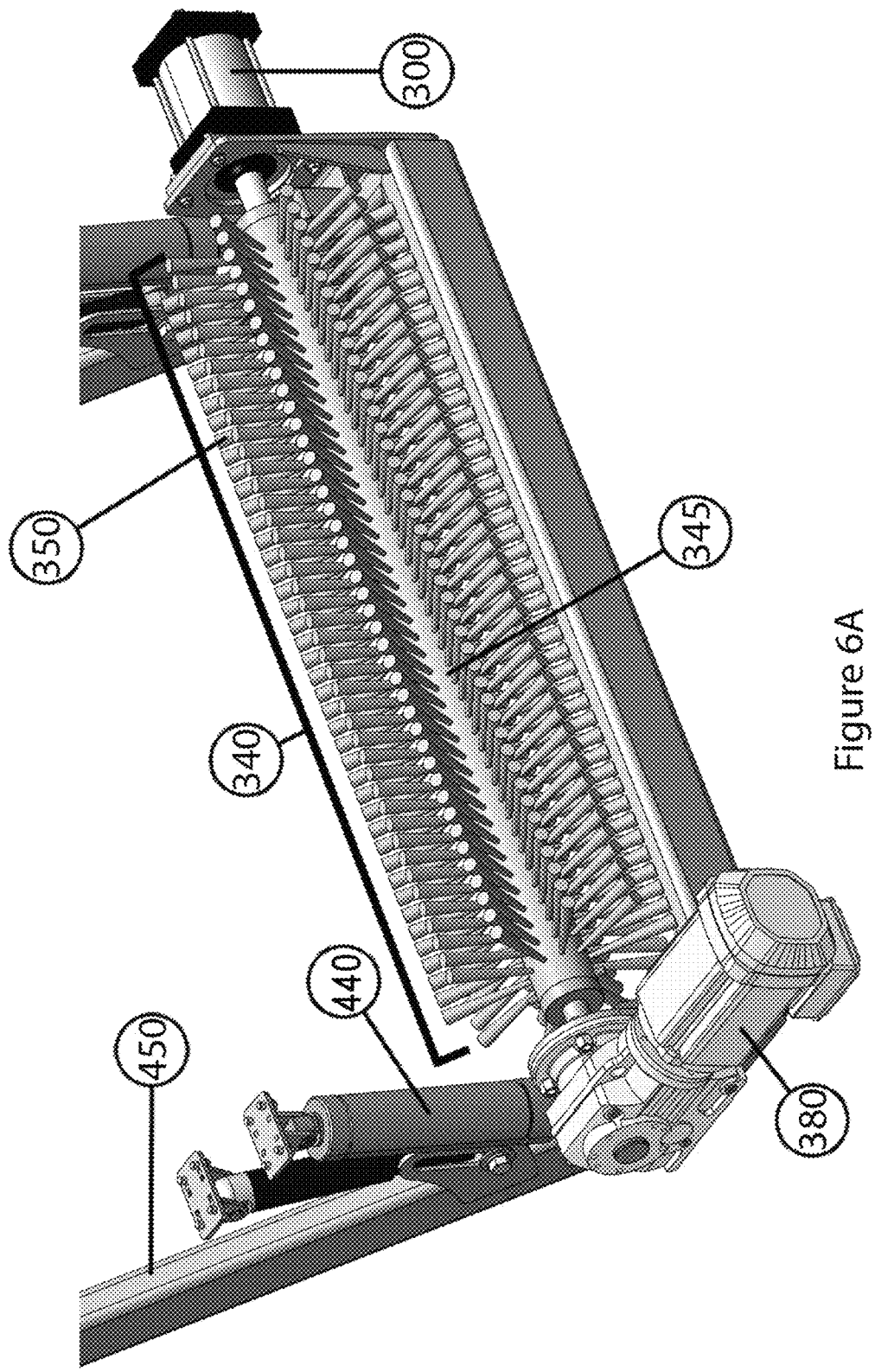
FIG. 6A shows an isometric view of an exemplary embodiment of the rotating cylindrical brush subsystem of FIG. 5A.

FIG. 6A shows an isometric view of a straight, spinning, brush cleaning sub-component in the exemplary embodiment of FIG. 5A. In the exemplary embodiment shown in FIG. 5A, the first stage of the cleaning section for the pans 100 comprises a rotating horizontal cylindrical brush sub-system 3000 having a rotating cylindrical brush 340 which has radially extending bristles 350. The horizontal rotating cylindrical brush 340 is horizontal relative to the plane of the pan 100 as conveyed. An exemplary embodiment of the sub-component cylindrical brush 340 is held on a center hollow brush shaft 345 coupled to the drive motor 380. In this exemplary embodiment, this setup is provided so that when a pan 100 comes into the cleaning section 270 removal of any large items such as but not limited to loosely adhering product or improperly or not depanned, e.g., stuck products or toppings. These large items should be removed before detailed cleaning is to take place so this stage employs the rotating cylindrical brush 340 to knock the adhering product loose. This embodiment of the cylindrical brush 340 however allows for rapid replacement of the brush head as enumerated herein below.

Figure 6B:
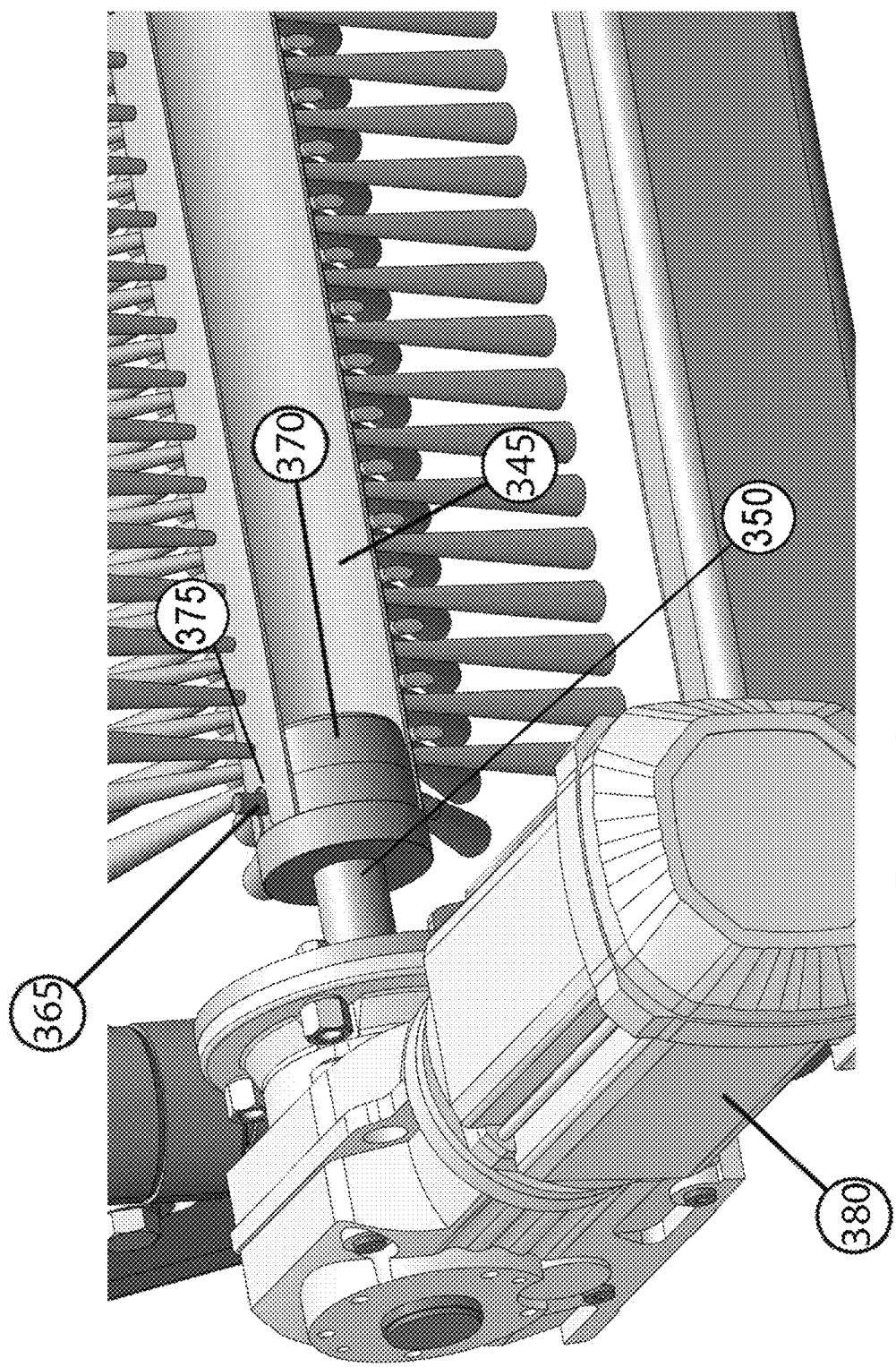
FIG. 6B is a close up of the cylindrical brush of FIG. 6A with a cutout showing an exemplary embodiment of a quick change drive coupling.

FIG. 6B is a close up of the cylindrical brush of FIG. 6A with a cutout showing an exemplary embodiment of a quick change drive coupling. The Figure shows the cylindrical brush 340 supported by and mounted to the drive coupling 370. The brush 340 has a hollow shaft 345 either partially hollow or hollow throughout the length of the shaft. A brush drive 380 is provided for turning the brush 340. The brush drive 380 is coupled to and drives a drive shaft 350 which is further coupled to the drive coupling 370. The drive coupling has a support portion and an end cap section. The drive coupling 370 extends into the hollow interior hollow shaft 345 of the brush 340.

A drive addendum 365 extends from the support portion and is indexed with and is releasably coupled into a drive dedendum 375 herein shown as being in the wall of hollow shaft 345. It should be noted that the male and female addendum and dedendum can be mirrored or multiple such elements provided and such designs are explicitly contemplated but for the sake of brevity are not shown. To further facilitate the modular nature of the instant invention, a novel way to allow these cylindrical brushes to be removed and installed is provided. This release system no longer requires the use of threaded fasteners. The lack of threaded connectors allows for a significant time reduction in the time required to change existing brush configurations. Additionally, though not show, a swing out body or carousel may be provided which allows multiple brush heads 340 to be placed on the subsystem and in a carousel frame indexed so that one may be moved out of service and be accessed for replacement for instance. Turning back to the exemplary embodiment shown, by having the cylindrical brush 340 on a drive end coupling 370 and the idler end coupling 300 on a retractable mechanical drive 310, as further highlighted in FIG. 6D, moving the system into an open position allows the cylindrical brush to be removed and replaced in seconds rather than hours and without the need for tools.

Figure 6C:
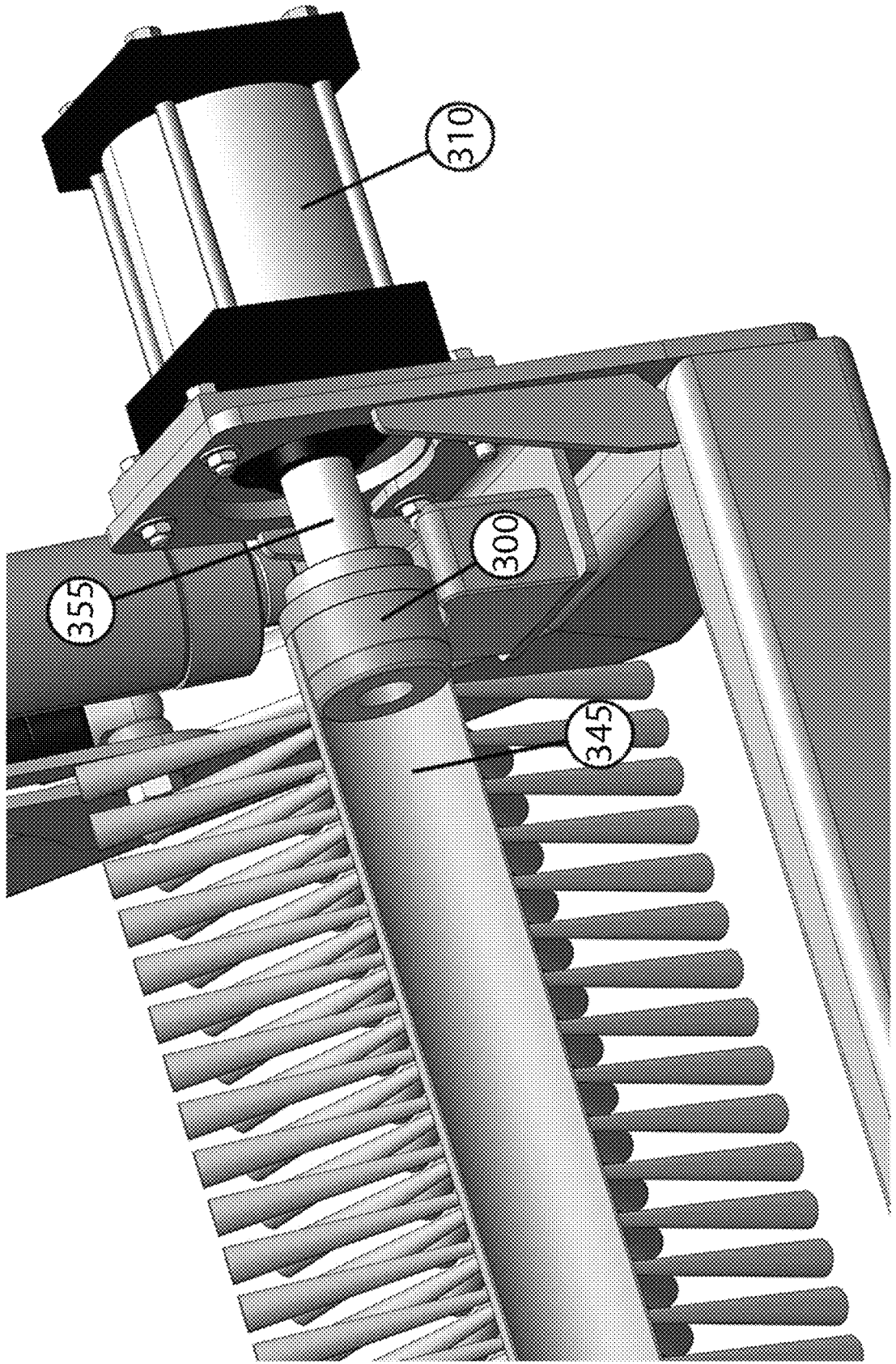
FIG. 6C showing the opposed end of the cylindrical brush of FIG. 6B in a closed position.

FIG. 6C showing the opposed end of the cylindrical brush of FIG. 6B in a closed position. The opposed end of the brush 340 is shown closed, that is the hollow shaft 345 of the brush 340 has the idler coupling 300 inserted therein. The brush support shaft 355 is mounted to an idler coupling 300 which supports the brush 340.

The idler coupling 300 is further coupled to a locating actuator 310 which allows for the idler coupling 300 to be inserted and removed from the hollow portion 345 of the brush 340. In an exemplary embodiment the actuator 310 can be for instance be, but is certainly not limited to, an actuating air cylinder. This actuator 310, here an air cylinder, is used as a means of actuation but it can be understood that other means of movement and or actuation can be utilized without departing from the intent of the invention. The idler coupling 300 supports the brush 340 by extending into the hollow shaft 345. The idler coupling 300 rotates freely and allows for the free rotation of the brush 340. Simultaneously, when the idler coupling 300 is moved into the open position, the brush becomes free of the mounts and is easily removed.

Figure 6D:
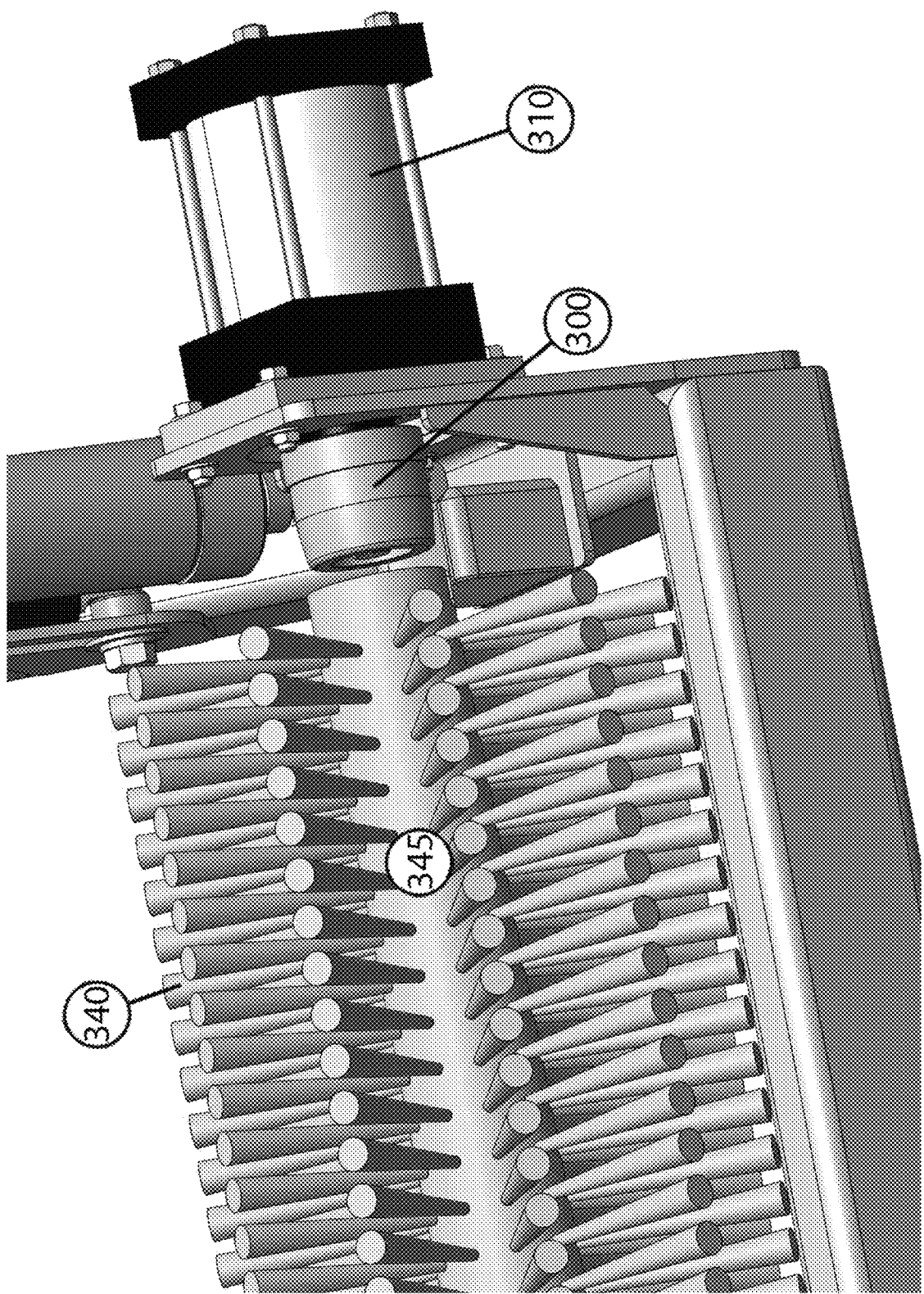
FIG. 6D showing the opposed end of the cylindrical brush of FIG. 6B in an open position.

FIG. 6D shows the opposed end of the cylindrical brush of FIG. 6B in an open position. The cylindrical brush 340 in the open position. In this position the actuator 310 is retracted and the idler coupling 300 is disengaged from the brush 340 and outside the hollow shaft 345. When clamped in position as shown in FIG. 5C, the idler coupling 300 is pushed into the hollow shaft. When the brush 340 needs to be removed the clamping force is removed by the actuator 310 by its movement along the actuator shaft 355 shown here as being retracted into the actuator 310. This frees the brush shaft 345 on the idler 300 end and permits the addendum 365 to be disengaged from the dedendum 375. Thus by activating actuator 310 this subsystem allows for greatly enhanced change over speed for replacing the brush unit 340 where changeover or removal and replacement goes from several hours for prior art designs to less than one minute for the improved version of the exemplary embodiment of the instant invention.

Figure 7A:
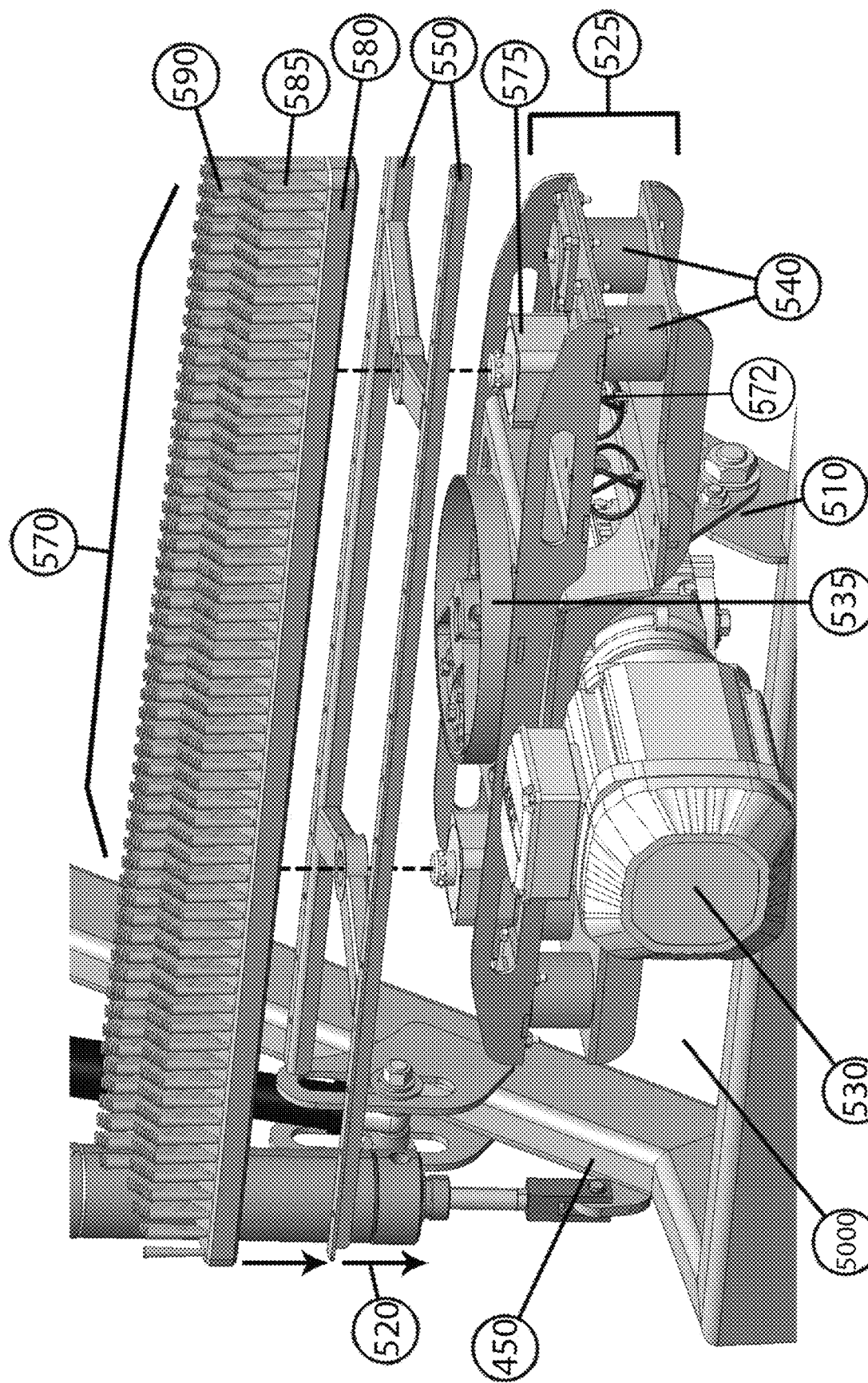
FIG. 7A shows exploded view of an exemplary embodiment of a planar brush subsystem in the exemplary embodiment of FIG. 5A.

FIG. 7A shows exploded view of an exemplary embodiment of a planar brush subsystem in the exemplary embodiment of FIG. 5A. As seen in FIG. 5A, pans 100 move from the rotating horizontal cylindrical brush subsystem 3000, in an exemplary configuration as shown in an exemplary embodiment of the invention, to an orbital, or oscillating, or orbital and oscillating flat or planar brush cleaning subsystem 5000 with a flat brush assembly 570 that has bristles 585, 590 arranged and entered into a slab of brush base 580. The planar brush subsystem 5000 subjects the pan 100 to additional cleaning using higher, longer, taller bristles to scrub the pan 100 surface with sufficient contact pressure and a compound elliptical scrubbing motion. A further exemplary embodiment of the brush subcomponent of this subsystem pictured in FIG. 7A with specifically angled bristles relative to this motion is further substantially disclosed in FIGS. 8A-8C herein below. FIG. 7A shows an exploded view of the planar brush subsystem 5000 whereby the brush base 580 with bristles 585, 590 is shown detached from brush mounting frame 550.

The planar brush subsystem 5000 is mounted to the swing arm 450 at coupling 510 and is further coupled to an oscillating assembly 525 through attachment at quick attachment posts 575. The oscillating assembly 525 includes an oscillating drive motor 530 driving a rotary element 535 which is driven in an orbiting fashion in the plane of the planar brush 570. As better shown in FIG. 8E, the combination of the motion of pan 100 and the orbital motion of the brush 570 imparted by the rotary element 535 that provides a compound elliptical scrubbing motion that is both orbital and oscillating across the surface of the pan 100. The oscillating assembly 525 further includes dampening and counterweight members 540 to dampen any vibratory motions from the rotary element 535.

As indicated generally at 520 the planar brush subsystem 5000 of the invention can be raised and lowered from the frame 410. As previously described, control inputs communicated from controller 2500 work with the swing arm 450 and swing arm actuator 440 to position the planar brush subsystem 5000 during operation. That is the actuator 440 is used to move the swing arm according to the programmed values or inputs from a user interface at the controller 2500 for each subsystem 3000, 5000, 7000 attached to the swing arm 450 and working on the pan 100 being conveyed on the secondary conveyor 290. This view also shows how the brush 570 may be disassembled or removed for cleaning and service with quick release mechanism 575.

A more defined or specific cleaning process and action can be achieved with the instant invention using the planar brush subsystem 5000 shown and the orientation of the pan 100 in the at least partially inverted orientation and with the height adjustment afforded by the swing arms 450 through the motion indicated at 520. The plane brush 570 has a flat plane of a width sufficient to clean the approaching cross axis length of the pan 100 so that as the pan 100 passes over brush bristles 580 the brush will provide coverage over the entire pan surface. By using a flat plane brush 520 with a width sufficient to cover the entirety of the width of pan 100, the flat plane brush is always in contact with the pan 100 as it passes under the brush 570. Additionally the motion imparted by the rotary frame assembly 520 provides an elliptical scrubbing action across the entire width of the pan 100. This is distinguished from typical pan cleaning substations using cylindrical brushes that have defined paths that do not fit the entire width of the pans 100.

Figure 8A:
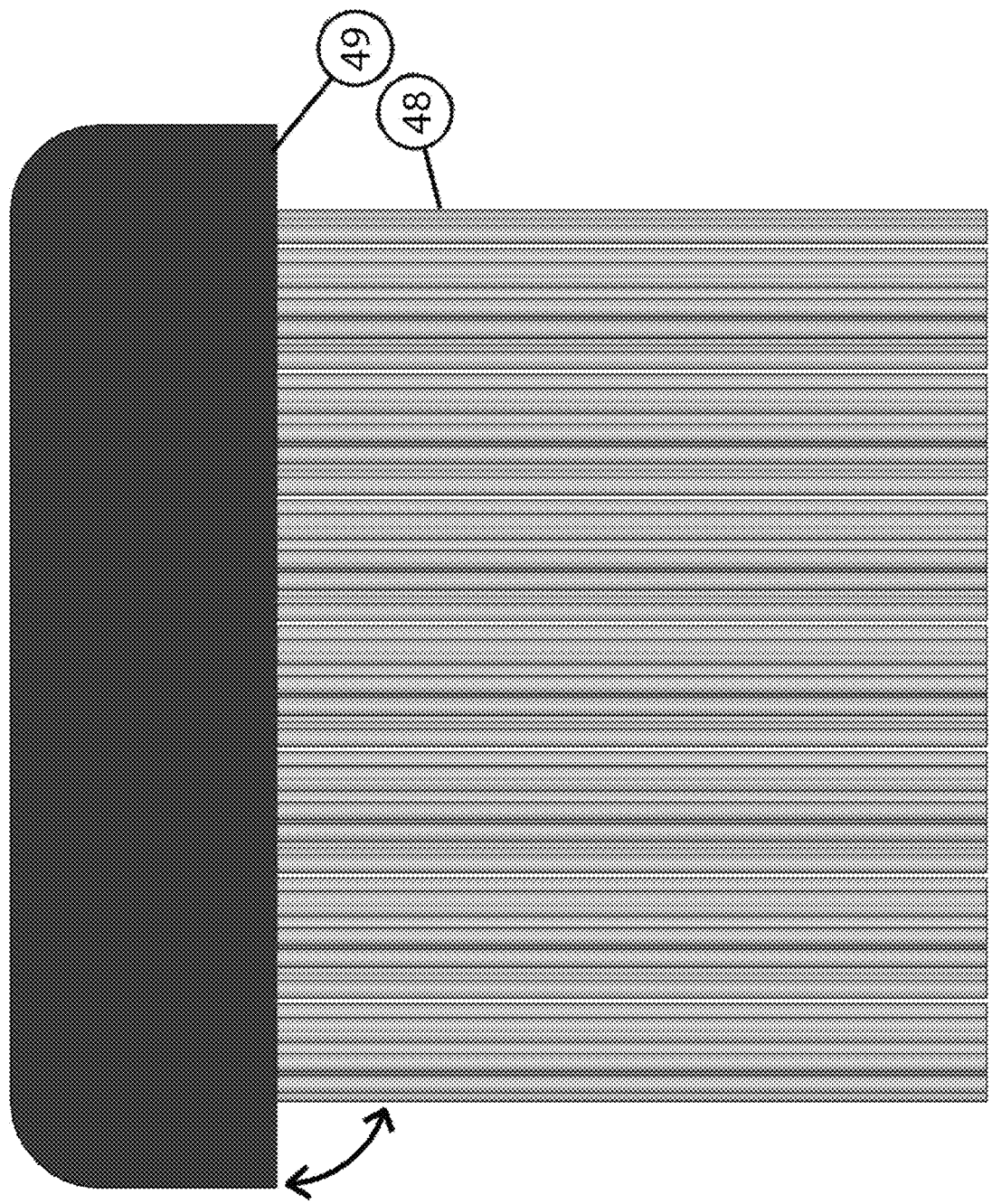
Figure 8C:
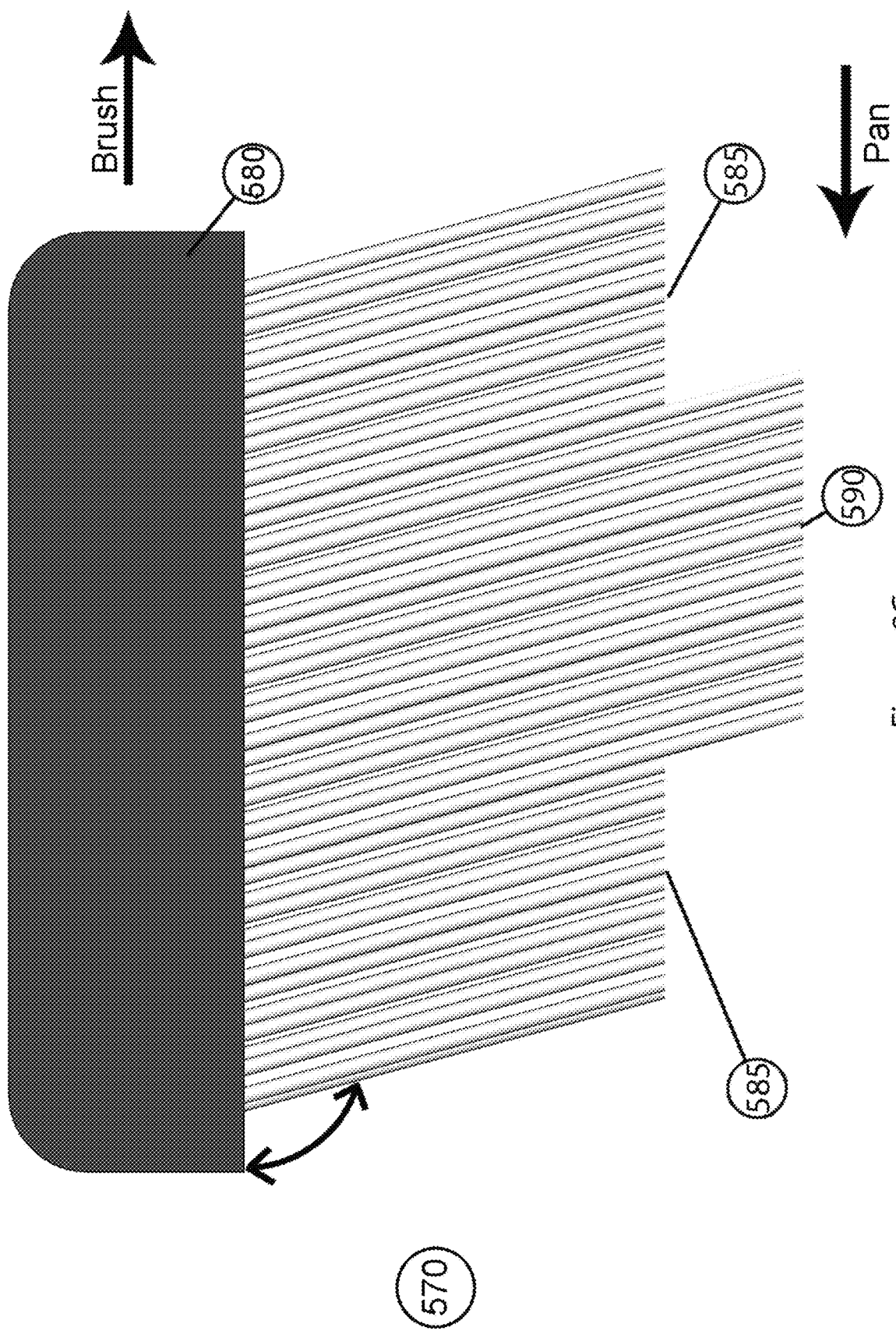

The plane brush assembly 570 has a step down brush profile, detailed in FIG. 8C, such that a row of shorter bristles 585 precedes a row of higher bristles 590 and is followed by a further row of shorter bristles 585 across the width of the brush 570. The rows of bristles in the brush 570 are also offset at an angle, as further described in relation to FIGS. 8C and 8D below, in alternating rows across the length of the brush 570, that is one row oriented to the left and the following to the right. The pan surface is engaged by the full width of the plane brush 570. The lip of the pan 40 being scrubbed by the lower row of lower bristles 585 and deflecting under greater pressure the higher row of bristles 590. The pockets or depression sections of the pan 50 being reached by the higher bristles 590 or by the lower and higher bristles 585, 590. Thus, the plane brush is in full contact with the surface of pan 100 as it is motivated across the brush 570 imparting the substantially elliptical scrubbing motion.

In prior art pan cleaners the rotating cylindrical brushes were bolted in place on fixed bearing mounts and shafts mounted in these fixed bearings so that replacement was time consuming and difficult where this work had to be typically be done only on longer periods of time when lines were out of production which meant that the brushes could get dirty a point where they would not hold what they brushed off. The plane or flat brush 570 also provides some novel aspects such as quick detaching connectors 575 which allow the flat brush 570 to be quickly and readily attached or detached for cleaning or replacement or both. This quick change aspect is not provided on prior art flat brush pan cleaners, point in fact few if any flat plane brush types have been used in pan cleaning machines. The quick attachment mechanism 575 further comprises in the exemplary embodiment, but is certainly not limited to, two quick attachment posts 577 having protruding quick attachment points 579. FIG. 8B shows a closer view of the particular attachments.

Figure 7B:
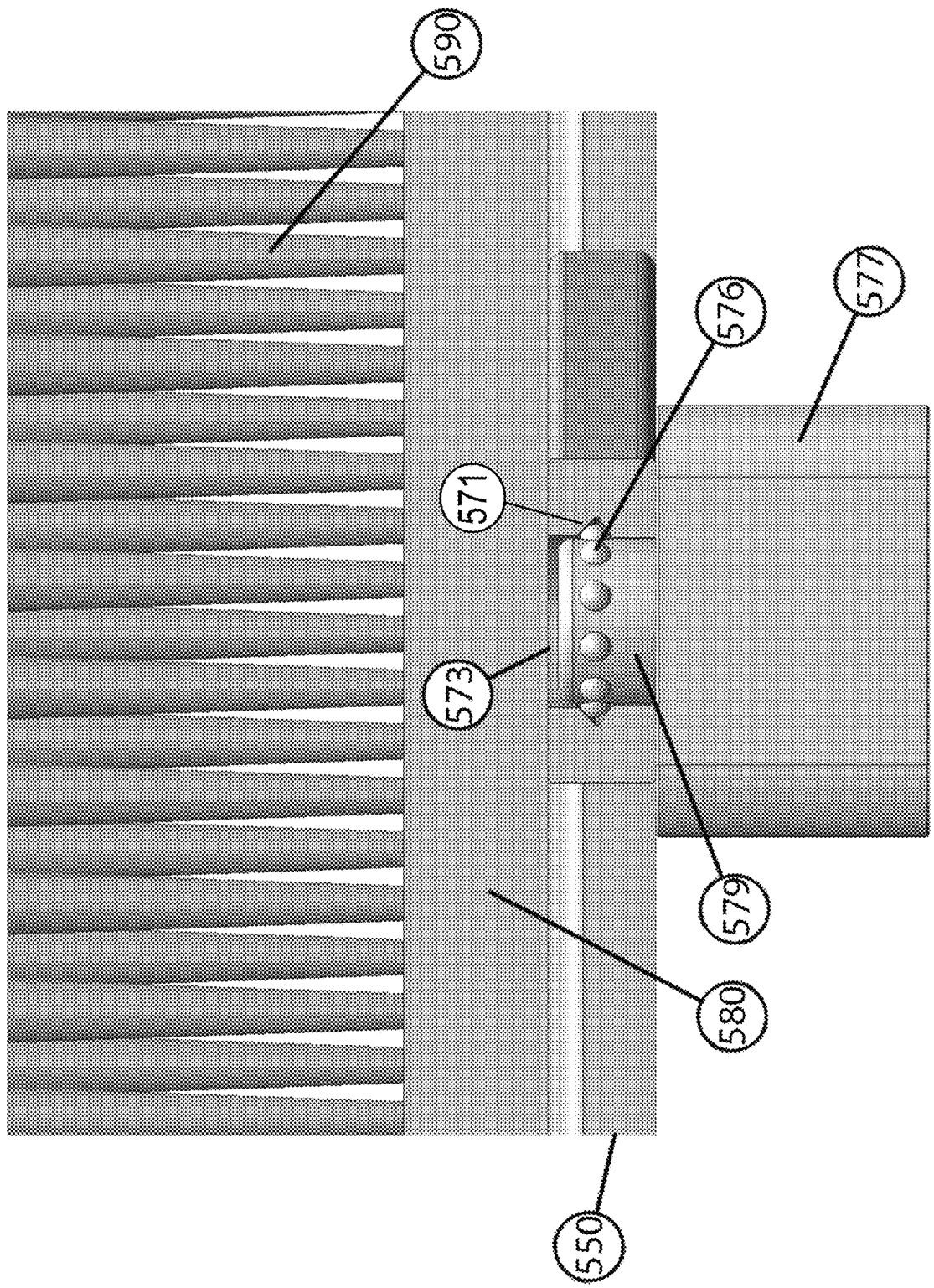
FIG. 7B shows the cut away of the quick release attachment points of the plane brush sub-component of FIG. 7A.

FIG. 7B shows the cut away of the quick release attachment points of the plane brush sub-component of FIG. 7A. The quick attachment posts or system 575 are shown with friction fit elements 571. These friction fit elements 571 being further protrusions, typically ball bearings, that are biased outward, in the exemplary embodiment by driven tapered pins (not shown). When an activator 572, here a plunger, is depressed this permits depression of the ball bearings into the attachment extensions 579 which extend from posts 577. The posts 577 have the attachment extensions 579 protruding from them and these fit into two matching cavities 573 in the frame 550. The cavities 573 in turn have detents 576 that match the friction fit elements 571. The attachment extensions 579 and posts 577 mount the base plate 580 of the brush 570. Brush 570 is fixedly mounted to frame 550. The attachment posts penetrate into the matching cavities 573. The brush is pushed over so that the cavities are engaging the post and extensions such that the friction fit elements 571 are briefly depressed and allowed to engage the detents 576 and the brush is thereby coupled.

Thus the planar brush subsystem 5000 provides for enhanced cleaning of the pans 100 as they pass through in their substantially inverted orientation and are scrubbed with the planar brush 470. The higher surface contact pressure in the planar brush subsystem 5000 provides a greater deflection of the bristles in the cleaning. Additionally, specific improvements over the prior art bristles shape is effectuated in the exemplary embodiment shown. In the prior art, when subject to increased bristle pressures, the conventional bristles would bend back from the loading of the bristle as well as motion of the bristle so that the best description of the brush bristle action would be of wiping where the bristle would be bent back so that the curved portion of the bristle would be first coming over the seed or area of the pan to be cleaned and as the brush moved it would come more over the area of cleaning and the last aspect of bristle movement would be a rubbing off aspect where the bristle is sweeping back over the surface. With the new bristle drive design the bristle is combining a degree of this previously indicated action as well as a forward pushing off or shearing action of movement. These are two of the brushing aspects that are provided as well in the planar subsystem 5000 section can be lengthened so as to include additional or differing brushing units. The exemplary embodiment uses a planar brush with rows of bristles 585, 590 that have an improved bias, as opposed to perpendicular bristle planar brushes.

FIGS. 8A and 8B show a typical perpendicular brush assembly of a planar brush. The typical brush 45 of FIG. 7A can be used in the invention however it is not as effective as the improved brush of FIGS. 8C-8D. The typical brush has base 49 and bristles 48 where the bristles are mounted perpendicular to the brush base 49. The issue with this style of brush 45 is when it is contact and under pressure, the perpendicular mounted bristles 49 deflect in the direction of travel as the brush as shown in FIG. 8B. As the bristles 48 are in compression to the pan 100, the result is the bristle 48 will have a rearward flexion before being in contact with the debris 46 and as the bristle 48 goes onto the debris 46 this angle or bristle flexion will increase, as best seen in FIG. 8B. This results in the less effective removal of debris 46 that is adhering to the pan 100. The bristles 48 merely bend and swipe across the face or over the top of the debris 46. The planar brush subsystem 5000 uses the planar brush 570 of FIG. 8C with improved bristles 585, 590 that move in an advantageous eccentric orbital motion 620, imparted by the brush oscillating assembly 525 that through the motion of the pan 100 as seen in FIG. 8E. It also provides an oscillating effect to provide a substantially elliptical scrubbing motion on the pan 100 with improved removal of debris 46 due to the improved bristle 650 orientation and configuration.

FIGS. 8C and 8D show a cross section of a row of the improved bristles of an exemplary embodiment of the improved bristle brush of the planar brush subsystem of FIG. 7A. As shown, a row of improved brush bristles 585, 590 from brush 570 are embedded at an angle relative to the motion of the brush as indicated by the relative motion arrows for the rotating brush and the pan as it is conveyed. The effect of the angle at a forward incline of the bristles 585,590 to the brush base 580 as shown, the bristles 585, 590 are leaning forward and any compressive force in the brush when directed towards the pan 100 will result in a bending of the bristle so as to provide and maintain loading of the bristle tip on the pan surface. As seen in FIG. 8D, this further biases the improved bristles 585, 590 against the debris at contact and the bristle tip is to more likely to adhering to the pan surface and thereby apply a scraping or bull dozing effect on the debris. By comparison this is more likely to result in effective removal of the debris from the pan than with the conventional brush depicted in FIGS. 8A and 8B.

Turning to the Figures, the single row of improved bristles is shown. As noted above in relation to the description of FIG. 7A, the bristles are set in opposed rows as seen as along the length of the planar brush 570. The embodiment of the flat block or planar brush 570 is shown with biased brush rows 5 in two heights 585, 590 across the brush 570. By orientating the row of improved bristles 585, 590 in a non-perpendicular orientation to the pan providing greater effective cleaning of debris 2 from the pan 100. The exemplary embodiment has the row of bristles 585, 590 on a diagonal to the face of the brush in a manner of from five to about seventy degrees from perpendicular, more specifically from about ten to sixty degrees as shown. The brushes are thus biased against the relative motion shown by the directional arrow that is imparted by the movement of the pan and the direction of rotation of the brush 570. As the planar brush 570 travels along the pan 100 and is moved as described in FIG. 7A-7B and further shown in FIG. 8E, the alternating rows of improved bristles 585, 590 are alternately always biased against the motion, e.g. one row is always pointed as depicted in FIG. 8C, providing for the scraping effect previously mentioned in either relative direction of the motion of the brush 570 as it orbits. That is to say as the brush travels in its orbit, the one or the others of the alternating rows of improved bristles 585, 590 are substantially forward biased in relation to the movement of the pan in combination with the brush.

FIG. 8E shows the top down view of the planar brush of FIG. 7A in its scrubbing motion. As shown the flat or planar brush assembly 570 which is moved, as discussed above, in an orbital rotation by oscillating assembly 525. The generally elliptical motion of the rectangular shaped brush is show as an offset or eccentric circle. In addition to this motion, the pan 100 being contacted by the planar brush assembly 570 is further moving in the direction of travel of the magnetic support carriage 700 as it moves on the track members 170. The result is a combination of an eccentric orbital motion with a forward or backward motion relative to the surface of the pan 100 being cleaned. Additionally, as seen in FIG. 8E, additional bristles 695 are show mounted on the outer edges of the brush base 580. These whisker brushes provide extra reach and run against the side edges of the pan 100 during the orbit to assist with corners in the pan 100. Though shown as extending from the brush base 580, the invention may also incorporate the whisker brushes on the brush base at the tips 682. These can be oriented in the lengthwise direction 683 on the brush 570 such that alternating rows across the brush width 684 are provided with an angled profile similar to the tall brush bristles 590 at similar angles. These bristles on the tips 682 aiding in cleaning into corners on the pans 100.

Figure 8F:
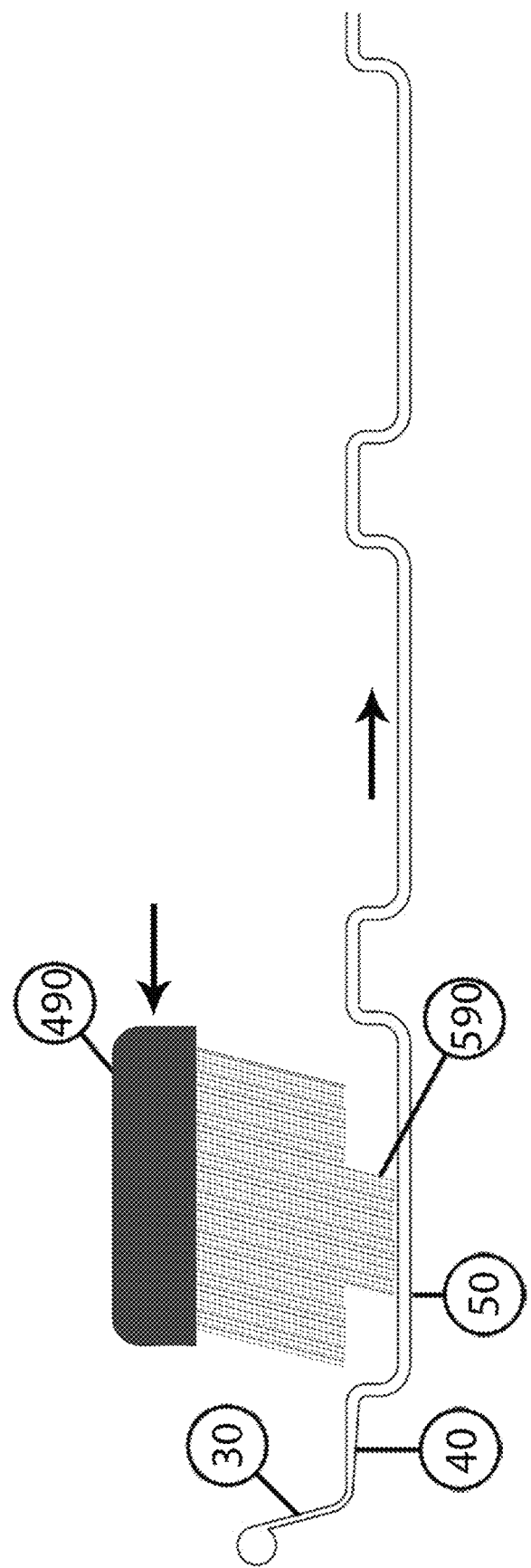
FIG. 8F shows the cross section of the planar brush passing relative to the brush in FIG. 8E.

FIG. 8F shows the cross section of the planar brush passing relative to the brush in FIG. 8E. The brush 570 contacts the pan 100 and proceeds over lip 30, pan surface 40, and pocket 50. The brush 570 is in constant contact under pressure on the pan 100. As the pan 100 passes over the brush 570, the linear motion is imparted on the pan 100 as the brush 570 follows the eccentric substantially elliptical scrubbing motion track shown in FIG. 8E. Again, this is from the relative motion of the brush and the pan to one another. The brush 570 reaches all sections of the pan 100 with the improved bristles 585, 590 and whisker bristles 695,682 being passed over the pan. The resulting substantially elliptical scrubbing motion provides the improved bristles 585, 590 with the aspect and angular motion shown in FIG. 8D. This has proven to be very effective in removing stuck on foodstuff materials oversprayed on the pans 100.

Figure 9A:
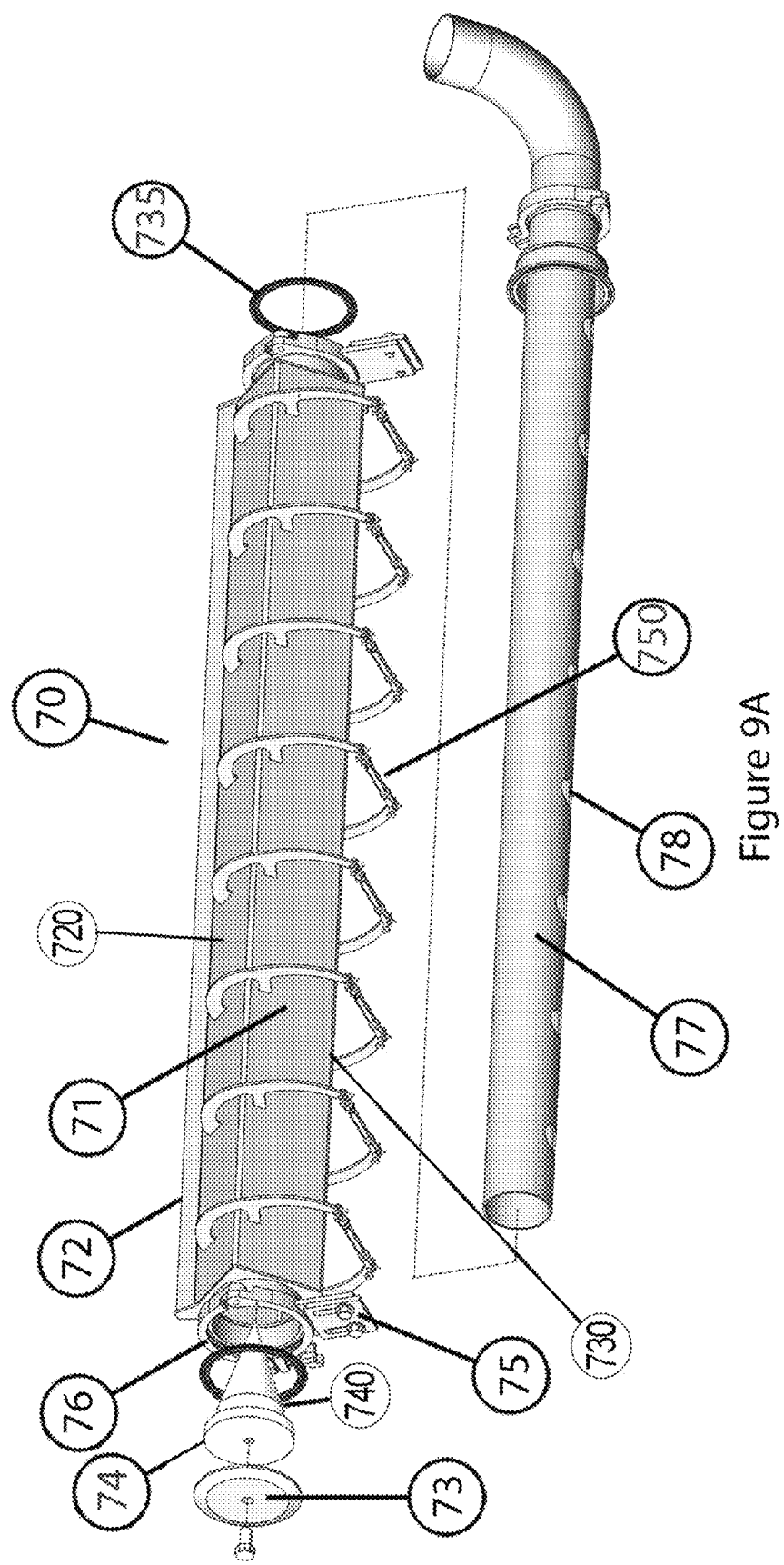
FIGS. 9A and 9B show an exemplary embodiment of an airknife used in the cleaning system of FIG. 5A.
Figure 9B:
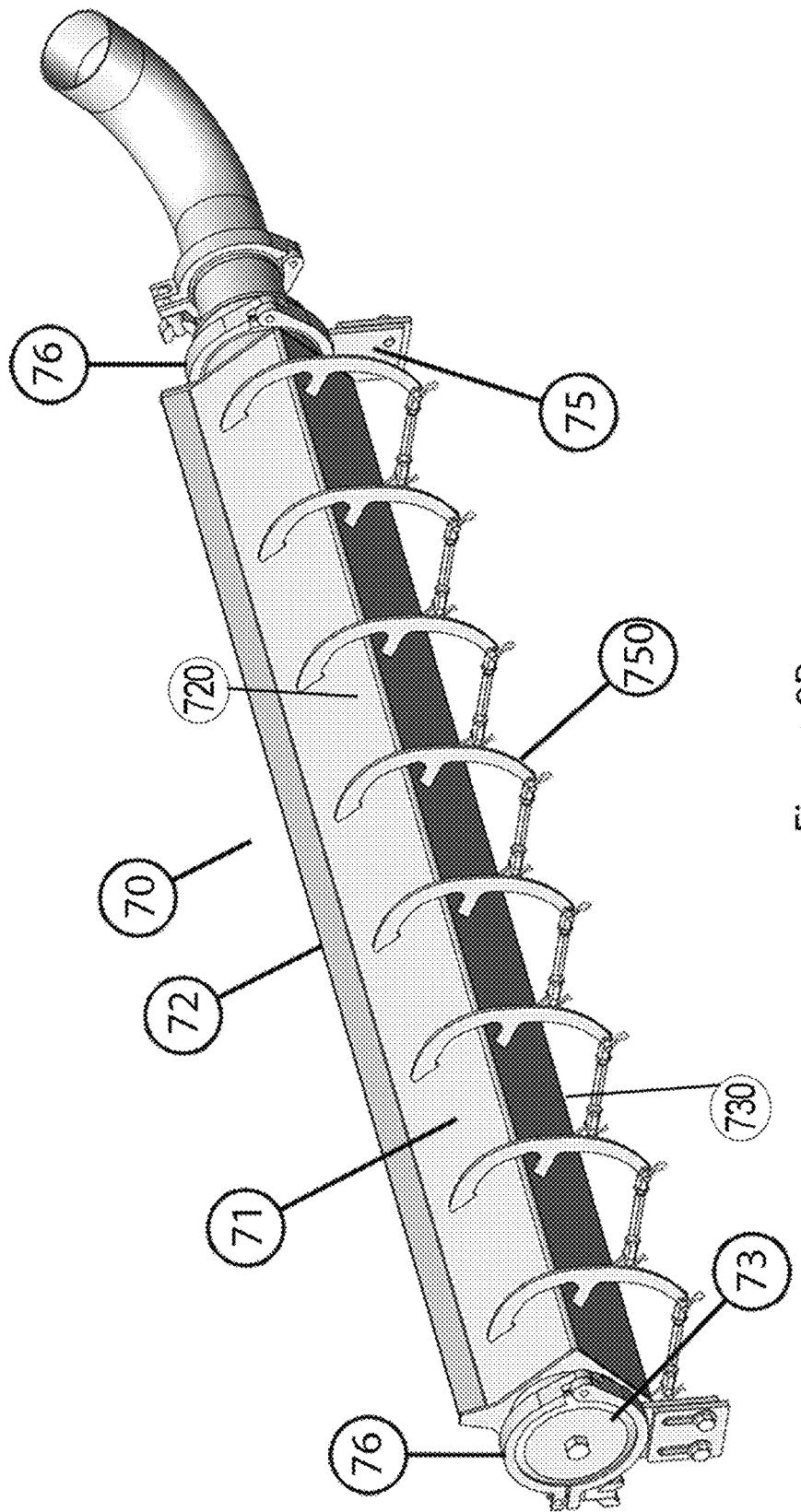

FIGS. 9A and 9B show an exemplary embodiment of an airknife used in the cleaning system of FIG. 5A. The next cleaning station or subsystem in the exemplary embodiment is commercially known as an airknife which is a device that directs air in a linear stream. In this application the airknife will be directed so as to blow air onto the pan 100 and in a direction so as to drive debris back from the pans 100 line of travel. The pans 100 are moving against the blown air so that debris does not go forward onto previously blown on pans. Though airknives are commercially available, the exemplary embodiment of the instant invention includes a uniquely adjustable and accessible foodstuff production version that can be quickly disassembled and all surfaces can be cleaned and reassembled more rapidly than heretofore known commercial designs. Consistent cleaning is a requirement for food safe certifications and the disassembly in existing commercially available airknives cannot be completed as easily as with the exemplary embodiment shown.

The airknife assembly 70 comprises an outside housing 71 which has two protruding metal sections 730, 720 converging to a significantly pointed area referred to as the knife outlet 72. Both ends of the housing 71 have end flanges 73. At the one end of the outside housing an end cap 74 is mounted which contains an aligning support block 75. The end cap 74 is tapered along section 740 to guide the diffuser tube 77 when assembled. On the other end of the airknife 70 is mounted an end flange 73 and seals 735. The mating end flange 73 is mounted such that it has attached a diffuser tube 77 that distributes the air in a uniform fashion through holes 78 drilled into the diffuser tube 77. The diffuser tube locates to the end cap aligning support bracket 75 which has an initial taper that engages the open end of the diffuser tube 77 and allows it to run to the aligning support bracket 77 where the diffuser tube 77 provides support as well as seals off the end of the diffuser tube 77. The end caps 74 and the end flange 73 with diffuser tube 77 are both affixed in place and clamped in compression through the use of the perimeter clamps 76. The perimeter clamps 76 in this operation are affixed to the swing arm 450 so as to provide mounting of the airknife 70 as well as allow for rotational adjustment of the airknife assembly 70.

FIG. 9C shows an end view of the airknife with adjusting devices for opening and closing gap of the airknife opening. The exemplary embodiment of the airknife 70 includes a shape adjustability factor for the exemplary airknife of FIGS. 9A-9C. The shape adjustability factor making all of the surfaces of the airknife more easily adjustable and cleanable for a food safe design where all of the surfaces of the airknife are accessible for cleaning. Adjustment sections elements 750 are provided as a series of U-shaped adjustable constraints or turnbuckles each adjustable with an individual tightening element. Each of the adjustment section elements 750 working to narrow or widen sections of the air flow through the airknife outlet 72. Varying adjustment section elements 750 can be provided to constrict the housing sections 730,720

Figure 9D:
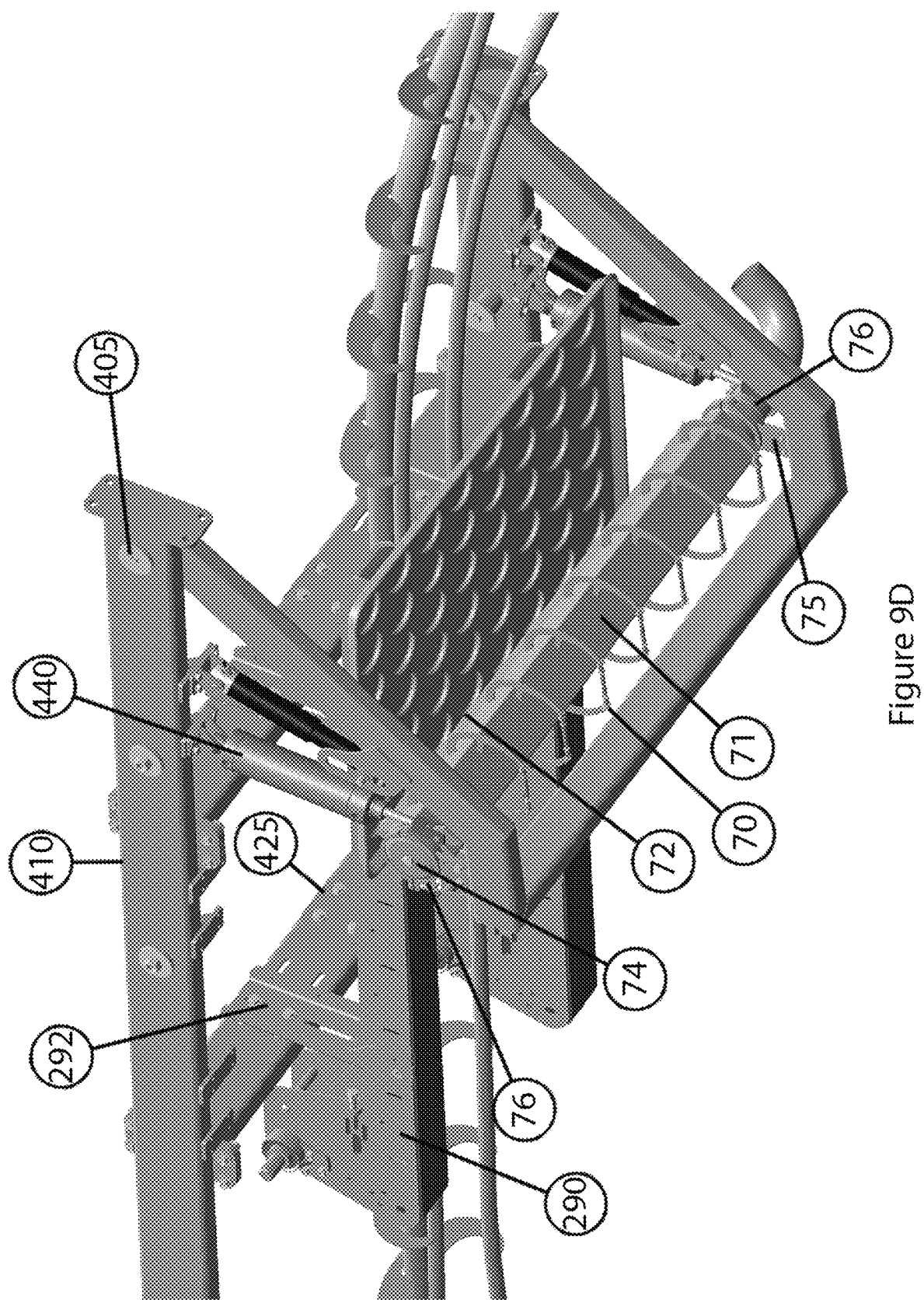
FIG. 9D shows the exit of clean pans from the airknife subsystem in an exemplary embodiment of the instant invention.

FIG. 9D shows the exit of clean pans from the airknife subsystem. The cleaning section frame 410 is shown mounting the secondary magnetic conveyor 290 with conveyor sections 295 and mounting bracket 292 coupled to a cross member 425 of the frame. The cleaned pan 101 passes on the magnetic support carriage 700 on the track members 170 supported on support member 180. The airknife 70 is shown with the outside housing 71, airknife outlet 72, end flanges 73, end cap 74, aligning support blocks 75, and adjustment elements 750. The perimeter clamps 76 are affixed to the swing arm 450 so as to provide mounting of the airknife 70 as well as allow for rotational adjustment of the airknife assembly 70 using the swing arm actuator 440.

Figure 10:
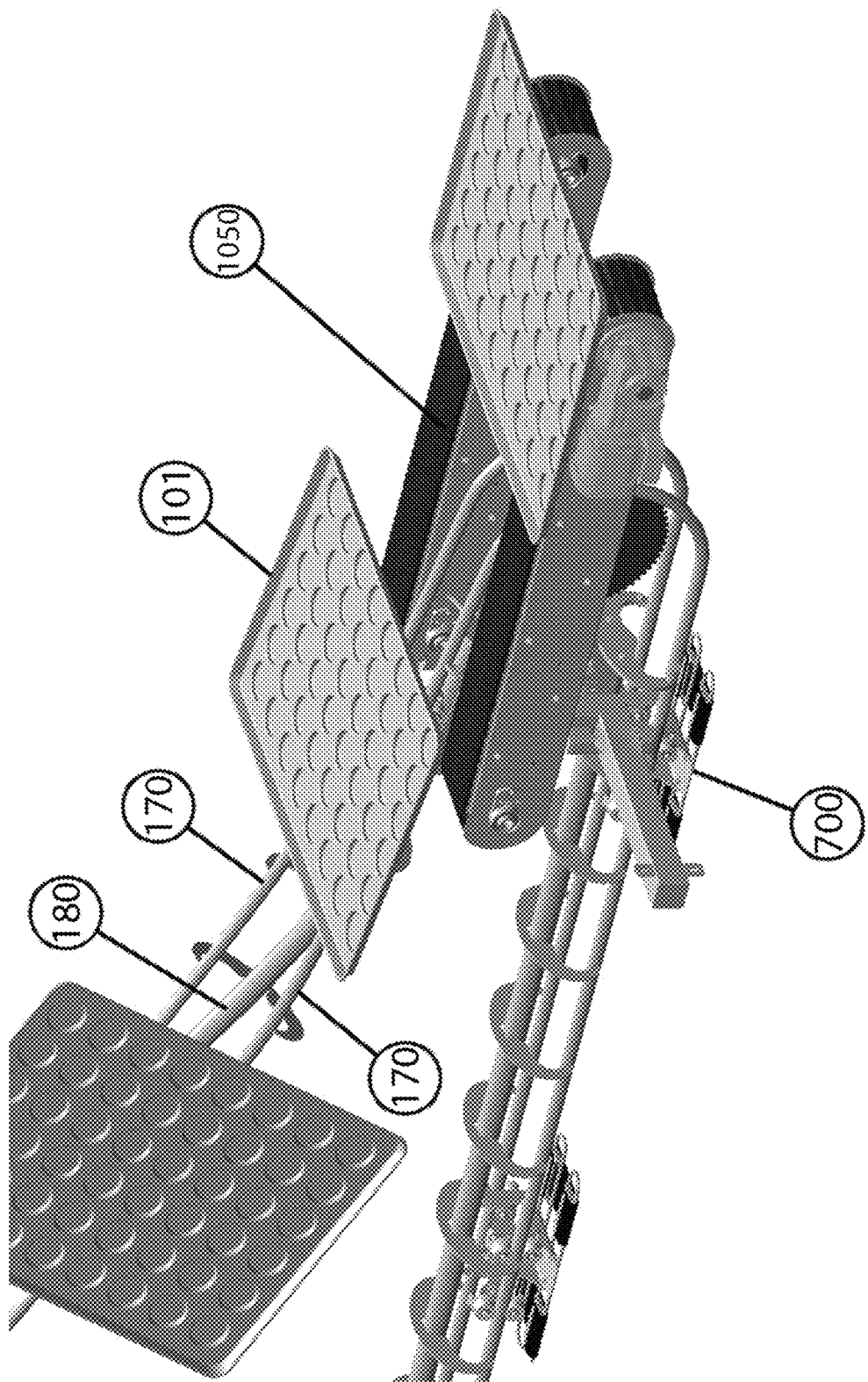
FIG. 10 shows the exemplary embodiment of the cleaning system with a discharging station for clean pans.
Figure 10A:
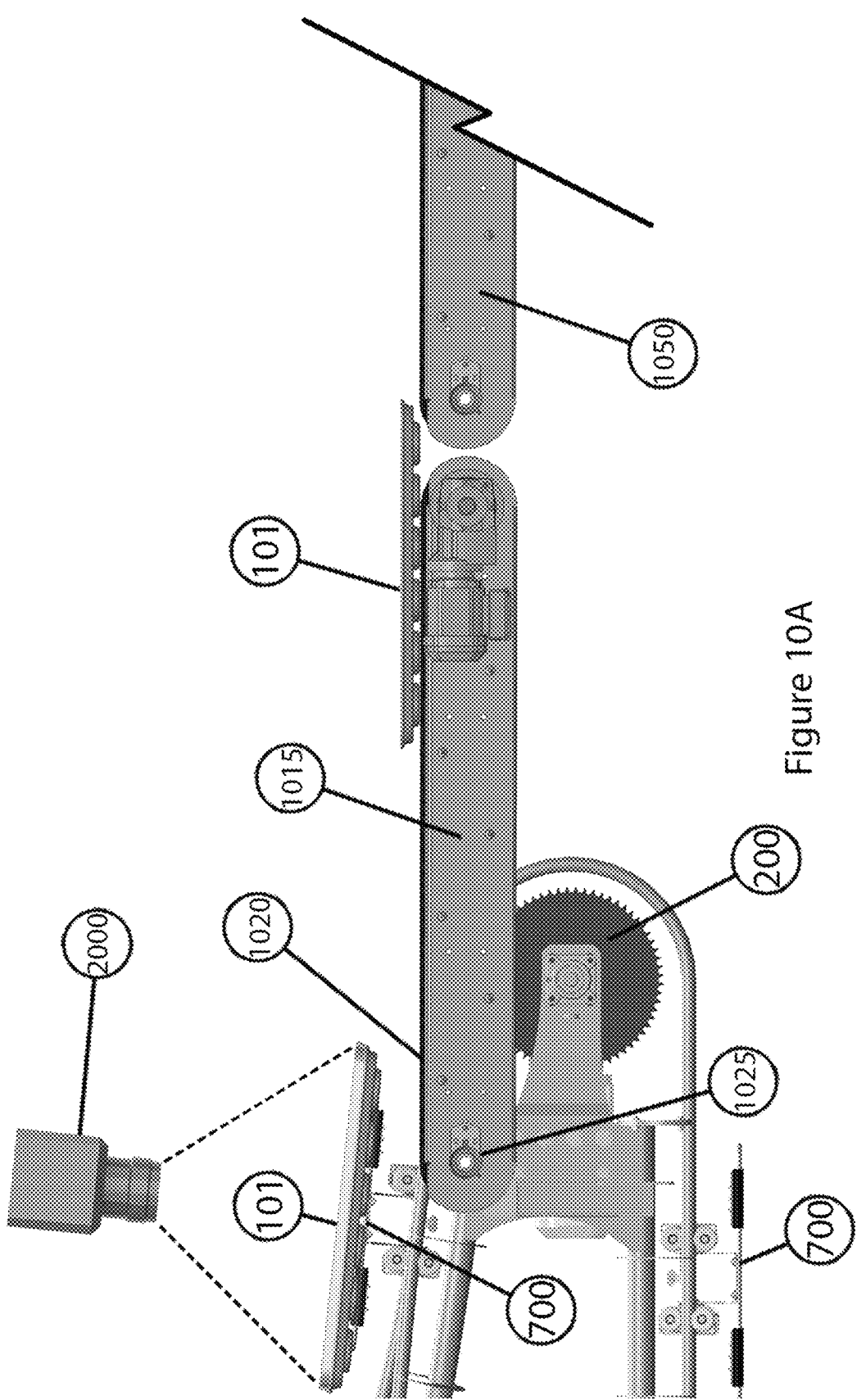

FIG. 10 shows the exemplary embodiment of the cleaning system with a discharging station for clean pans. As shown the cleaned pans 101 discharge onto a take away conveyor 1010. The take away conveyor 1010 may be a straight conveyor or similar conveyance means or may be a manual station for restacking. In this instance, the clean pans 101 are moved from the discharge to be put into circulation as clean pans.

FIGS. 10A and 10B show a side view of a further improved exemplary discharging and sorting station for clean pans. In the exemplary embodiment of the FIG. 10A a still further improvement is shown. A first takeaway conveyor 1015 in this embodiment is provided on a hinge 1025 behind the pan discharge point 1020 where the pan separates from the magnetic support carriage 700. A machine vision sensor system 2000 is shown above the pan discharge point 1020. The machine vision sensor system 2000 is in communication with the controller 2500 of the machine. The machine vision sensor system 2000 is a system that visualizes and senses pans that are not suitable for use. This system can be, for instance, but is certainly not limited to, a system for visualizing the condition of the non-stick surface of the pan, the cleanliness of the pan, or both, as disclosed in applicants provisional patent 62/894, 922 filed Sep. 2, 2019 for such a system. Alternatively, it can be a system for using cameras or similar visualization devices or sensors to determine whether the cleaned pans 101 are bent or damaged significantly. Regardless, the machine vision sensor system 2000 senses whether the clean pan 101 is to be sorted out of the normal clean pan 101 stream of circulation and reports this to the controller 2500 for the instant invention.

The machine vision system 2000 scans the clean pan 101 at the discharge point 1020. If the clean pan 101 is not to be diverted, the first discharge conveyor 1015 puts the pan on a further discharge conveyor 1050 as shown in FIG. 10A. If the clean pan 101 is determined to be in need of diversion by the machine vision system 2000, the controller instructs the first conveyor 1015 to pivot at the hinge 1025 and the clean pan 101 is directed down, as shown in 10B. This allows for a drop gate discharge into a cart or further conveyor (not shown), as best seen in FIG. 10B, for pans that need to be removed from the system.

A further embodiment having a shorter operating footprint is shown for cleaning pans, a non-limiting example being bun pans as referenced throughout herein as used in the production of hamburger and other dough type buns, in FIGS. 11-29 where it is required to brush the surface of said pans so as to clear the top and or pocket surfaces of the pans of debris deposited in the production of the buns and or in the application of toppings such as but not limited to seeds for instance sesame or sun flower seeds or grain mediums such as cracked and or whole grains and top coatings such as but not limited to glazes such as in the use of protein washes or sprayed on glazes.

When producing such products there is an element of risk that some or all of these materials may bond to the pan top surface 4 and or into the pan pocket 5 surfaces. If these materials then get bonded to any of the surfaces or subsequent product made or baked in such a pan 3 then it may have significant adverse effects such as but not limited to allergen reactions to seed products and visual rejection due to adhesion of seeds that have gone thru repeated baking cycles whereby they become darkened so as to be objectionable in appearance.

To clean the pan surfaces, typically brushing is used. In major bakery installations the pans can typically run up in size, for instance, but certainly not limited to being about forty-eight inches by forty-eight inches in size and are coming out of the oven at rates as high as forty pans per minute or more. So, at these operating speeds, there is only around one and a half seconds to clean a pan 3 and therefore brushing, which is the most rapid and economical cleaning process that can be applied, is necessary. Water washing takes too long and the majority of glazes used in this process are silicon based and the use of water on the silicon non-stick coating of the pans decreases the number of cycles in the useful life of the non-stick coating on the pans. To get the pans 3 clean from the specified contaminants in the allotted time the brushes must have the cleaning action required and be able to contact and clean all of the areas required to be cleaned on the pan 3. The instant invention is optimized to provide the efficient cleaning and adjustable and/or selective contact with the pan 3 as well as provide for quicker change outs when needed, reduced maintenance down time, and greater adaptability for use in customer production lines.

Figure 11:
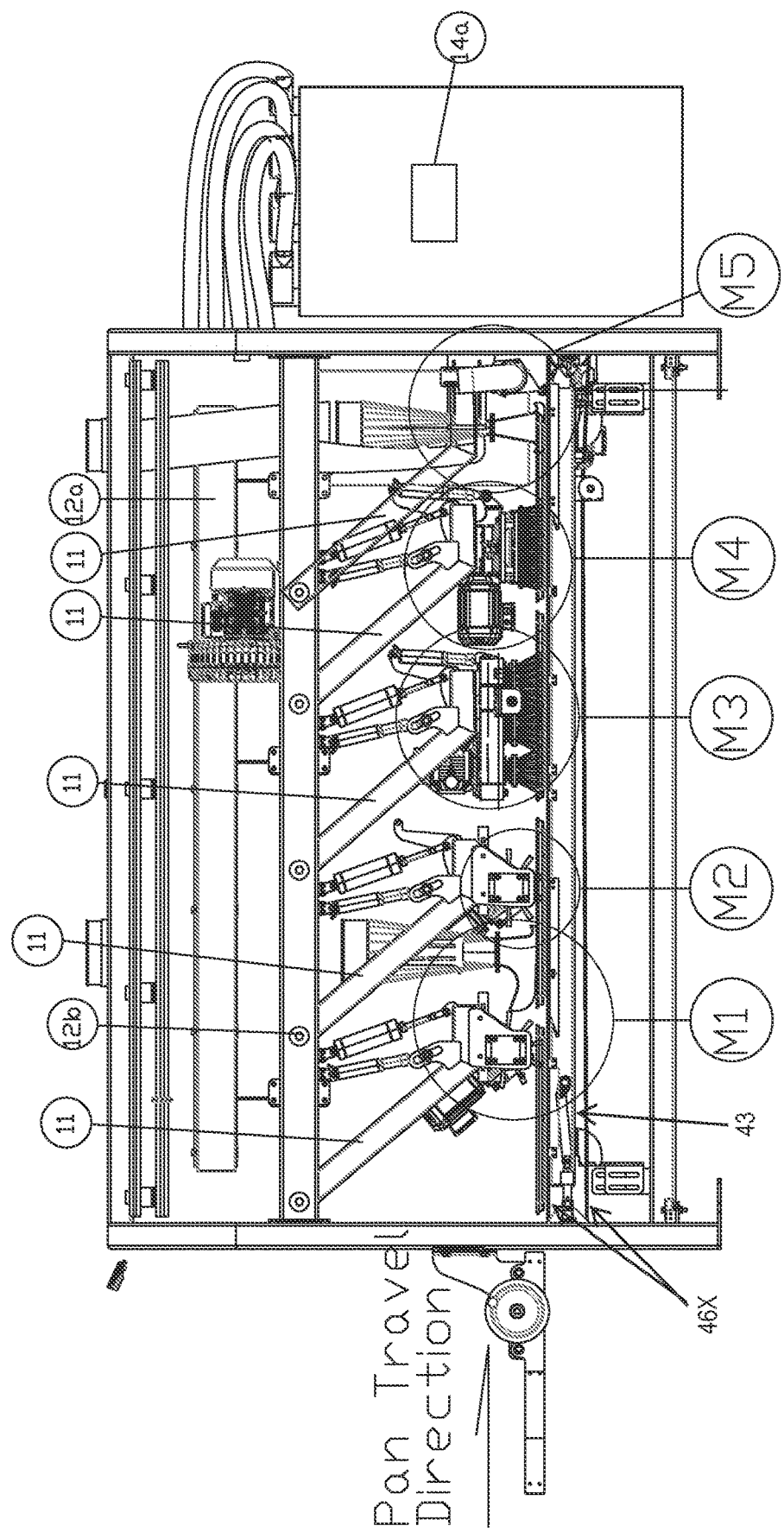
FIG. 11 shows a side view that illustrates the main structure of an exemplary embodiment of the instant invention mounting modules one through five within the direction of pan feed.
Figure 12:
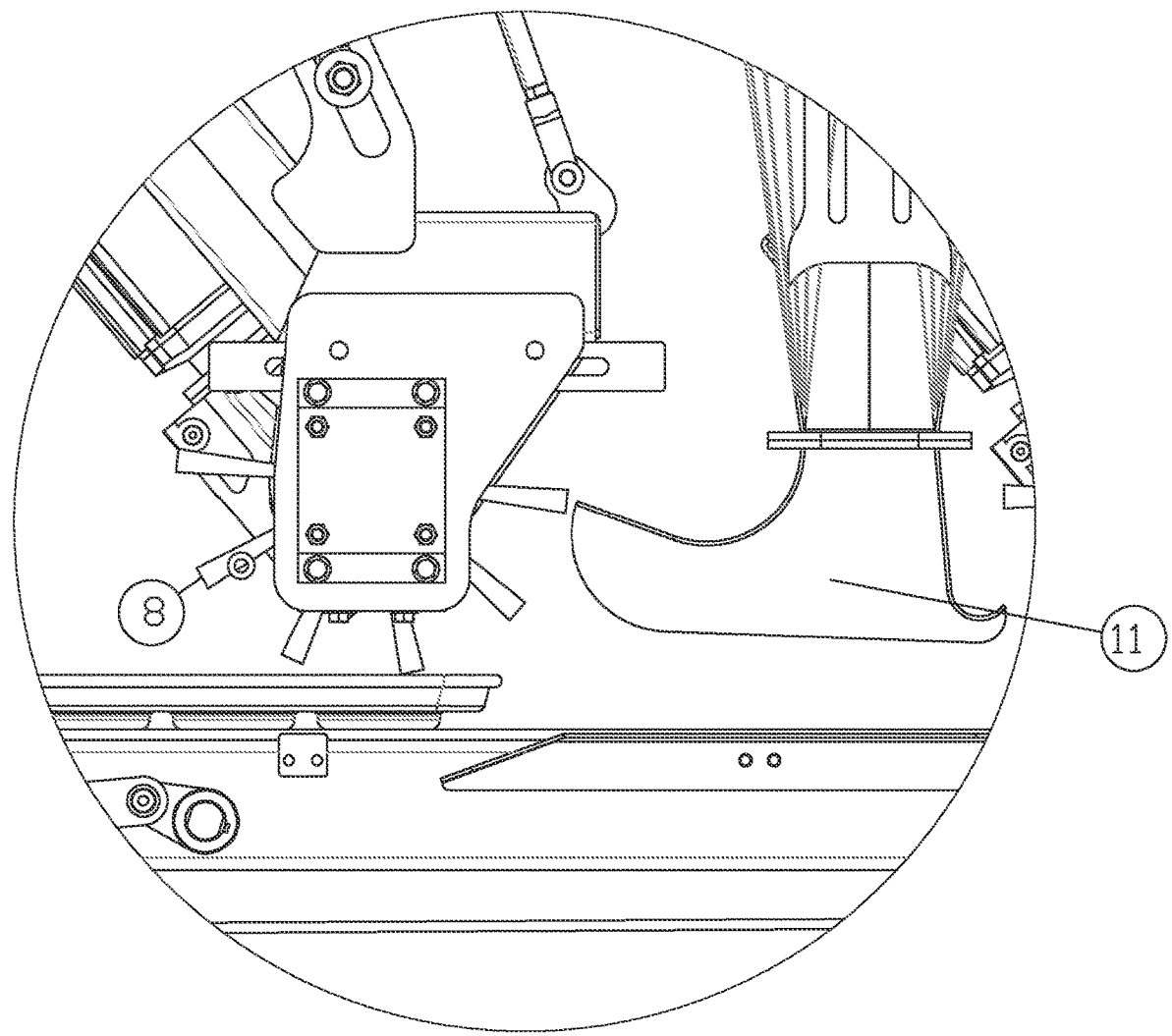
FIG. 12 shows a side view of module one of the exemplary embodiment of FIG. 11.
Figure 13:
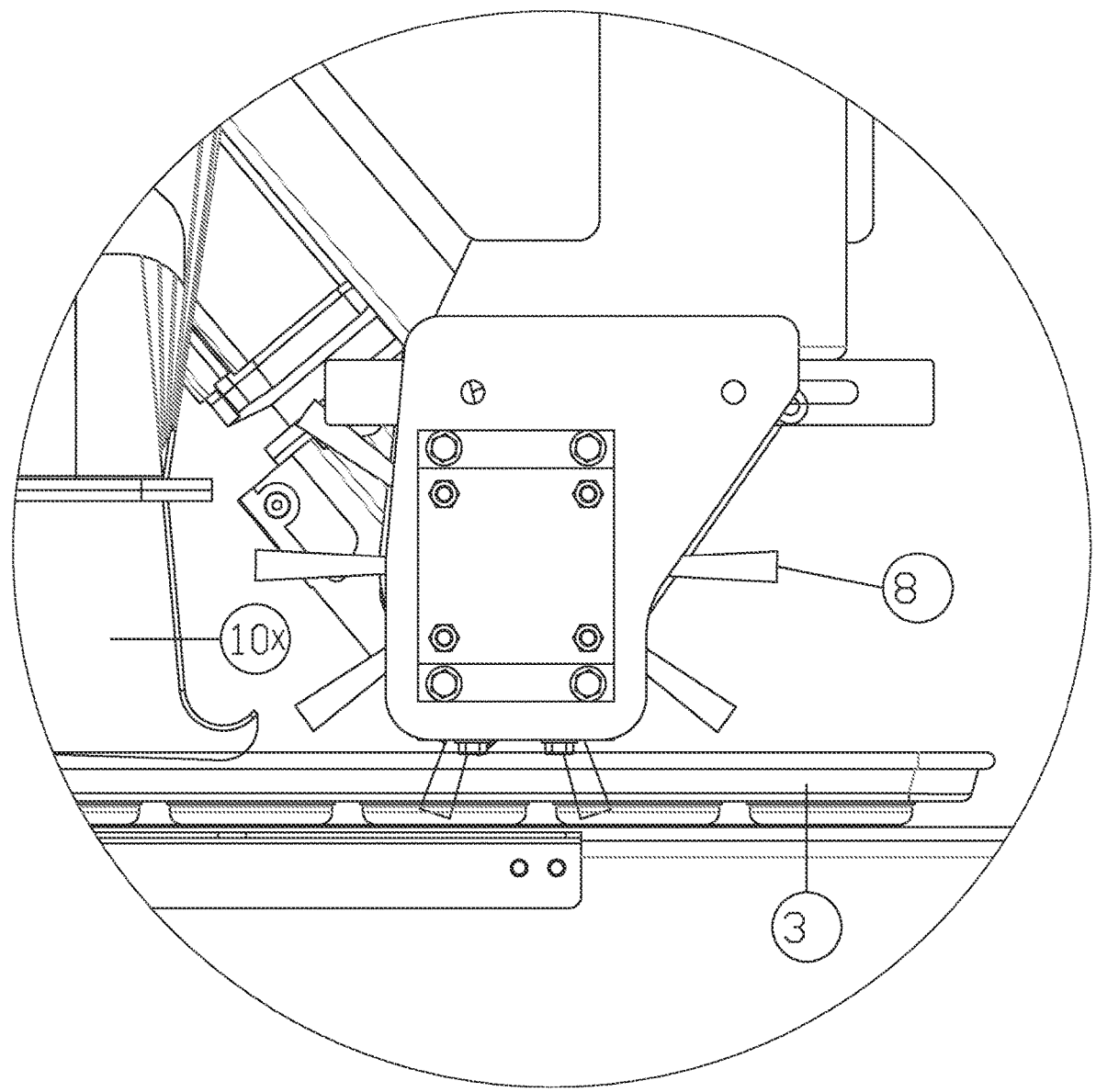
FIG. 13 shows a side view of module two of the exemplary embodiment of FIG. 11.

FIG. 11 shows a side view of the shorter embodiment that illustrates the main structure of a further exemplary embodiment of the instant invention mounting modules one through five within the direction of pan feed. FIG. 11 illustrates the main structure of an exemplary embodiment of the instant invention mounting modules one through five within the direction of the feed of pans. The figure shows the housing or frame member 12a with module hinge points 12b to engage the brushing sub-systems which are referred to herein as modules m1-m5 with the pans 3 as well as the various aspects of the cleaning steps of the pan cleaner 1.

Modules one thru five (m1-m5) are shown but it should be understood that the machine can accommodate a greater addition of modules or fewer modules within the frame 12a without departing from the spirit of the invention. All modules are suspended from a frame member 12a as shown in FIG. 11 at hinge points 12b that the modules can articulate or hinge upon or from. The hinge point 12b allow for the rotatable or hinging attachment of the module mount arms 11 to "float" in the space above the conveyor.

There are also at each module m1-m5 components used in the raising and lowering of the elements of the individual module as well as in assigning and causing the module to stop in its required heights. These components are common to all modules. Each of the modules is mounted on mounting arms 11. The mounting arms 11 are articulated by a movement actuator system 14. A movement stop actuator 15 sets or is moved electrically so as to give or provide a positive stop position to where the module mount arm 11 may be lowered a minimum declination or lowered operating point.

In the process of cleaning pans 3, the pans 3 enter on the indicated entry side of the pan cleaning machine 1. There they come in contact with pan conveyor belts 46X which move along a conveyor frame 43 support surfaces. This style of conveyor 46X accepts the pans as they are presented to the pan cleaner machine 1 and loads them on to the supported surface and thru the pan cleaner machine 1. The pans 3 do not need to be loaded and indexed onto carriers or to specific locations as in our other devices and applications. Thus the exemplary embodiment shown operates on the pans 3 as presented in whatever random sequence and will accept the pans 3 and convey them to the entrance of the machine in a consistent manner. A consistent time delay is maintained for each pan due to the time required to pass the pan through the pan cleaner. This separation is provided by the speed of the conveyor belt 46X, which is greater than product of the time required for a pan to pass thru the cleaner times the number of pans presented to the cleaner in a given amount of time, e.g. rate of flow of the pans. For example, if the pan length is three feet times thirty pans per minute then the conveyor belt speed must be greater than ninety feet per minute, such that they will arrive at specific locations or modules for cleaning at specific times etc.

As the conveyor belts 46X move along the conveyor belt frame support surface 37 they are guided by pan conveyor belt guides 38 so as to ensure that the conveyor belts 46X stay aligned on the conveyor frame support bed 44 and do not move laterally. The pan or bun pan 3 will typically, but not always, engage a second stage of cleaning which is provided at module three, as more clearly shown and described in relation to FIGS. 14 through 25R, which is the rotary brush unit where vertical spindles 19 have special brushes 23 attached that will clean the top surface of the pan 4 as well as the outer pan perimeter inside 6 and outside 7 surface of the pan. A final cleaning follows at modules four and five, which are further shown in FIGS. 5-6, providing an orbital brush engaging the pan and a second vacuum hood 41, before passing the pan to the exit side of the pan cleaning machine 1.

In the further exemplary embodiment of FIG. 11, a controller 14a can be used with and coupled to the arms 11. The controller 14a allows for a set height for where the absolute lowest point and conversely highest point that the module can extend to is made available and programmed for the machine. A module movement stop actuator 15 reads or measures its relative position, provides output to the controller 14a, and controls so as to provide the correct stop height. In this instance, the height adjustment system or movement actuator system 14 is shown as, but is certainly not limited to, an air cylinder system shown as two air cylinders. The air cylinder system as the movement actuator system 14 can extend the module arm 11 to provide a variable degree of pressure on pans 3 by extending toward the conveyor.

The controller 14a can make adjustments that will do or provide adequate downward force based on cleaning parameters. In optimizing the system, these pressures or downward forces can be dialed in or programmed so as to push down on the brushes in the module so that they can clean the pan but not so hard that the force will tend to bend or deform the bristles and gently brush a surface or harder so as to provide a different resulting cleaning action at the pan 3, the pressure being determined by the selected cleaning parameters. In an optimization, the goal would be to provide sufficient cleaning to address concerns without inherently increasing wear on the non-stick coating on the pan. Too much force too often results in reduced pan life as the non-stick coating is worn by the brushes. Additionally, it is often times counter intuitive in that more aggressive cleaning and/or blowing can result in blown over contamination in the pockets that may not have resulted from the baking process but instead from cleaning. Thus it often times the case that a less aggressive cleaning mode be used based on the aforementioned selectable cleaning parameters.

Thus, the optimized system of the instant invention has the ability to adjust based on a desired level of cleaning. Some examples of levels that can be programmed can include, but are certainly not limited to, light cleaning for minimum pressure to brush the pans, medium cleaning with pockets, deep cleaning and the like and/or pass-through mode as examples. Thus the instant invention, in a non-limiting, exemplary embodiment, includes but is not limited to a system that provides the ability to "float" the modules and optimize the brushing to be a gentle cleaning force optimized to reduce wear or a more aggressive brushing or actively pass the pan without brushing or any level in between. These also allows for each module to be activated or deactivated as well as raised and/or lowered to suit the needs of cleaning the pan surfaces as required. Each module can be effectively "deactivated" at any time by being raised to allow pass thru of pans that do not require cleaning by that module. Alternatively, as noted herein, a "pass through" option allows the pans to pass without cleaning, for example in instances where the pans being processed were not sprayed or topped or for a defective pan as enumerated in an alternate exemplary embodiment herein below.

These settings can be for instance, but are certainly not limited to being, programmed and stored in the controller 14a. The controller 14a can be programmed so that these parameters can be set into recipes and when the recipes are entered the movement stop actuator 15 which will move to the required location so that the mount arm 11 will only go to that point and not lower for the desired setting or recipe and force. Again, the distance and pressure applied at the pan 3 is settable a determined by engagement parameters and/or cleaning parameters, in the exemplary embodiment being with lowest pan position and adjustment. The engagement parameters are defined as the machine executable translation of the cleaning parameters.

Additionally, in a further exemplary embodiment as an alternate implementation, the pan cleaning machine 1 can be coupled to a pan sensing system, like that disclosed in applicants U.S. Provisional Application 62/894,922, filed Sep. 2, 2019, directed to a Pan Coating Visualization Enhancement Material, Apparatus and Method incorporated herein by reference. The sensing system (not shown) can analyze the pan for anomalies indicating contaminant or foreign materials and adjust the selected setting accordingly, e.g. light for identified seeds or heavy for glaze in pan pockets. Similarly, in conjunction with a sorting conveyor, as seen in applicants U.S. Provisional Applications 62/894, 923 and 62/894,915 filed on Sep. 2, 2019, which is also incorporated herein by reference, a pan which has been deemed unserviceable due to wear on its non-stick coating can simply be passed through to the sorting conveyor and removed from service.

In addition to the variable types of cleaning available with the novel arm mount system also allows for quicker, easier error correction, e.g. unjamming, when the pans are not properly aligned. Typically, in the prior art, when the conveyor moves the system through under fixed brush systems or systems that do not lift and then engage there is a possibility of a jam. The pans 3 can overlap or stack on the conveyor, referred to as "shingling" in the art. This overlap gets caught under a fixed height system and a wedging force is applied to the incoming pans by the conveyor moving at high speed such that the line must be stopped to fix the jam—often with a crow bar. The instant invention overcomes this issue.

Figure 14:
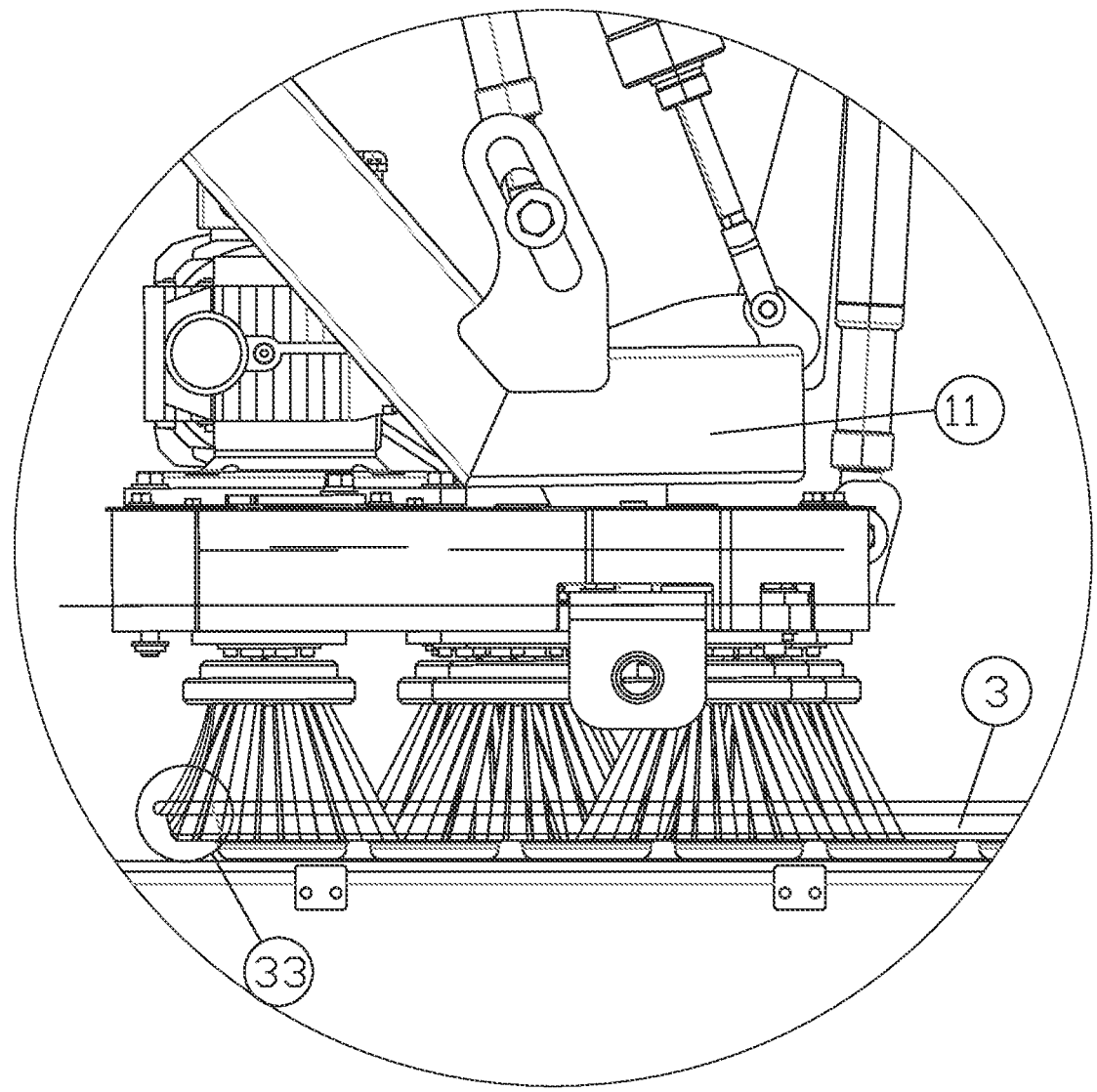
FIG. 14 shows a side view of module three of the exemplary embodiment of FIG. 11.

In the instant invention, as shown in FIGS. 14 through 4-6b, when the lip of the bun pan 3 comes in, the cleaning head or module can float over the bun pan perimeter top surface 4 then come down to clean the lower main surface of the pan 4. It provides a "float" over aspect where if pans have been pushed together or have partially or fully shingled over top of one another the shingled pans will go into the pan cleaner 1 and the head will float over them. The cleaning brush heads will not jam and the pans will not wedge into the pan cleaner brushes but rather the module will just float over the top of the pans. This is because unlike conventional prior art pan cleaners which are raised and lowered on threaded rods or as may be described as positive positioning means, the instant invention instead utilizes a floating arm which has a setting for the module as a lowest position stop and then provides a targeted downward force on the module so as to clean the pan upper surface. If the pressure rises, it rises. Similarly, if there is a jam for other reasons, the system can easily rectify it by raising the arms to a much higher point which provides a much quicker ability to clear for instance a misaligned pan, e.g. crooked or cockeyed, that can be misfed on the conveyor.

Thus, in relation to the overall exemplary embodiment of the pan cleaning machine 1 shown in FIG. 11, there are significant advances providing for improved operations, maintenance and efficiency in the instant invention. Each of the modules discussed herein can be also be quickly mounted or demounted on swing mount arms 11 and the swing mount arms 11 elevation and active contact with the pans 3 can be controlled by a controller 14a which can raise and lower the module for height or applied cleaning force to the pan 3 and or raises or lowers modules so as to engage and or disengage the selected module. As mentioned the exemplary embodiment shows five modules, a greater or lesser number of modules can be implemented by mounting on available module mount swing arms 11. Additional module mount swing arms 11 can be incorporated in extended pan cleaning machine frame members 12a to suit, providing flexibility and expandability in the pan cleaning machine 1. Turning now to the first module or cleaning subsystem as shown in FIG. 2.

FIG. 2 shows a side view of module one of the exemplary embodiment of FIG. 11. Module one m1 is a cleaning brush and was also discussed in Applicant's previous U.S. Provisional Application 62/894,915 filed on Sep. 2, 2019 and whose description is incorporated by reference herein and appearing herein above. The principal task of module one m1 in the pan cleaning machine 1 is to give the pan 3 an initial sweep from counter clockwise rotating cylindrical brush 8 and dislodge product such as but not confined to buns 2 that may not have been incompletely removed or are fully stuck adhering in the pan pocket 5 upon entry into the pan cleaner 1.

FIG. 3 shows a side view of module two of the exemplary embodiment of FIG. 11. Module two as shown is a combination of a reverse or mirror image of module one shown in FIG. 2 which includes an oppositely rotating, in this case clockwise, rotating cylindrical brush 8 which again aids in the task of taking off or removing buns 2 that may be adhering to bun pans 3 and a first vacuum hood 10X. The first vacuum hood 10X is coupled to a vacuum source connected and can or is able to collect the removed adhering or residual buns 5 that can be on the pans 3 from the actions of modules one and two FIG. 2 and FIG. 3 where these said modules will remove and motivate the adhering and or residual materials or buns to the vacuum heads. It should also be noted that the cylindrical brushes 8 of module two are also typically rotating in a clockwise fashion so as to sweep the adhering or residual materials and to direct or motivate them to the first vacuum head 10X for vacuum removal. In the exemplary embodiment shown the rotating cylindrical brush 8 of module two is counter rotating relative to the cylindrical brush 8 of module one.

FIG. 14 shows a side view of module three of the exemplary embodiment of FIG. 11. Module three m3 presents an exemplary embodiment of a further cleaning brush head configuration which provides more optimal contact with all surfaces of the pans 3 and in particular optimized cleaning of both the main and side surfaces of the pans 3 in the instant invention. Module three m3 utilizes a plurality of rotary brushes in a unique manner so as to get and provide improved contact of both the primary flat surface of the pan and the lip or perimeter surfaces, both inside and outside of the pans 3.

Module three m3 comprises a main mount arm 11, coupled to a frame element 12a through a hinge point 12b. A drive device 17, which in this case is but is not limited to a combination electric motor gear reducer of drives rotatably mounted vertical brush shafts 21 that are inside of a cartridge assembly comprising upper cartridge 22, lower cartridge 23 and cartridge fasteners 24 and put in rotation thru the driving action of a power transmission unit 18, which is in this exemplary embodiment is shown as, but is certainly not limited to, a driven pulley coupled to a timing belt. The coupling of the brushes is described and shown in greater detail in relation to FIGS. 14 to 25R.

The brush shafts 21 are put in rotation thru the driving action of a power transmission system but are driven in the exemplary embodiment shown in alternating and opposite rotations. That is, the brushes are counter rotating as to the brushes immediately next to the brushes in the layout of the exemplary embodiment. This is more clearly shown in relation to FIG. 18. Though brush module and cleaning machines exist that attempt to clean pans, the prior art devices had numerous significant shortfalls.

Initially it was observed that for a standard brush to strike the required surfaces it would not initially do what is required due to angle of brush bristle contact and ability of the brushes to contact all surfaces efficiently. The relative movement of the pan 3 into the brushes and the height changes at the perimeter or lip cause compression and contact issues as well. The third module m3 and the corresponding brushes 80 are designed to address these issues. As the pan passes to the third module m3 the pan 3 approaches the brushes in the configuration shown and an initial deformation of the bristles occurs.

Figure 20A:
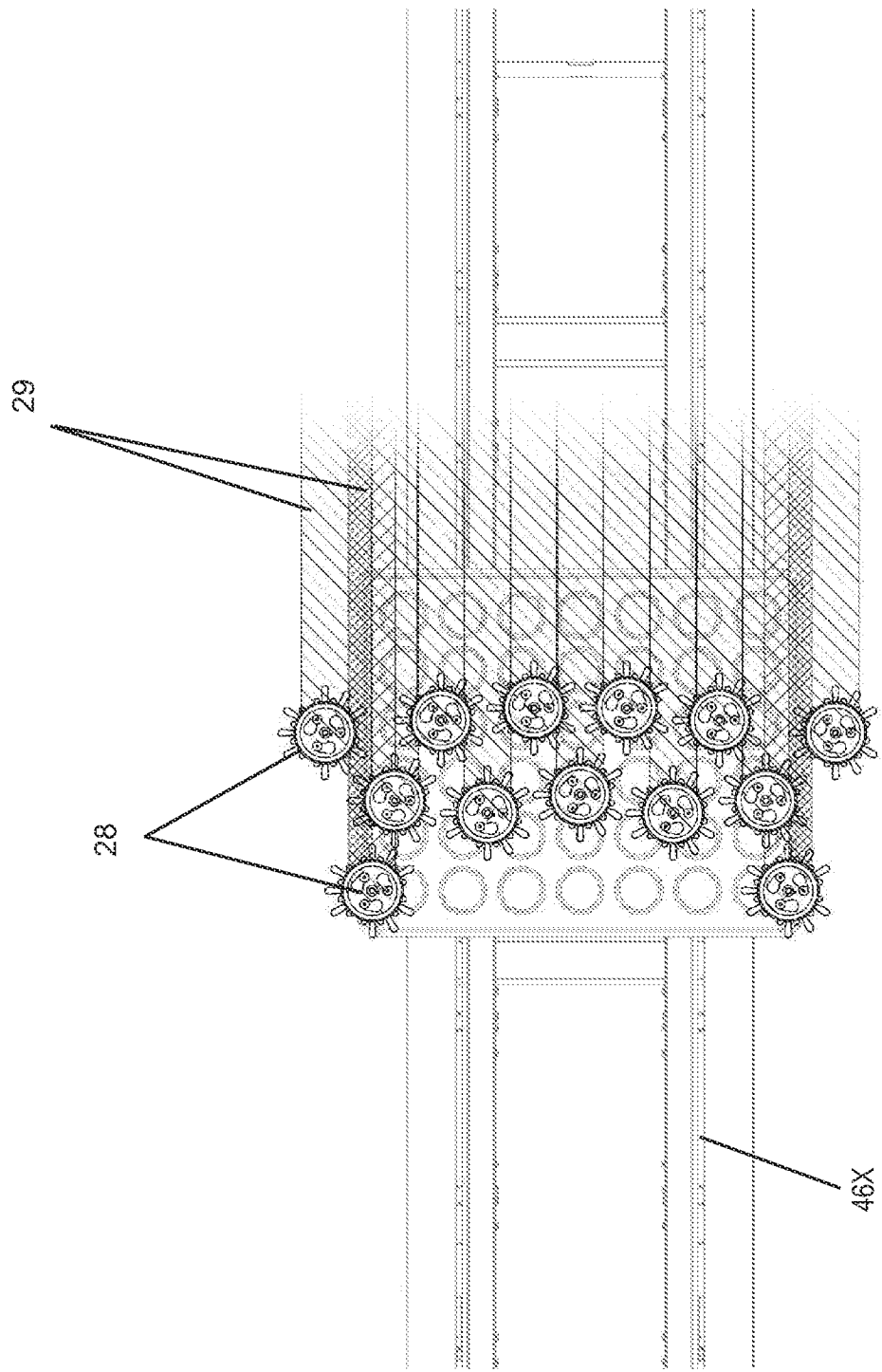
FIG. 20A shows a top down view of the embodiment of brush module three shown in FIG. 16 with grey hatching representing the areas of coverage for the brush heads.
Figure 20B:
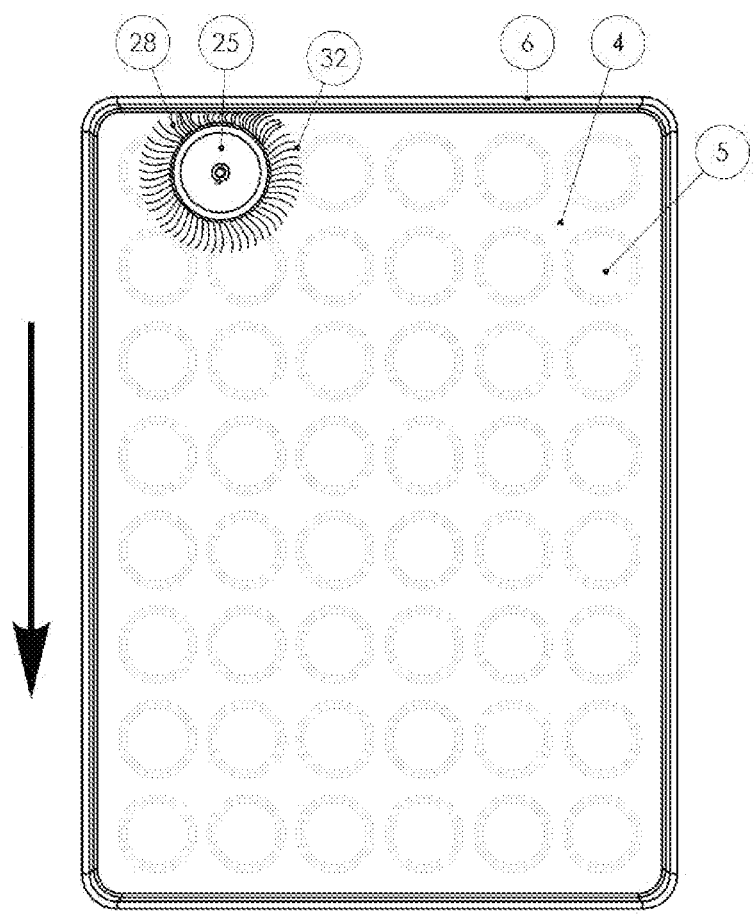
FIG. 20B shows a single conventional prior art brush head in contact with an edge of the pan.
Figure 22:
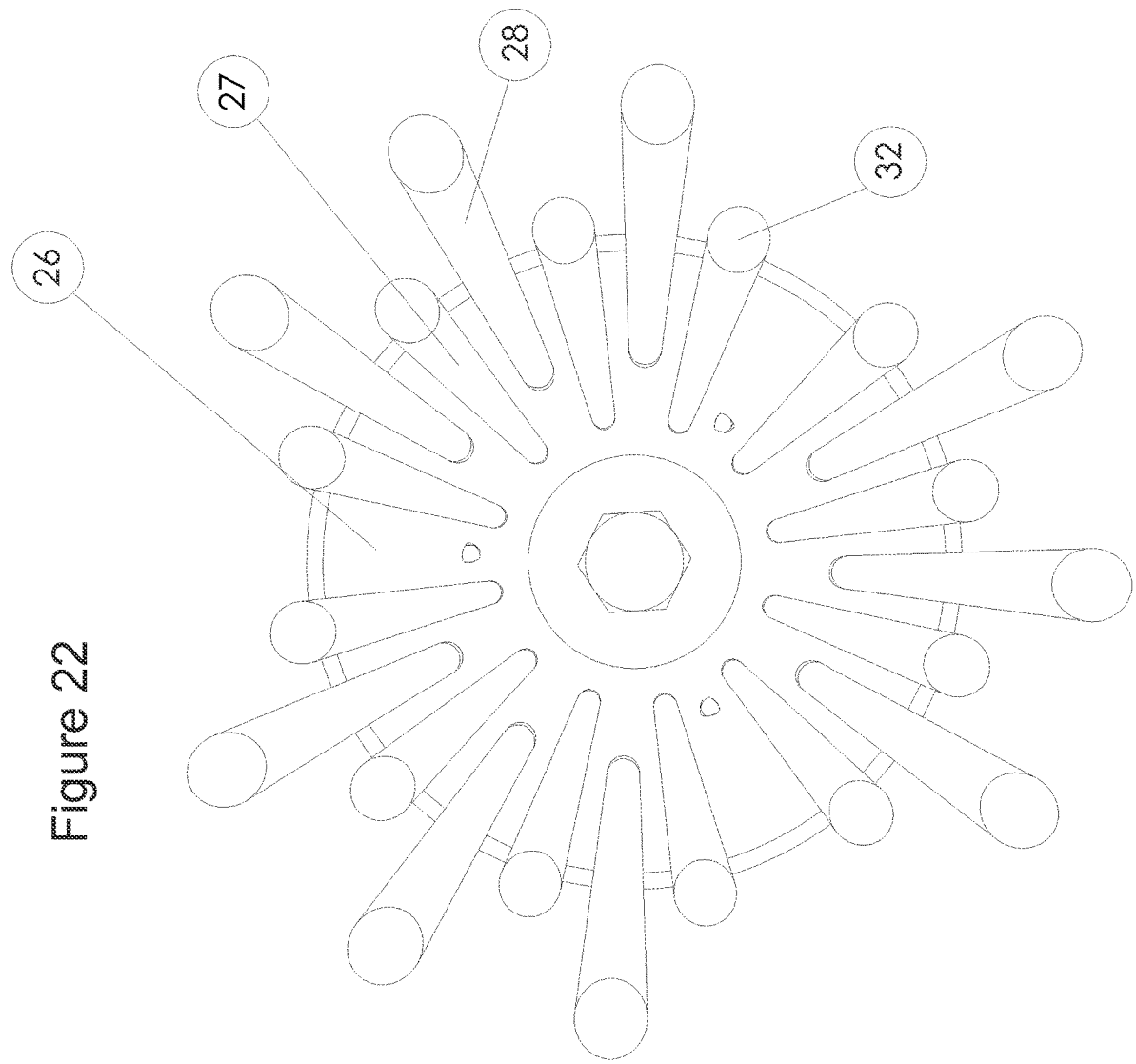
FIG. 22 shows a bottom view of the exemplary embodiment of the brush head of FIG. 21.
Figure 23:
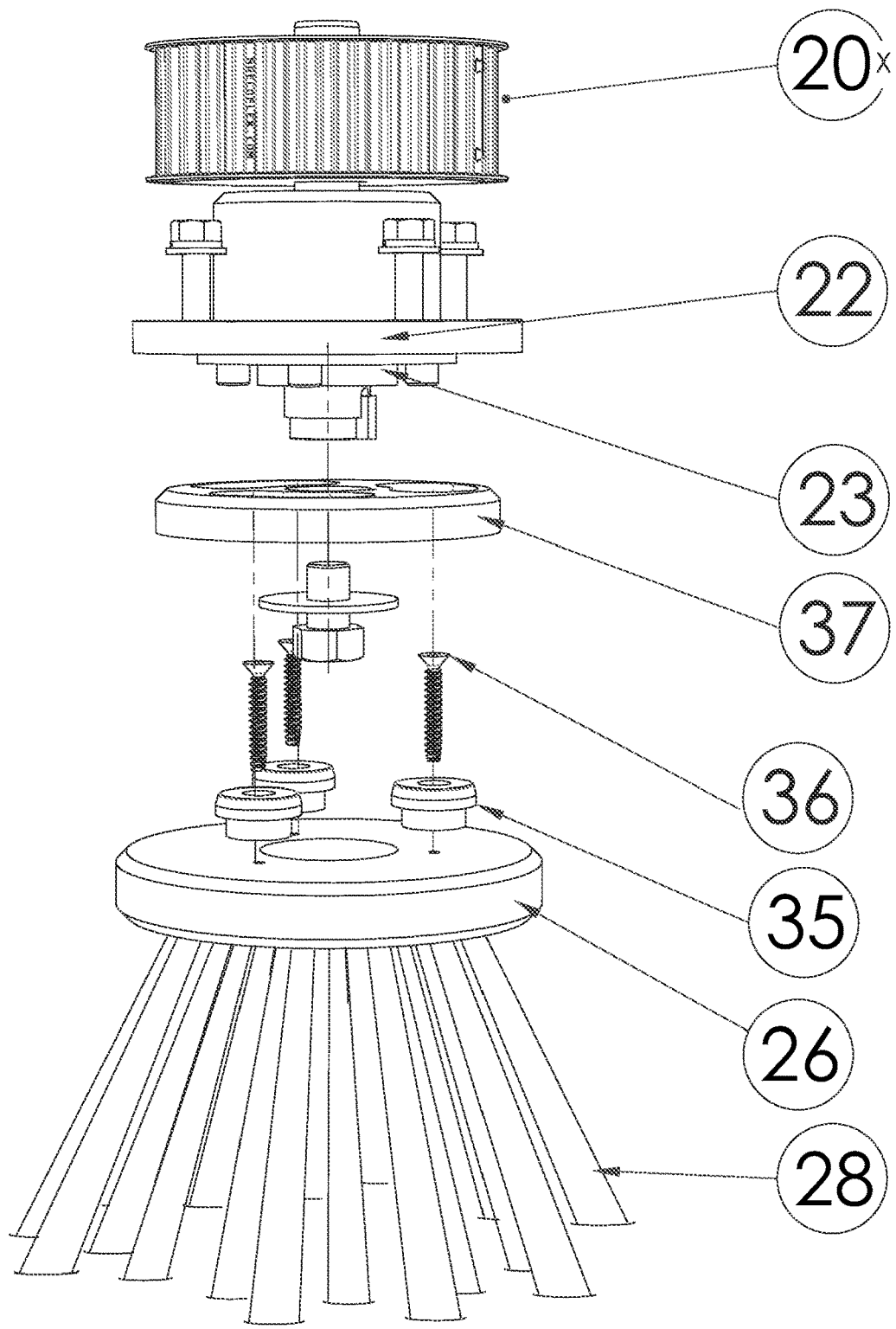
FIG. 23 shows an exploded view of an exemplary embodiment of the brush head, plate and pulley assembly from module three.
Figure 25R:
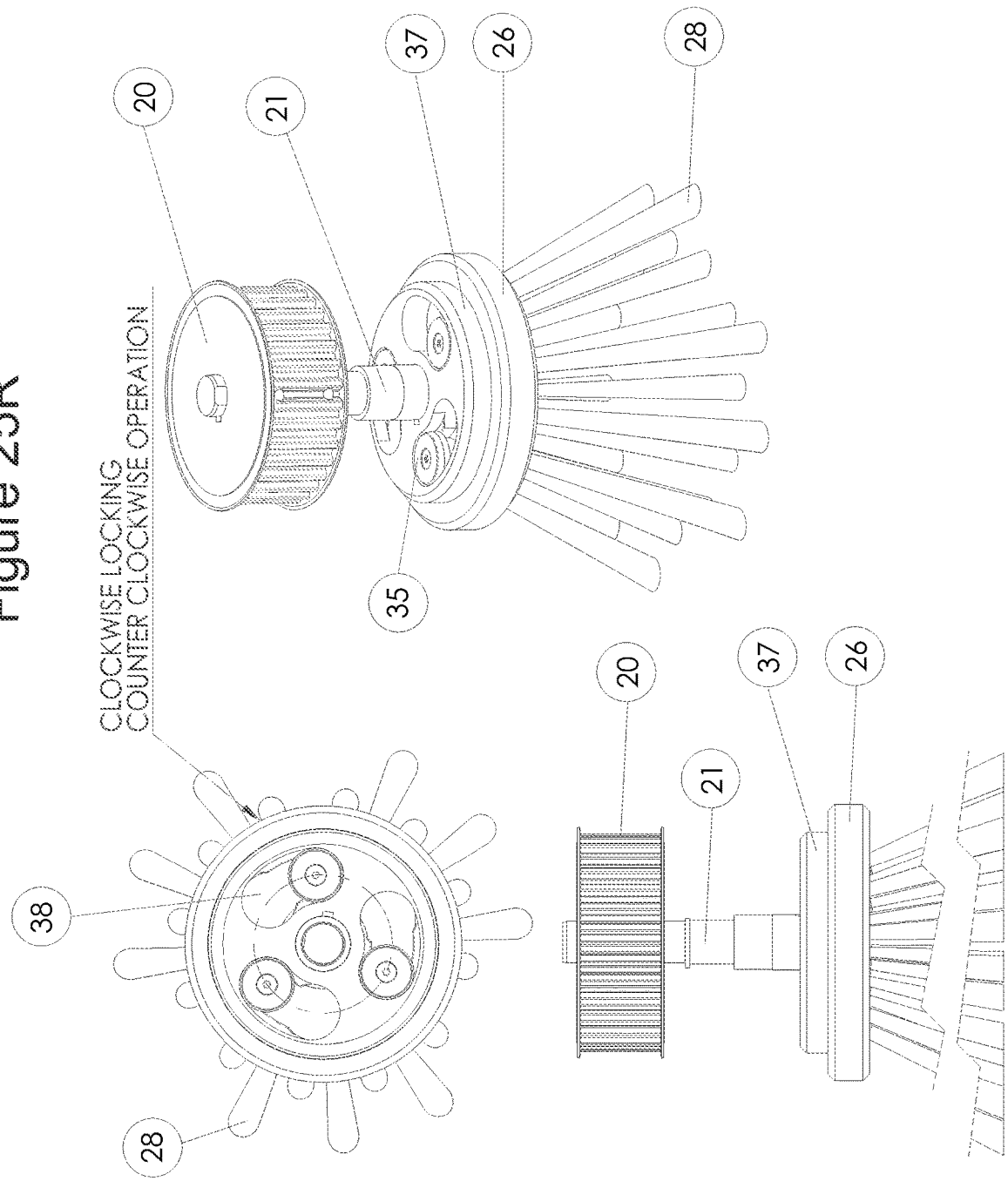

As the pan 3 moves under the bristles 28, as the lip of the pan 3 passes, a compression of the bristles tends to reduce the effectiveness of the bristles due to the compression that occurs due to the height of the lip. An example of this can be seen in FIG. 20B showing the effect on a single conventional brush head. This contact creates a reduction in efficiency at this contact point and to overcome this inefficiency the instant invention in module 3 m3 provides a minimum overlap within the configuration of the brushes in module three.

Figure 18:
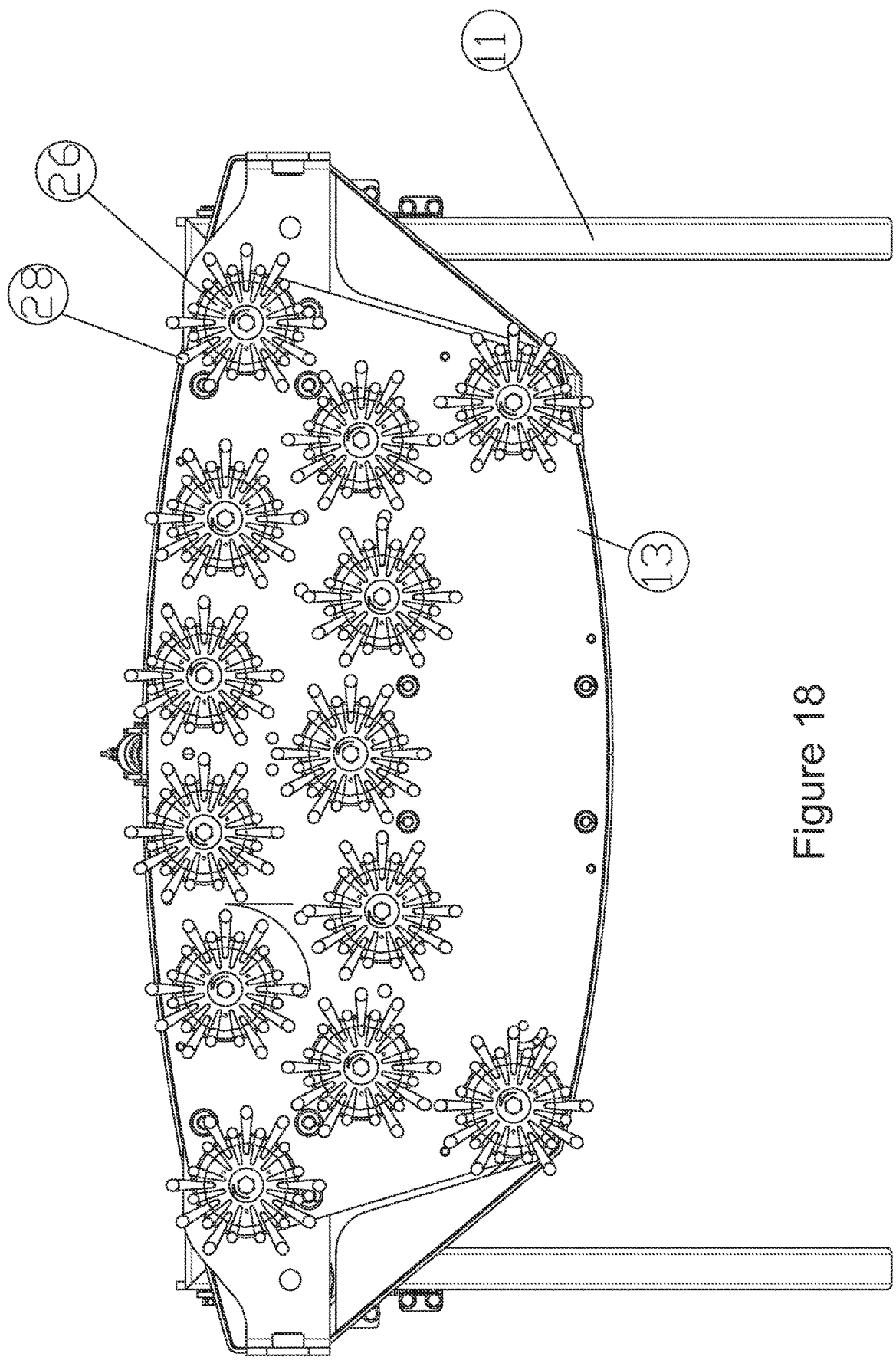
FIG. 18 shows a bottom view of the exemplary embodiment of brush module three shown in FIG. 16.
Figure 19:
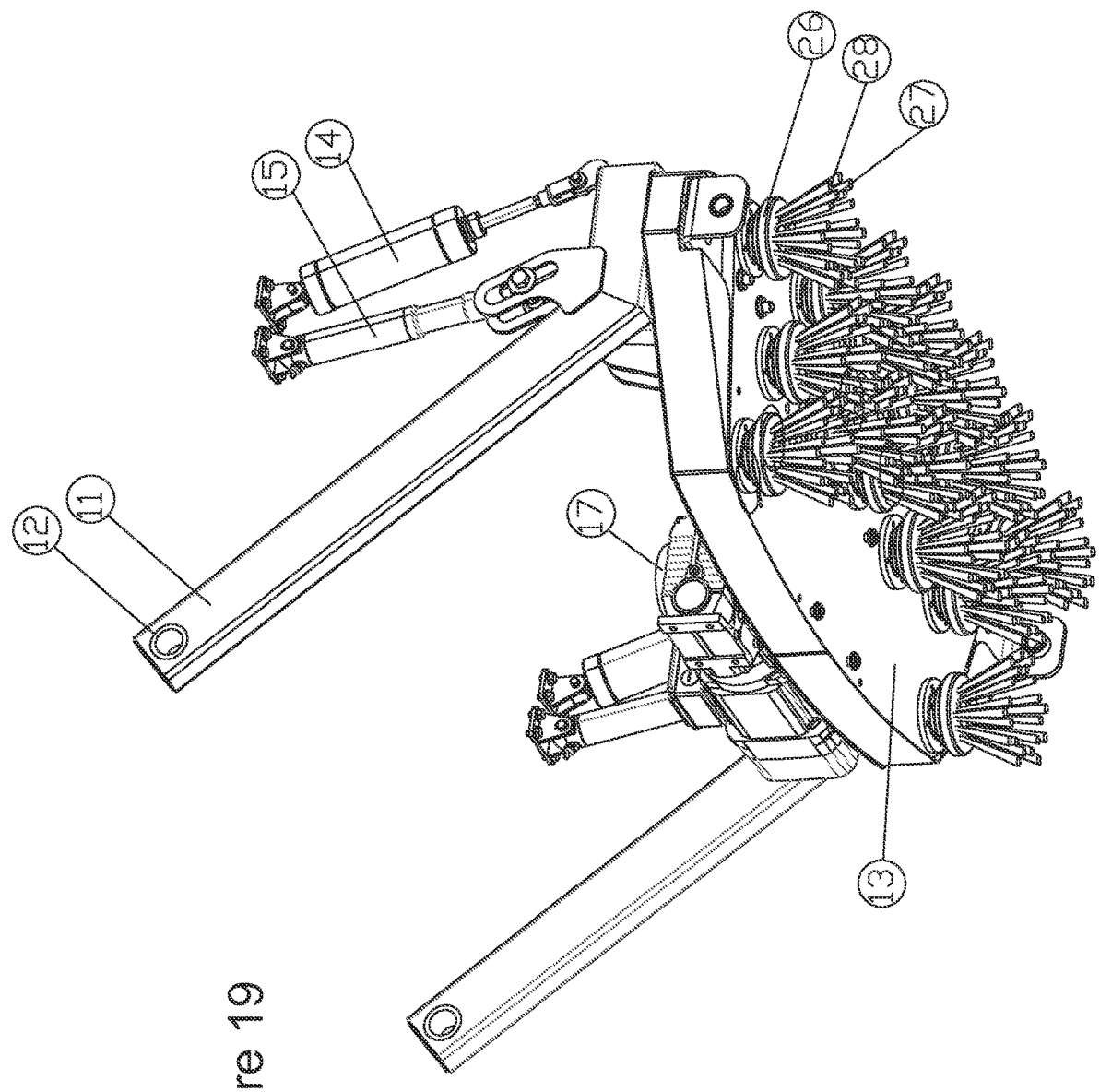
FIG. 19 shows an isometric front view of the exemplary embodiment of brush module three shown in FIG. 16.

As best seen in relation to FIGS. 18 and 20, there is overlap of width for all the brush heads in the configuration of the third module m3 such that the area cleaned by each brush overlaps the effective cleaning area in compression for the brush, e.g. the minimum effective area of the brush in cleaning. So that the compression on both the inside and outside surfaces of the lip of the pan, where the efficiency of the brush is reduced to only a portion of the bristles due to these compressive forces reducing the contact area, is covered by the overlap of the next additional brush.

In addition, the spacing of the bristles in the brush head 80 itself of the instant invention is such that it reduces this inefficiency as that brush head as it is passed into contact with the lip and deflection occurs. This is due in part to the spacing and angle of the bristles, as more clearly shown in relation to FIGS. 20 to 25L. With a brush where the outer brush bristles 28 and inner brush bristle 29 emanate out from the brush body 26 which holds the brush bristles at non-sequential or "uneven" angles relative to one another. The angle that the inner brush bristles 27 and outer brush bristles 28 are affixed to the brush body 26 can vary so that they are suited or are able to brush against the sides of the pan perimeter both inside and outside pan perimeter surface 33 and outside pan perimeter surfaces 34.

The brush bristles in the exemplary embodiment shown in FIGS. 15-20 will flair outwards as in a skirt fashion as one views the bristles from top to bottom, for instance in FIGS. 18 and 20. Where outer brush bristle 28 has tips 32 which contact the inner perimeter pan sides 6 at an angle of between about 15 to 45 degrees where about typically a 25 degree angle is presented. The inner bristles can be flared or in a skirt manner also at angles of between about 15 to 45 degrees, but are about typically 30 degrees. This cleaning operation requires that the bristles also are able to go into corners where converging surfaces meet such as but not limited to where the inside pan perimeter surface 33 and the top of the pan top surface 4 converge.

It was also realized that the entire leading and trailing perimeter, as opposed to side perimeter edges which were previously discussed, of the bun pan 3 would need to be brushed and that the rotary brushes 25 used would clean in the most optimal way when the inner brush bristles 27 and outer brush bristles 28 would contact the inner bun pan perimeter surface 6 at an inner brush bristle angle 29 and outer brush bristle angle 30 that allowed the inner brush bristle 27 and outer brush bristle 28 to brush the pan perimeter inside surface 6 with the tip of the brush bristle 32 rather than have the inner brush bristle 27 and outer brush bristle 28 bend and then all brush bristles behind it would also bend and lay on each other so that in effect they would only be wiping or glance stroking the inclined inside bun pan perimeter surface 6.

To address this the inside brush bristles 27 and outside brush bristles 28 are a combination that are offset in their rotational path so as to not be able to have leading brush bristles lay back on top of one another in a layer as seen in FIGS. 15-19. Additionally, to prevent or reduce the layering effect it was decided to provide brush bristle gaps 31 in between clusters of brush bristles and to have a more open disbursement of brush bristles within the brush plate 26 to avoid them from laying over and having them layer to where other following brush bristles layer onto earlier brush bristles. The design of the brush can be best seen in FIG. 22.

Another aspect of module three m3 is to ensure the correct path of the inner brush bristle 27 and outer brush bristle 28 and have the brushes 25 spaced out so as to provide overlap as well as agitation at the locations needed to do its cleaning operation. An example is where the brushes 25 will be cleaning the top surface of the pan 4 as well as the leading and trailing pan perimeter inside surfaces 6 such as when the rotating brushes 25 are approaching the leading and trailing areas of the inner pan perimeter 6 or outer pan perimeter 7. It is best when the path of brush bristle tip 32 can sweep across the pan surface rather than when it contacts the inner pan perimeter surface 6 and it is on such an angle that the bristle will bend back to a point where it effectively stops brushing with the bristle tips and then goes to where the bristle bends significantly to where it tends to wipe across the surface and performs no effective brushing action. This can be best seen in FIG. 20A.

This can occur when the brush 25 starts to go over and enter/exit the approaching leading inner perimeter inclined edge 6 of the bun pan 3 and/or the trailing inner pan perimeter edge 6 of the bun pan 3 or as the brushes go along the side edges of the pan inside perimeter 6. In these cases where the brush is approaching the inner part of the trailing perimeter inner edge the bristle tips 32 will contact and brush the inner pan perimeter surface 6 and at first the line of contact between the brush bristle tips 32 and the inner pan perimeter edge 6 may be from 11 o'clock to 1 o'clock, the aforementioned compression. As the pan 3 continues to approach the rotary brush 25 the contact width of bristle tips 32 that will contact the pan inner perimeter surface 6 will increase to a wider amount up till the time when the center line of the brush rotating shaft 21 is at or very close to the peak of the pan perimeter upper edge at which point the contact width will be approaching the full width of the brush 25 less any bending curvature of the bristle.

Once the contact angle goes beyond the sweep angle of between about 10 o'clock till about 2 o'clock the brushing and or cleaning effect of the brush inner bristles 27 and brush outer bristles 28 in motion will be reduced as the bristles will tend to bend backwards and go from a brushing effect to a wiping action where the wiping has far lower ability to dislodge debris and adhering materials as previously stated.

To still provide adequate cleaning action the instant invention is provided with more or sufficient number of brushes in module three m3 so that there will be overlap or the areas where effective cleaning can be provided. In this application it was chosen to use brushes that had staggered overlap but overlap was two hundred percent where the shaft centers in the path of pan travel would be at 3.5 inch centers or one-half of the center to center distance of the brush shafts 21. In terms of angles and swept area the sweeping angle of about 30 to 60 degrees was used where if one uses the 30 degrees off center in both directions provides a total of 60 degrees of swept area this would have a lateral swept area of one and three quarter inches to each side of the center line of the brush. When combined each brush has a premium swept width of three and a half inches and the adjacent brushes would have the same area to generate the full width of optimal cleaning/brushing area and this is where the brush bristle tips are contacting the approaching trailing inner pan perimeter surface.

In the central area of the bun pan 3 the brushes 25 are rotating freely and are not subjected to the same high bending forces as compared to the leading and trailing edges of the pan. In the central area of the bun pan 4 the brush 25 is not contacting pan perimeter inside surfaces 6 edges so that the brush brittle tips 32 can freely rotate and just be in contact with the pan top surface 4. So for that operation the brush bristle tips 32 would be operating or cleaning for the entire diameter or face width of the brush 25 in which case when the brushes 25 are located at 3.5 inch centers the pan will have two hundred percent cleaning coverage to the pan surface. It can also be understood that bristles of other and or combinations of angles in a single brush could be used without departing from the spirit of the invention.

This was done so that the brushes 25 would also be brushing the top pan surface 4 and if too much brushing action was taking place there then it may compromise the lifespan of the release coating used on the pan 3. The instant invention utilizes an optimization calculation of brush heads in the configuration sufficient to clean the pan perimeter inside edges in very little time. To do this, more brushes are employed to get the job done. In the center of the pan the brushes 25 have more effective working area and efficiency as the pan brushes 25 can use the entire path circle area as its proper cleaning area. As an example when the back pan perimeter inner surface 6 approaches the brushes the brush will do a good and effective job of cleaning when the brushes can engage the pan perimeter inner surface 6. That way the brush bristle tips strike and sweep against the pan perimeter inside surface 6 but as the pan continues to approach or more deeply engage the pan perimeter inside surface 6 the brush bristles will start to bend and lean back to where the sweeping effect of the bristle tips 32 reduces and the wiping effect of the brush bristles increases.

For cleaning of the inside perimeter of the pan the brush layout had other complicating factors where the brushes were not in an optimal location as the pans would vary in width depending on the products to be made and sizes of the products. So the third module is further designed to optimally clean the pan perimeter inside and outside side perimeter edges 6, 7 with an overlap of multiple brushes as shown by the highlighted areas of FIG. 20. The overlap can be for example, one hundred to four hundred percent, in this exemplary embodiment it was decided that an overlap of three times or three hundred percent would be used where the center to center locations of the shafts would be at two and three-eighths inches across the travel path of the pan and the brush diameter would be at seven inches based on the selected overlap.

Figure 15:
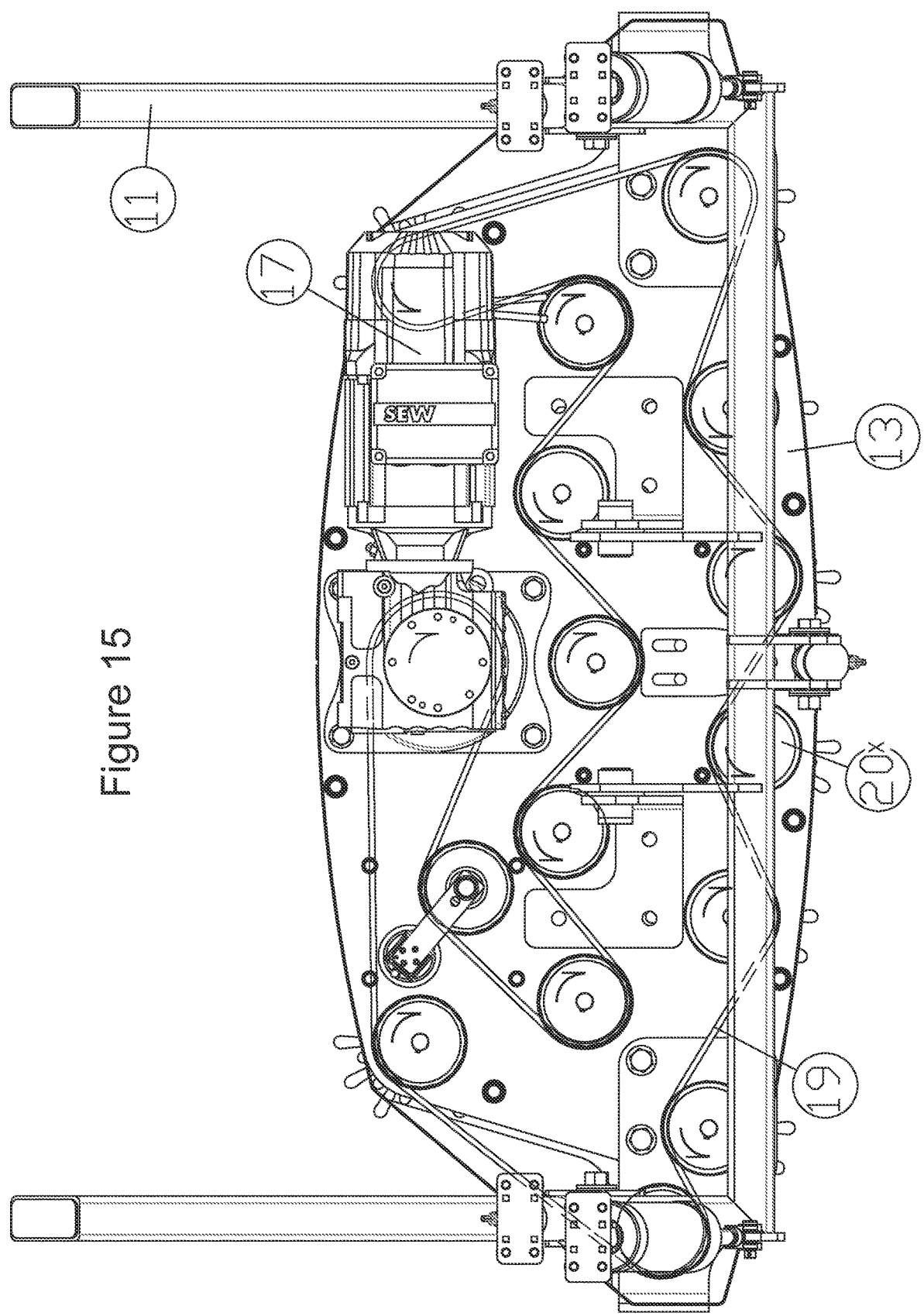
FIG. 15 shows a top view of module three of the exemplary embodiment of FIG. 11, showing the drive motor and power transmission unit.
Figure 16:
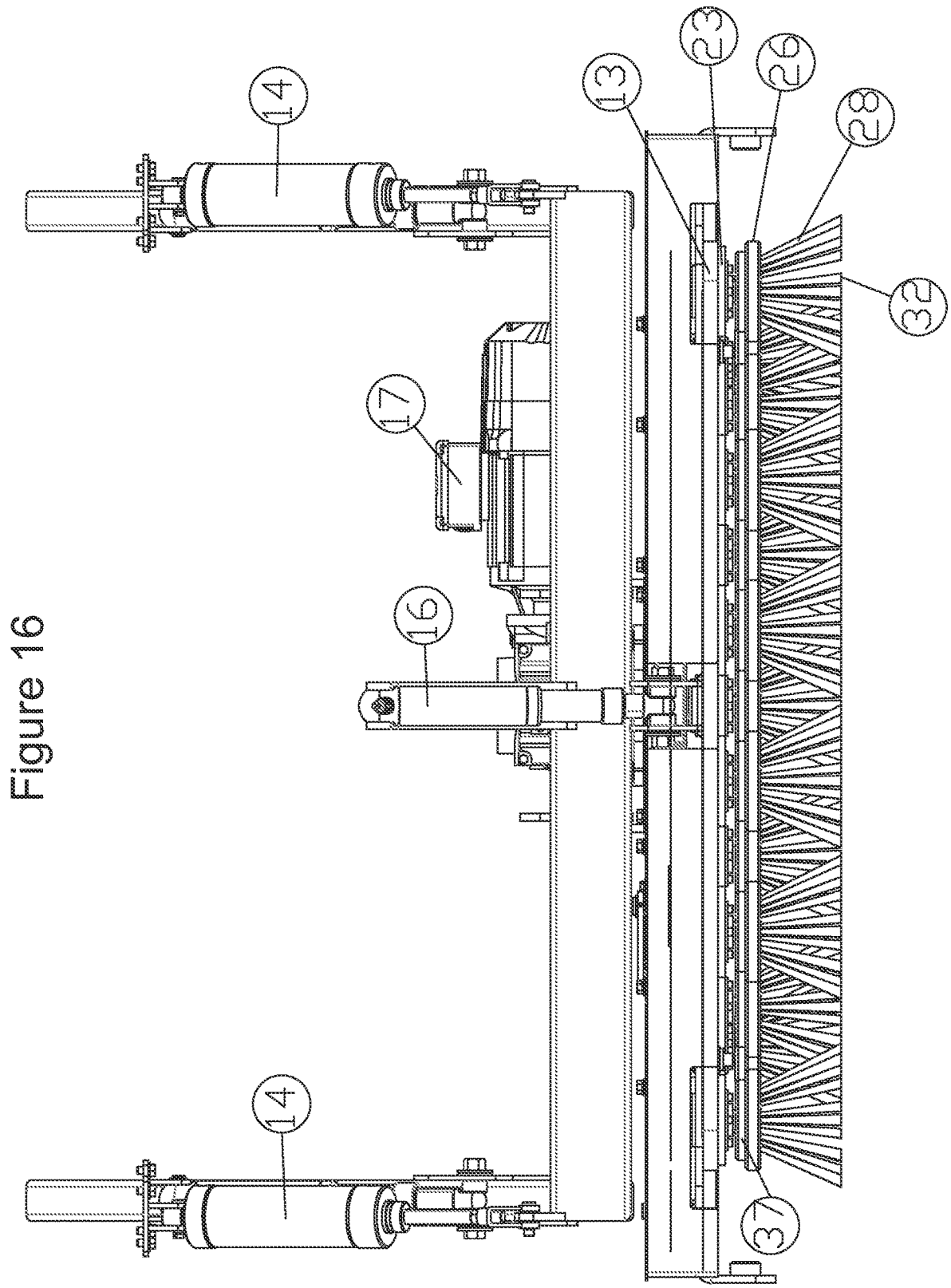
FIG. 16 shows a rear view of the exemplary embodiment of brush module three showing the dense configuration of plurality of brushes with overlap in the first and second rows of brushes.
Figure 17:
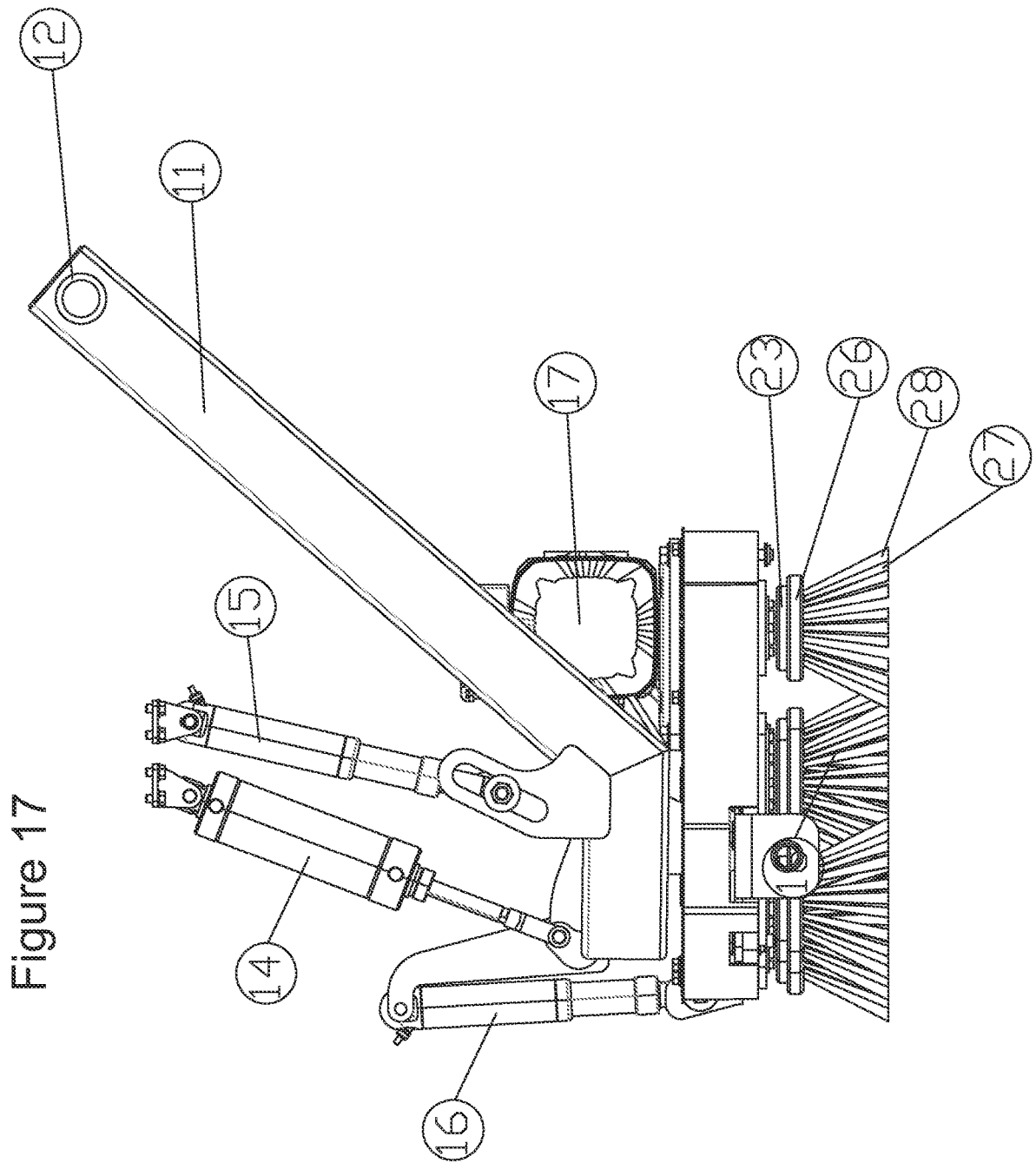
FIG. 17 shows a side view of the exemplary embodiment of brush module three shown in FIG. 16.

The direction of rotation of the brushes is also improved in that the various rotational moments are cancelled in the layout indicated in FIGS. 15 and 18. In the brush head where each brush that is across the travel path of the pan in the exemplary embodiment alternates in rotational direction as an example, but would certainly not be limited to, when going from left to right such that the first brush would rotate in a clockwise direction and the second would be counter clock wise, the next again being clockwise and alternating in this manner across the width of the pan. The reason being it gives a balanced side loading of force placed on the bun pan 3 as it goes thru the pan cleaner and is held to and by the conveyor belts.

As an example if all of the brushes were to be rotating in the same direction then when a bun pan 3 approaches and contacts the rotary brushes 25 then the rotation of the rotary brush 25 would be forcing or driving the bun pan 3 to go to the side or off of the pan conveyor 43. And since the device is brushing the outside edges of the pans this cleaning and brush operating area would of be interfering with the utilization or placement of guides in this area.

The rotary brushes operate by being supported on a mount plate 37 which spans the pan conveyor 43. The mount plate 37 also allows for and provides a mounting means for the vertical brush Shafts 21 and drive device 17. The vertical brush shafts 21 are contained within the upper cartridge 22 and lower cartridge 23 where they are rotatably supported. There is also a power transmission device (timing belt pulley) mounted on the output shaft of the drive means 17 as well as the top input section of the brush shaft 21. When the drive means 17 operates it generates rotational force/energy which it further transmits and delivers thru the power transmission device, but this could also be done using other power transmission materials without departing from the novelty of this invention.

This driving rotational movement is then absorbed in a power transmission conducting device 19 and applied to the power transmission pulley 20X which is then set into rotational motion while being affixed to the top of the brush shaft 21. The brush shaft then puts the rotational motion into the brush 25 that is attached to the distal end or bottom of the shaft 21.

The connection of the brush to the shaft is done so that the brushes 25 can be installed and removed from the brush mount plate 37 in a tool less fashion whereby the brush body 26 has one or more connection buttons 35 which are held in connection to the brush base 26 by the utilization of attachment fasteners 36. These connection buttons 35 will pass thru a hole of clearance 38 in the brush mounting plate 37 and can be rotated in relationship to the slots 39 in the brush mounting plate 37 to where they will lock in place and allow for the rotation of the brush shaft 21 to rotate or drive the brush 25. It should be noted the brushes 25 with mounting buttons 35 can be affixed in either clockwise or counter clock wise fashion provided they are rotated and affixed in the brush attachment plate that permits connection or attachment in that said rotational direction. These elements of the invention can best be seen in the exemplary embodiment shown in FIGS. 21, 23, 25L, 25R.

Figure 26A:
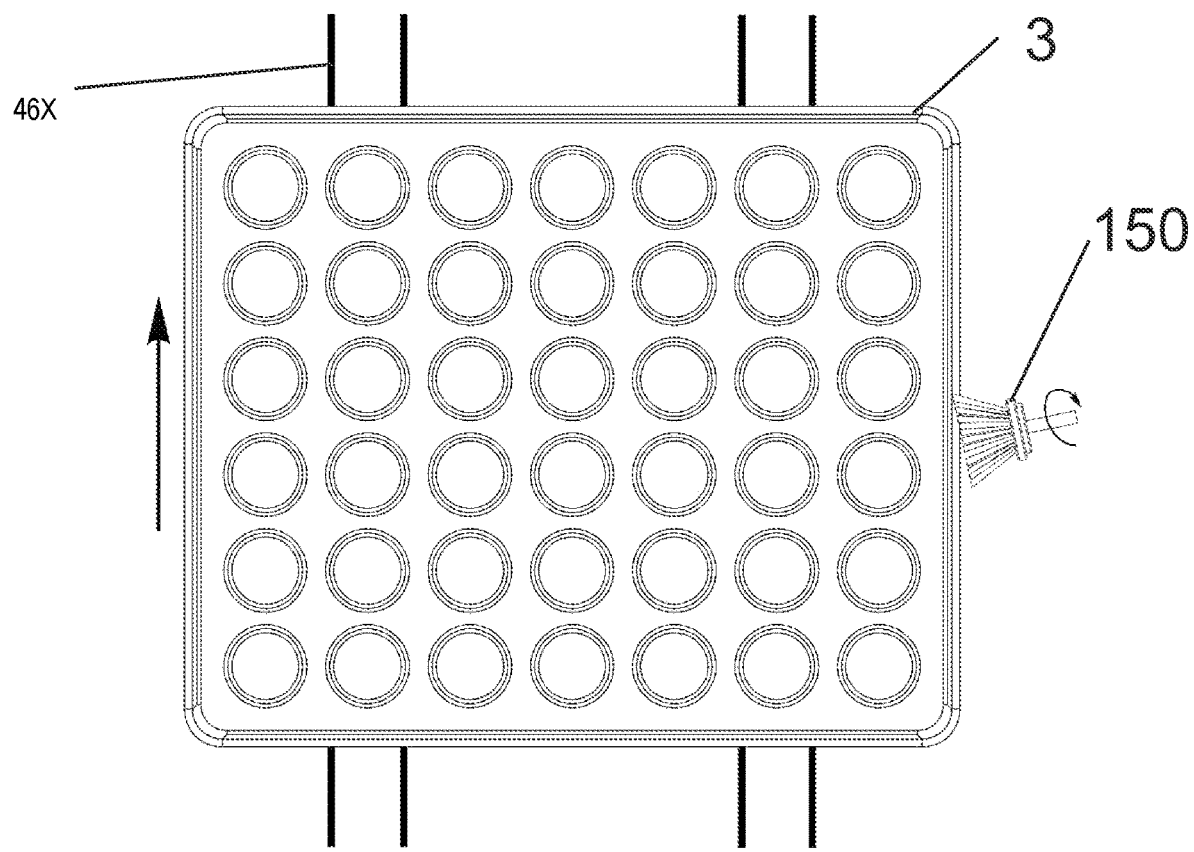
FIGS. 26A and 26B show an additional side sweeping brush of an alternate exemplary embodiment of module three.
Figure 26B:
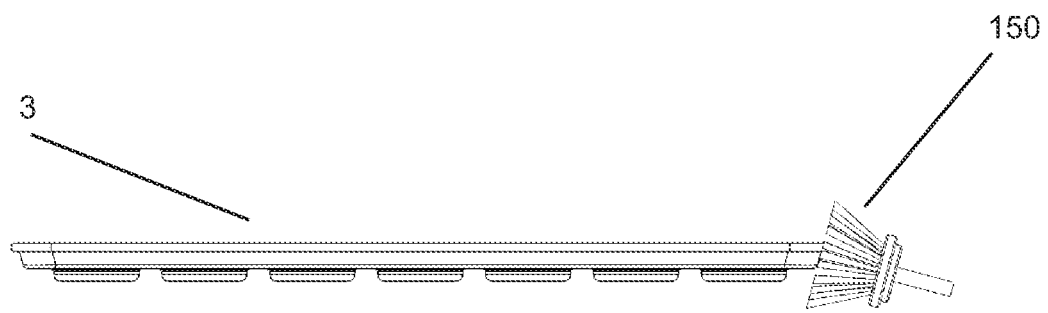

FIGS. 26A and 26B show an additional side sweeping brush of an alternate exemplary embodiment of module three. An alternate pan perimeter inside 6 and pan perimeter outside 7 cleaning method is possible. In a further exemplary embodiment, via a separate module or incorporated as a component of the existing module three m3, an alternate brush may be added. An alternative exemplary embodiment of the brush system, as shown in FIG. 26A, could also be made that would have added side brushes that could specifically be employed and extend from the deck of module three m3 to clean the pan sides. In this alternate method of the exemplary embodiment, a side sweep brush 150 that would be held and rotated about a substantially horizontal axis so as to brush the outer edge of the pan 7. It could also be seen that the axis of this brush would not be perpendicular to the pan perimeter but actually where the brush rotational axis would be inclined so that the brush would use only one side of the brush to brush the pan perimeter.

As a non-limiting example of orientation of the side sweep brush 150, the axis could be perpendicular to the up down inclined surface of the pan perimeter surface but in the horizontal axis of the pan the axis of rotation would be either leaning back or forwards depending on the direction rotation of the brush relative to the direction of pan travel. The driving end of the spindle would be leaning back as compared to the travel direction of the pan of the up down. The lean back or forward of the brush rotational axis is dependent on the rotation direction of the brush and brush spindle so as to preferentially and predominantly brush the debris that may be adhering to the pan outer perimeter so that the debris will be brushed down and away from the pan perimeter. While it is possible to brush the debris upwards from the pan perimeter it is typically not a preferred direction as there is a high probability for the debris to fall onto the top product producing surface of the pan.

Figure 27:
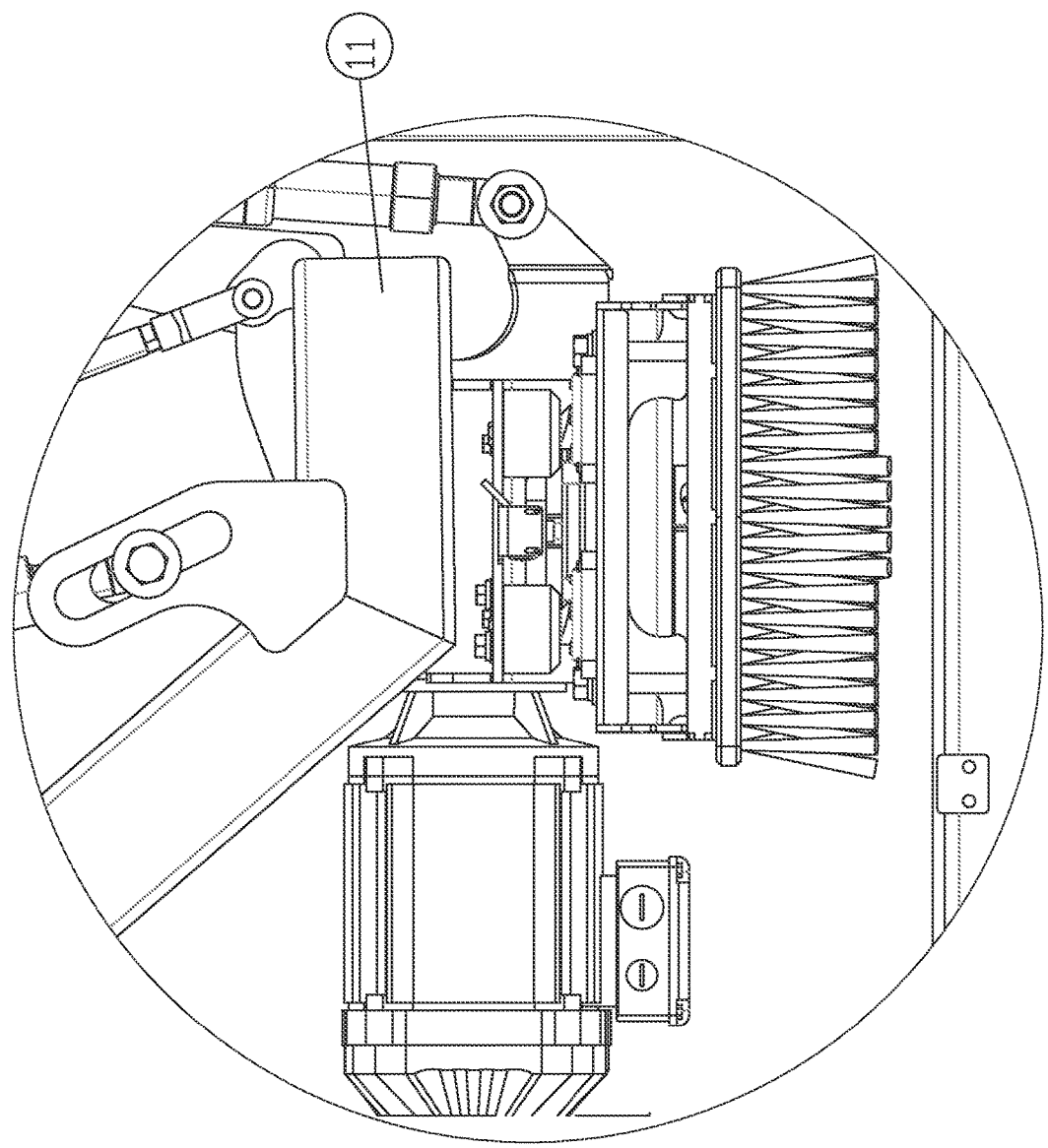
FIG. 27 shows a side view of module four of the exemplary embodiment of FIG. 11.

FIG. 27 shows a side view of module four of the exemplary embodiment of FIG. 11. Module four is an orbital brush that has been described in previously filed U.S. Provisional Application 62/894,923, shown in FIGS. 7A through 8F of that Application and described in the specification therein which has been incorporated herein by reference. A horizontal cylindrical brush subsystem is shown in an exemplary configuration as shown in an exemplary embodiment of the invention, is directed to an orbital, or oscillating, or orbital and oscillating flat or planar brush having a flat brush assembly that has bristles arranged and entered into a slab of brush base. The planar brush subjects the pan 3 to additional cleaning using higher, longer, taller bristles to scrub the pan surface with sufficient contact pressure and a compound elliptical scrubbing motion.

Figure 28:
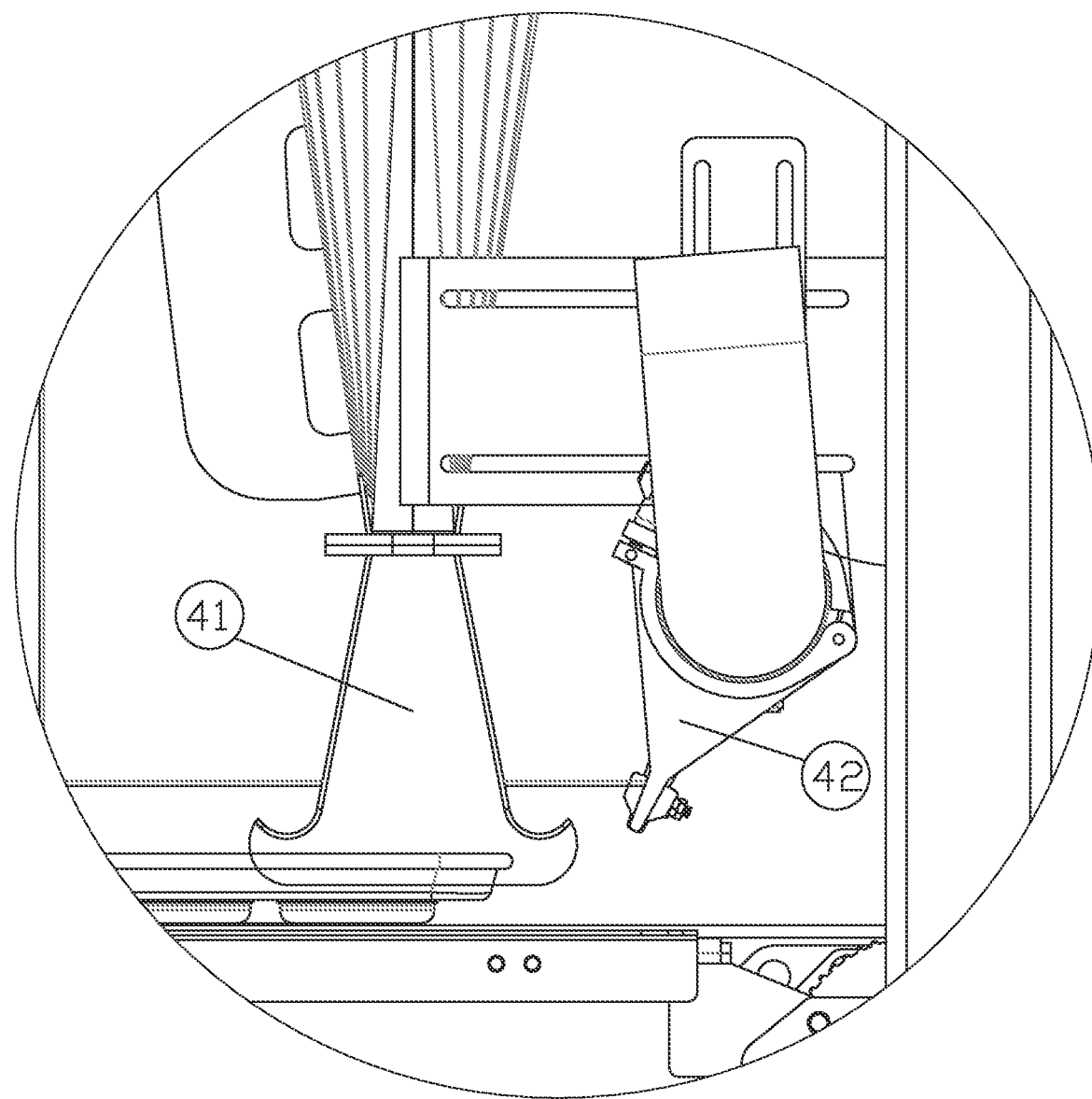
FIG. 28 shows a side view of module five of the exemplary embodiment of FIG. 11 and the exit conveyor.

FIG. 28 shows a side view of module five of the exemplary embodiment of FIG. 11 and the exit conveyor. The module is shown as a second vacuum hood 41 with a proceeding air knife 42. The air knife 42 takes any or all loose debris that may be sitting on the pan surface 4 or in any of the pan pockets 5 and agitates it so that it becomes airborne and may be removed by the vacuum head.

Figure 29:
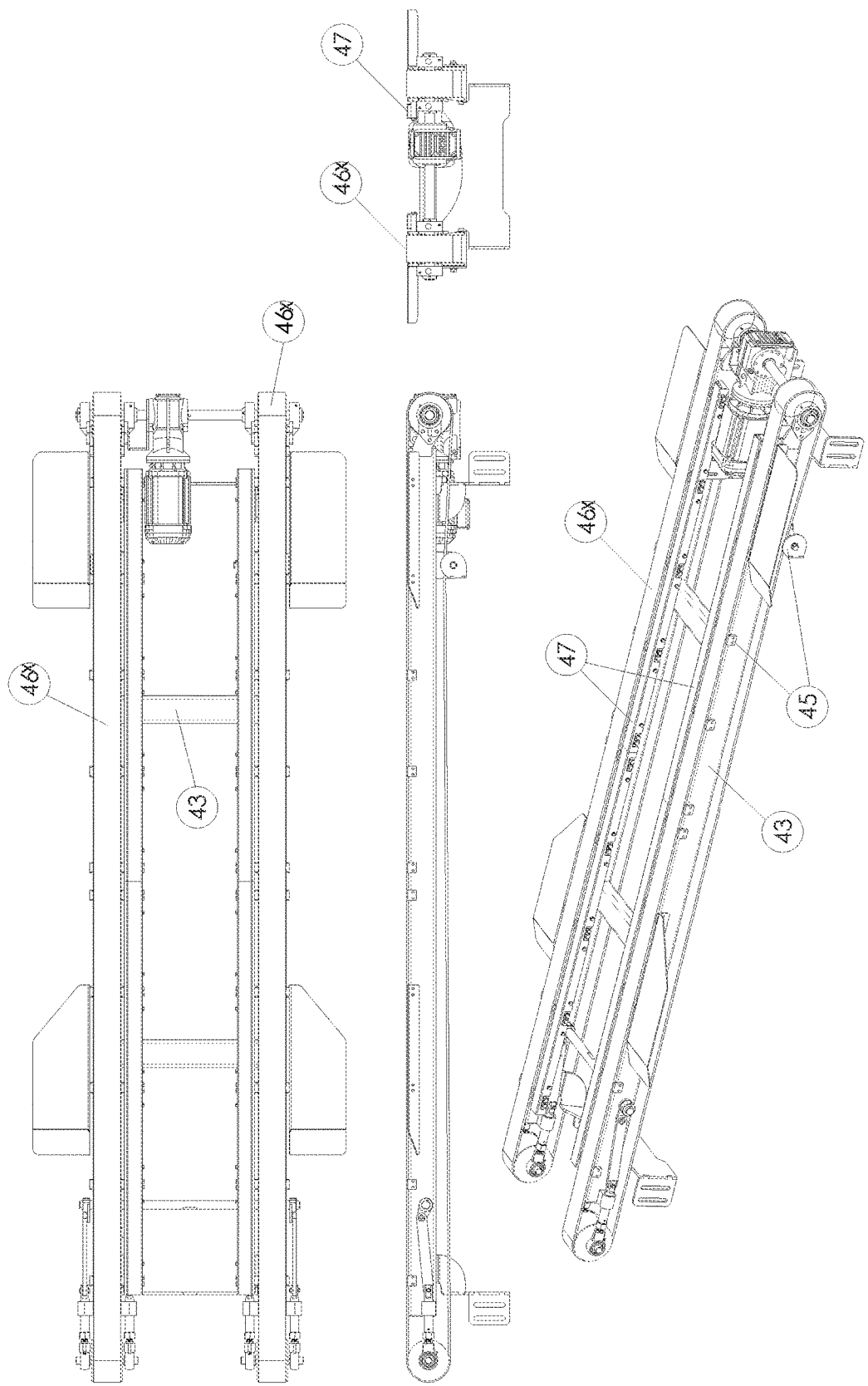
FIG. 29 shows a view of an exemplary embodiment of the conveyors system.

FIG. 29 shows an end view of the magnetic conveyor where the said bun pans 3 may be placed upon for carriage thru the pan cleaner 1 for the purpose of cleaning said bun pans 3. The conveyor 43 provides two parallel paths of tractive transport of said bun pans 3. On the sides of the conveyor paths are mounted pan conveyor magnets 47 so as to attract and create the magnetization of the ferrous bun pans 3. The generated strong attractive forces being able to hold the bun pans 3 in position while they are moved along the conveyor 43 and thru the forces and loadings imparted on them as they pass thru and are exposed to the various forces subjected upon them by the various cleaning stations or sub-system or modules.

The conveyor 43 can also take bun pans 3 as they are presented to the pan cleaner 1 and load them on and thru the pan cleaner 1. They do not need to be loaded and indexed onto carriers or to specific locations such that they will arrive at specific locations or modules for cleaning at specific times and the like. This reduces feed complexity of the stream of contaminated pans 3 to the machine 1. To ensure that the bun pans 3 are held to or adhere to the pan conveyor belts 46X so as to not be motivated by any or the entire pan cleaning devices the pan conveyor magnets 47 located adjacent to the conveyor belts 46X are attached to the sides of the belt support surface 44. The bun pans 3 then travel towards and approach the first cleaning section comprising modules 1 and 2, as further described herein in relation to FIGS. 2 and 3 above. The pans 3 will get an initial sweep by the cylindrical, rotational brushes 8 so that any buns 2 that may be sitting atop of a bun pan 3 or in a pan pocket 5 due to incomplete removal at the de-panning device (not shown) can be removed before cleaning and drawn up the first vacuum hood 10X.

Though strictly lateral conveyance via non linear belts is possible, in the exemplary embodiments shown the belts that provide transport of the pans are held and constrained in a lateral direction, fixed linear direction, so as to maintain the pan in direct passage thru the pan cleaner device. This orientation minimizes the possibility of lateral slippage of the pan which could cause incomplete cleaning of the pan surface as well as possible jamming of the pan upon passage and emergence of the pan from the pan cleaner. The magnets are installed so as to attract the pan to the magnet thereby pull the pans to the belt and providing for greater security in passage.

The method of the invention is directed to a method to remove possible sources of pan and/or product contamination from a commercial baking process. To accomplish this a method for removal or alleviation of these materials from a pan by providing a system or method of operating or means of optimized cleaning of these pan perimeter surfaces is provided herein.

In the method a source of pans 3 needing cleaning or removal of contaminants is provided on a transport medium. The transport medium, including but not limited to a conveyor 43 having magnetic coupling devices, herein magnets 47, in a conveyor belt 46X. The conveyor belt 46X is arranged to pass the pans 3 into a pan cleaning machine 1 having at least one cleaning module. In the exemplary embodiment shown, the process includes a first cleaning section incorporating first and second modules having horizontal brushes 8 and a first vacuum hood 10X, as described in greater detail in relation to the description of FIGS. 11 and 12 above. The first and second modules m1, m2 providing a first light brushing of the pan 3 to remove and buns 5 that have not been depanned and some contaminants.

The exemplary embodiment of the process passes the pans 3 to a second cleaning section, providing a novel cleaning sub-system or module four as shown and described in FIGS. 14 to 25R above. This processes the pan and cleans the perimeter and top surface of the pan 3 and can also be adjusted to provide a thorough cleaning extending into the pockets 5 of the pans 3 based on cleaning parameters. In contacting pan 3, it was thought that a uniform brush as exists in the prior art if used to try and strike the required surfaces would not fully do what is required due to angle of brush bristle contact and ability of the brushes to contact all surfaces. The process of the instant invention provides a brush where the bristles would emanate out from the brush bristle holding body 26 so that they clean or brush against the perimeter surfaces 6, 7 of the pan and if the angles were held, e.g. not significantly deflected, that these brushes could contact both the inside pan perimeter surface 7 as well as the outside surfaces of the pan perimeter 5 more effectively.

The method of the invention also realizes the need for brushing of the entire leading as well as trailing perimeter of the pan. The brushes used clean in the most optimal way when, as the bristles contact the main pan surface, they do so at an angle that allows the bristle to brush the surfaces with the tip of the bristle rather than have the bristle bend and then all bristles behind it would also bend and lay on each other so that in effect they would only be wiping or glance stroking the pan surface. Thus, the method of the invention uses a process whereby the brushes are consistently striking at angles to provide optimal contact to the perimeter of the surface at angles that allow the brush tips to remain in contact and at pressures that allow for the brushes to clean at their tips.

To achieve this, the bristles are presented in an offset in rotational path so as to not be able to contact leading bristles so as to sympathetically lay on top of one another in a layer. Instead, the bristle tips are maintained in contact and the deflection that transitions from a brushing to a sweeping motion avoided in a first method. The exemplary method of the invention also provides a controlled pressure via the module mounting mechanism, as seen in FIGS. 11 and 14 through 4-6b, to realize the tip contact of the process. It is of note that the system, by its modular and adjustable nature, can override the desired pressure and angle to keep the tips in contact and effectively "push harder" on the brushes to create the bending if a wiping action is desire for a different cleaning parameter as described herein.

A further aspect of the method of cleaning is to provide sufficient over lap of the brush heads during cleaning so that the use the brush tips when going into contact during sweeping process with the lip and the compression of the bristles does occur due to the change in the height of the pan lip that they present a minimum sweeping angle of about 30 to 60 degrees even in compression where it can also be understood the overall effective width of the brush is reduced but the brushes in the third module m3 are arranged such that they present significant overlap and even with the reduced contact area, the entirety of the lip of the pan is cleaned by at least one of the brushes.

For the front and rear surfaces, in the exemplary embodiment of the process of the invention, the instant invention uses one hundred percent overlap of the brush heads in the cleaning path, which provides sufficient overlap and cleaning around the entire perimeter. A non-limiting example of such an overlap is shown, but it is certainly not the limit of the process or device, where the brush centers in a travel path would be three and a half inches apart and the diameter of the brushes would be on seven inch centers, thereby allowing brushes to also be brushing the top pan surface.

For cleaning of the sides of the pans where the brushes were not in an optimal location, as the pans often vary in width depending on the products to be made and sizes of the products, so to clean the side perimeter edges of the pans the non-limiting, exemplary process and the non-limiting exemplary device for carrying out the process provides an overlap of three times or three hundred percent, which is used in the exemplary embodiment for example where the center to center locations of the shafts would be at two and three eighths inches across the travel path of the pan and the brush diameter would be at seven inches.

The process of the instant invention also provides remediation of spinning moments of the pan. The direction of rotation of the brushes is improved in the exemplary embodiment of the process and device executing the process in that the various rotational moments of the individual brushes are cancelled by one another in the layout indicated. In the brush head where each brush that is across the travel path of the pan in the preferred embodiment alternates in rotational direction as an example, but would certainly not be limited to, when going from left to right such that the first brush would rotate in a clockwise direction and the second would be counter clock wise, the next again being clockwise and alternating in this manner across the width of the pan.

This provides balanced side loading of force placed on the pan as it goes thru the pan cleaner and is held to and by the conveyor belts. If all of the brushes were to be rotating in the same direction then when a pan approaches and contacts the brushes then the brush would be forcing or driving the pan to go to the side or off of the conveyor. And since the device is brushing the outside edges of the pans this cleaning and brush operating area would of be interfering with the utilization or placement of guides in this area.

The exemplary embodiment of the invention then passes the pan to a third cleaning section, comprising modules four and five, whereby a final brush utilizing a wide planar brush is applied and a corresponding second vacuum hood 41 is provided. The remaining contaminants being removed from the pan 3 and the pan 3 being cleaned and passed along from the cleaning machine 1.

In addition to the novel cleaning process of the instant invention as enumerated above, additional aspects of further exemplary embodiments of the instant invention can provide for a programmable controller to execute movement of the aforementioned modules on arms. The movement, as enumerated above, can be used to engage or disengage the modules as desired. The movement can also provide greater or lesser pressure to be exerted at the given interface of each module with the pan 3 as determined by cleaning parameters and engagement parameters as previously discussed. This controls the arms and thereby the modules in the cleaning process being implemented by the controller 14a.

Similarly, the process can incorporate sensors as described herein above in relation to FIG. 11 in an alternate embodiment of the process of operation of the instant invention. These sensors can, for example but are certainly not limited to, providing a further step in the process of scanning and analyzing the condition of the pan with respect to the contaminants on the pan or the condition of the non-stick glaze and the controller 14a and the further exemplary embodiment of the process of the invention can provide additional steps based on the output from the sensor. These steps an include but are not limited to adjusting the cleaning parameters to suit the detected contaminants or passing the pan to a sorting conveyor to be removed from service.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A modular frame swing arm pan cleaning system, comprising:
    an at least one frame having at least one frame element;
    an at least one swing arm mounting point on the at least one frame element;
    an at least one modular swing arm coupled to the at least one frame element at the at least one mounting point by an at least one pivot element such that the at least one modular swing arm rotates freely about the pivot element;
    an at least one pan conveyor coupled to said frame;
    an at least one unclean pan conveyed by said at least one pan conveyor;
    an at least one pan cleaning subsystem coupled to the at least one swing arm;
    an at least one swing arm actuator;
    an at least one swing arm limiter; and
    an at least one controller, whereby the at least one modular swing arm having the at least one cleaning subsystem mounted thereon is positioned by the at least one controller relative to the at least one pan conveyor to move the at least one pan cleaning subsystem from an open position to and engaged position an engage the at least one unclean pan with the at least one pan cleaning subsystem by activating the at least one swing arm actuator to swing the at least one modular swing arm from the open position and position the at least one pan cleaning subsystem to engage the pan at a pressure range exerted by the at least one swing arm actuator and limited by the at least one swing arm limiter while engaged with the at least one unclean pan such that the at least one unclean pan is cleaned.

2. The pan cleaning system of claim 1, wherein the at least one frame element further comprises an at least one primary frame element and an at one least secondary frame element, wherein the at least one modular swing arm, the at least one modular swing arm mounting point, and the at least one swing arm pivot are mounted on the at least one secondary frame element and the at least one secondary frame element is coupled to and supported by the primary frame element.

3. The pan cleaning system of claim 2, further comprising a secondary conveyor receiving a flow of unclean pans that is coupled to the at least one secondary frame element, whereby the at least one secondary conveyor retains the unclean pan at a cleaning angle that is at least perpendicular relative to the at least one primary frame element and the at least one secondary frame element is coupled to the at least one primary frame element at the cleaning angle such that the at least one modular swing arm engages the flow of unclean pans at the cleaning angle.

4. The pan cleaning system of claim 3, wherein the at least one secondary conveyor is an at least one magnetic secondary conveyor.

5. The pan cleaning system of claim 4, wherein the at least one magnetic secondary conveyor has an at least one support carriage that is magnetized.

6. The pan cleaning system of claim 5, wherein the at least one unclean pan passes out of the cleaning system as an at least one clean pan and further comprising a machine vision subsystem, where the at least one support carriage further conveys after the cleaning system the individual clean pan along an at least one track member to the machine vision subsystem to analyze a condition of the at least one clean pan.

7. The pan cleaning system of claim 6, wherein the condition of the
    at least one clean pan analyzed by the machine vision subsystem is communicated to the at least one controller and the at least one clean pan is sorted based on the condition.

8. The pan cleaning system of claim 1, wherein the at least one pan cleaning subsystem is at least one of an airknife, a rotating brush assembly, and a planar brush assembly.

9. The pan cleaning system of claim 1, wherein at least one pan cleaning subsystem is releasably mounted to the at least one modular swing arm by a releasable coupling.

10. The pan cleaning system of claim 1, wherein the at least one controller has a setting and actuates upon detection of the setting whereby the at least one swing arm is moved upward relative to the at least one pan conveyor to the open position whereby the at least one conveyor and the unclean pan are not engaged.

11. The pan cleaning system of claim 10, wherein the open position is a maintenance position, the pan cleaning system is not in operation, and the at least one pan cleaning subsystem is released by a releasable coupling for maintenance or replacement.

12. The pan cleaning system of claim 10, wherein the setting whereby the at least one swing arm is moved upward relative to the at least one pan conveyor to the open position in a maximum pressure setting on the limiter such that when exceeded a jammed condition is detected and the at least one arm is raised to release the at least one unclean pan from the system.

13. A modular frame swing arm pan cleaning system, comprising:
    an at least one frame element;
    an at least one swing arm mounting point on the at least one frame element;
    an at least one modular swing arm coupled to the at least one frame element at the at least one mounting point by an at least one pivot element such that the at least one modular swing arm rotates freely about the pivot element;
    an at least one pan conveyor coupled to said frame;
    an at least one unclean pan conveyed by said at least one pan conveyor;
    an at least one pan cleaning subsystem coupled to the at least one swing arm;
    an at least one swing arm actuator;
    an at least one swing arm limiter; and
    an at least one controller, whereby the at least one modular swing arm having the at least one cleaning subsystem mounted thereon is positioned by the at least one controller relative to the at least one pan conveyor to engage the at least one unclean pan with the at least one pan cleaning subsystem by activating the at least one swing arm actuator to position the cleaning subsystem to engage the pan at a pressure range exerted by the at least one swing arm actuator and limited by the at least one swing arm limiter such that the at least one unclean pan is cleaned and the controller has a setting and actuates upon detection of the setting whereby the at least one swing arm is moved upward relative to the at least one pan conveyor to an open position permitting the at least one cleaning subsystem to be disengaged.

14. The pan cleaning system of claim 12, further comprising an at least one secondary conveyor receiving a flow of unclean pans that is coupled to an at least one secondary frame element, whereby the at least one secondary conveyor retains the unclean pan at a cleaning angle that is at least perpendicular relative to an at least one primary frame element and the at least one secondary frame element is coupled to the at least one primary frame element at the cleaning angle such that the at least one modular swing arm engages the flow of unclean pans at the cleaning angle.

15. The pan cleaning system of claim 13, wherein the at least one secondary conveyor is an at least one magnetic secondary conveyor.

16. The pan cleaning system of claim 14, wherein the at least one magnetic secondary conveyor has an at least one support carriage that is magnetized.

17. The pan cleaning system of claim 12, wherein at least one pan cleaning subsystem is releasably mounted to the at least one modular swing arm by a releasable coupling.

18. A modular frame swing arm pan cleaning system, comprising:
- an at least one frame element, the at least one frame element further comprises an at least one primary frame element and an at one least secondary frame element;
- an at least one swing arm mounting point on the at least one frame element;
- an at least one modular swing arm coupled to the at least one frame element at the at least one mounting point by an at least one pivot element such that the at least one modular swing arm rotates freely about the pivot element;
- an at least one pan conveyor coupled to said frame;
- an at least one unclean pan conveyed by said at least one pan conveyor;
- an at least one pan cleaning subsystem coupled to the at least one swing arm;
- an at least one swing arm actuator;
- an at least one swing arm limiter, the at least one modular swing arm, the at least one modular swing arm mounting point, and the at least one swing arm pivot are mounted on the at least one secondary frame element and the at least one secondary frame element is coupled to and supported by the primary frame element;
- an at least one secondary conveyor receiving a flow of unclean pans coupled to the at least one secondary frame element, whereby the at least one secondary conveyor retains the unclean pan at a cleaning angle that is at least perpendicular relative to the at least one primary frame element and the at least one secondary frame element is coupled to the at least one primary frame element at the cleaning angle such that the at least one modular swing arm engages the flow of unclean pans at the cleaning angle; and
- an at least one controller, whereby the at least one modular swing arm having the at least one cleaning subsystem mounted thereon is positioned by the at least one controller relative to the at least one pan conveyor to engage the at least one unclean pan with the at least one pan cleaning subsystem by activating the at least one swing arm actuator to at least one cleaning subsystem to engage the pan at a pressure range exerted by the at least one swing arm actuator and limited by the at least one swing arm limiter such that the at least one unclean pan is cleaned.

19. The pan cleaning system of claim 17, wherein the at least one pan cleaning subsystem is releasably mounted to the at least one modular swing arm by a releasable coupling.

20. The pan cleaning system of claim 17, wherein the at least one controller has a setting and actuates upon detection of the setting whereby the at least one swing arm is moved upward relative to the at least one pan conveyor to an open position whereby the at least one conveyor and the unclean pan are not engaged.

21. The pan cleaning system of claim 17, wherein the at least one secondary conveyor is an at least one magnetic secondary conveyor.

22. The pan cleaning system of claim 20, wherein the at least one magnetic secondary conveyor has an at least one support carriage that is magnetized.

* * * * *